United States Patent
Arjunan et al.

(10) Patent No.: US 7,319,125 B2
(45) Date of Patent: Jan. 15, 2008

(54) SUPERCRITICAL POLYMERIZATION PROCESS AND POLYMERS PRODUCED THEREFROM

(75) Inventors: Palanisamy Arjunan, Houston, TX (US); Simon X. Zhang, London (GB); Charles Cozewith, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 60 days.

(21) Appl. No.: 10/667,586

(22) Filed: Sep. 22, 2003

(65) Prior Publication Data

US 2004/0122191 A1 Jun. 24, 2004

Related U.S. Application Data

(60) Provisional application No. 60/431,077, filed on Dec. 5, 2002.

(51) Int. Cl.
C08F 4/6392 (2006.01)
C08F 4/6592 (2006.01)
C08F 110/06 (2006.01)

(52) U.S. Cl. .......................... 526/127; 526/64; 526/73; 526/129; 526/134; 526/160; 526/170; 526/351; 526/943

(58) Field of Classification Search ................ 526/134, 526/160, 351, 348, 64, 73, 127, 129, 170, 526/943
See application file for complete search history.

(56) References Cited

U.S. PATENT DOCUMENTS

| | | | |
|---|---|---|---|
| 2,153,553 A | 4/1939 | Fawcett et al. ................. 260/94 |
| 2,852,501 A | 9/1958 | Richard, Jr. et al. ........ 260/94.9 |
| 3,294,772 A | 12/1966 | Cottle ......................... 260/93.7 |
| 3,725,378 A | 4/1973 | Chamberlin ............ 260/94.9 R |
| 4,135,044 A | 1/1979 | Beals ............................ 526/64 |
| 4,153,774 A | 5/1979 | Boettcher et al. ......... 526/352.2 |
| 4,530,914 A | 7/1985 | Ewen et al. .................. 502/113 |
| 4,794,004 A | 12/1988 | Pfleger et al. .................. 526/64 |
| 4,962,262 A | 10/1990 | Winter et al. ................ 585/512 |
| 5,026,798 A | 6/1991 | Canich ........................... 526/64 |
| 5,081,322 A | 1/1992 | Winter et al. .................... 585/9 |
| 5,084,534 A | 1/1992 | Welborn, Jr. et al. ........ 526/160 |
| 5,096,867 A | 3/1992 | Canich ......................... 502/103 |
| 5,272,236 A | 12/1993 | Lai et al. ................... 526/348.5 |
| 5,324,799 A | 6/1994 | Yano et al. |
| 5,324,800 A | 6/1994 | Welborn, Jr. et al. ........ 526/160 |
| 5,326,835 A | 7/1994 | Ahvenainen et al. .......... 526/64 |
| 5,382,630 A | 1/1995 | Stehling et al. .............. 525/240 |
| 5,382,631 A | 1/1995 | Stehling et al. .............. 525/240 |
| 5,391,654 A | 2/1995 | Ahvenainen et al. .......... 526/64 |
| 5,408,017 A | 4/1995 | Turner et al. ................ 526/134 |
| 5,416,153 A | 5/1995 | Winter et al. ................ 524/489 |
| 5,652,308 A | 7/1997 | Merrill et al. ................ 525/211 |
| 5,693,730 A | 12/1997 | Kuber et al. ................. 526/127 |
| 5,723,560 A | 3/1998 | Canich ......................... 526/351 |
| 5,723,705 A | 3/1998 | Herrmann et al. .............. 585/9 |
| 5,756,608 A | 5/1998 | Langhauser et al. ......... 526/127 |
| 5,840,644 A | 11/1998 | Kuber et al. ................. 502/117 |
| 5,866,663 A | 2/1999 | Brookhart et al. ........... 526/170 |
| 5,882,750 A | 3/1999 | Mink et al. ................. 428/35.7 |
| 5,936,053 A | 8/1999 | Fukuoka et al. ............. 526/351 |
| 5,962,719 A | 10/1999 | Winter et al. .................. 556/53 |
| 5,965,674 A | 10/1999 | Moen et al. ................... 526/61 |
| 5,969,062 A | 10/1999 | Moll et al. ................... 526/127 |
| 5,998,547 A | 12/1999 | Hohner ........................ 525/301 |
| 6,084,041 A * | 7/2000 | Andtsjo et al. ................ 526/64 |
| 6,124,231 A * | 9/2000 | Fritze et al. ................. 502/152 |
| 6,143,682 A | 11/2000 | Fisher ......................... 502/103 |
| 6,160,072 A | 12/2000 | Ewen .......................... 526/351 |
| 6,218,488 B1 | 4/2001 | Schiffino et al. ............ 526/133 |
| 6,225,432 B1 | 5/2001 | Weng et al. ................. 526/351 |

(Continued)

FOREIGN PATENT DOCUMENTS

CA 2 118 711 3/1993

(Continued)

OTHER PUBLICATIONS

Walther et al., "Metallocene-catalyzed polymerization in supercritical propylene," 4th International Symposium on High Pressure Process Technology and Chemical Engineering, Venice, Italy, Sep. 22-25, 2002.*

Walther, et al., "Metallocene-Catalyzed Polymerisation in Supercritical Propylene", Sep. 22-25, 2002 Venice-Italy, High Pressure in Venice, 4th International Symposium on High Pressure Process Technology and Chemical Engineering.

Abstract, P. Lehmus et al., "Metallocene-PP produced under supercritical polymerization conditions", and list of posters, 1st BlueSky Conference on Catalytic Olefin Polymerization, Jun. 17-20, 2002, Sorrento, Italy.

(Continued)

Primary Examiner—Roberto Rabago
(74) Attorney, Agent, or Firm—Catherine L. Bell; Michael S. Kerns

(57) ABSTRACT

This invention relates to a process to produce propylene polymers comprising contacting a metallocene catalyst compound and an activator in a reaction medium comprising propylene, from 0 to 30 volume % of one or more solvents and from 0 to 30 mole % of one or more comonomers, under temperature and pressure conditions below the melting point of the propylene polymer and where:
  a) the temperature is at or above the critical temperature for the reaction medium, and the pressure is at least 500 kPa above the critical pressure of the reaction medium; or
  b) the temperature is 1° C. or more above the critical temperature for the reaction medium, and the pressure is at or above the critical pressure of the reaction medium; or
  c) the temperature is 1° C. or more above the critical temperature for the reaction medium, and the pressure is at least 500 kPa above the critical pressure of the reaction medium.

23 Claims, No Drawings

U.S. PATENT DOCUMENTS

| | | | | |
|---|---|---|---|---|
| 6,300,451 | B1 | 10/2001 | Mehta et al. | 526/339 |
| 6,355,741 | B1 | 3/2002 | Marechal | 526/64 |
| 6,562,914 | B1 | 5/2003 | Andtsjo et al. | 526/64 |
| 2002/0012344 | A1 | 1/2002 | Agarwal et al. | 526/335 |
| 2004/0127654 | A1* | 7/2004 | Brandt et al. | 526/64 |

FOREIGN PATENT DOCUMENTS

| | | |
|---|---|---|
| CA | 2 103 694 | 2/1994 |
| DE | 41 30 299 A1 | 3/1993 |
| EP | 0 480 190 B1 | 4/1992 |
| EP | 0 603 232 B1 | 9/1992 |
| EP | 0 846 696 A1 | 6/1998 |
| EP | 0 887 380 | 12/1998 |
| EP | 0 987 279 A1 | 3/2000 |
| EP | 0 129 368 B2 | 4/2002 |
| EP | 1 195 391 A1 | 4/2002 |
| EP | 1 008 607 B1 | 12/2003 |
| JP | 0-216916 A | 9/1997 |
| JP | 96-208535 | 2/1998 |
| JP | 342 1202 | 4/1998 |
| JP | 1998-110003 A | 4/1998 |
| WO | WO 88/04672 A1 | 6/1988 |
| WO | WO 92/14766 A1 | 9/1992 |
| WO | WO 93/05082 A1 | 6/1993 |
| WO | WO 93/11171 A1 | 6/1993 |
| WO | WO 94/14856 A1 | 7/1994 |
| WO | WO 96/00246 A1 | 1/1996 |
| WO | WO 96/12744 A1 | 5/1996 |
| WO | WO 96/34023 A1 | 10/1996 |
| WO | WO 97/11098 A1 | 3/1997 |
| WO | WO 97/13790 A1 | 4/1997 |
| WO | 97/48737 | 12/1997 |
| WO | WO 97/45434 A1 | 12/1997 |
| WO | WO 98/33823 A1 | 8/1998 |
| WO | WO 99/02540 A1 | 1/1999 |
| WO | WO 99/29749 A1 | 6/1999 |
| WO | WO 99/32226 A1 | 7/1999 |
| WO | WO 00/12572 A1 | 3/2000 |
| WO | WO 00/37514 A1 | 6/2000 |
| WO | WO 00/40625 A1 | 7/2000 |
| WO | WO 00/50475 A1 | 8/2000 |
| WO | WO 00/64952 A2 | 11/2000 |
| WO | WO 01/44318 A1 | 6/2001 |
| WO | WO 01/46273 A1 | 6/2001 |
| WO | WO 02/50145 A1 | 6/2002 |
| WO | WO 02/070572 A2 | 9/2002 |
| WO | WO 02/090399 A1 | 11/2002 |

OTHER PUBLICATIONS

Abstract, Borealis publications, Lofgren et al., "*Metallocene-PP produced under supercritical conditions*", 1st BlueSky Conference on Catalytic Olefin Polymerization, Jun. 17-20, 2002, Sorrento, Italy (2002).
Abstract, Zowade et al., PL 159518, "*Manufacturing Low-molecular-weight Isotactic Polypropylene*", Sep. 1, 1989.
Alt, H.G. et al., "*Effect of the Nature of Metallocene Complexes of Group IV Metals on Their Performance in Catalytic Ethylene and Propylene Polymerization*", Chem. Rev. 100, 1998, pp. 1205-1221.
Akimoto, A., et al., "*New Developments in the Production of Metallocene LLDPE by High Pressure Polymerization*", Tosoh Corp., Metallocene-Based Polyolefins 2000 (conference proceedings), pp. 287-308 (John Wiley & Sons Ltd.).
Barnhart, R.W.et al., "*Synthesis of Branched Polyolefins Using a Combination of Homogeneous Metallocene Mimics*", J. Am. Chem. Soc. 1998, vol. 120, pp. 1082-1083.
Bergemann, C., R. et al., "*Copolymerization of Ethylene and 1,5-hexadiene under High Pressure Catalyzed by a Metallocene*", J. Mol. Catal. A: Chemical 116, 1997, pp. 317-322 (Elsevier).
Bergemann, C., R. et al., "*Copolymerization of Ethylene and Linear α-Olefins with a Metallocene Catalyst System under High Pressure, Part II. Comparison of Propene, 1-Butene, 1-Hexene, and 1-Decene*", J. Mol. Catal. A: Chemical 105, 1996, pp. 87-91.
Britovsek, G.J.P. et al., "*The Search for New-Generation Olefin Polymerization Catalysts: Life Beyond Metallocenes*", Chemie Intl. Edn., 1999, vol. 38, pp. 428-447.
Bujadoux, G.K., "*Use of Bridged and Non-Bridged Metallocene Catalysts in High Pressure/High Temperature Ethylene/α-Olefin Copolymerization*", Metallocenes 95 Intl. Congr, Metallocene Polym. 1995, pp. 375-402, Schotland Bus. Rsrch. Publ.
Chen, E. Y-X. et al., "*Cocatalysts for Metal-Catalyzed Olefin Polymerization: Activators, Activation Processes, and Structure-Activity Relationships*", Chem. Rev. 2000, vol. 100, pp. 1391-1434.
Coates, G.W., "*Precise Control of Polyolefin Stereochemistry Using Single Site Metal Catalysts*", Chem. Rev. 100, 2000, pp. 1223-1252.
Cottom, W.P., "*Waxes*", in Encyclo. Chem. Tech., vol. 25, pp. 614-626, Fourth edition, 1991.
Eckstein A. et al., "*Determination of Plateau Moduli and Entanglement Molecular Weights of Isotactic, Syndiotactic, and Atactic Polypropylenes Synthesized with Metallocene Catalysts*", Macromolecules 31, 1998, pp. 1335-1340.
Ewen, J.A. et al., "*Syndiospecific Propylene Polymerizations with Group 4 Metallocenes*", J. Am. Chem. Soc., 1988, vol. 110, pp. 6255-6256.
Gotz, C. et al., "*MAO-Free Metallocene Based Catalysts in High Pressure Polymeriszation of Ethylene and 1-Hexene*", Chem. Eng. Technol., 21, 1998, pp. 954-957 (Wiley-VCH Verlag GmbH).
Hauptman, E. et al., "*Stereoblock Polypropylene: Ligand Effects on the stereospecificity of 2-Arylindene Zirconocene Catalysts*", J. Am. Chem. Soc. 1995, vol. 117, pp. 11586-11587.
Ittel, S.D. et al., "*Late Metal Catalysts for Ethylene Homo- and Copolymerization*", Chem. Rev. 2000, vol. 100, pp. 1169-1203.
Janiak, C.; "*Metallocene Catalysts for Olefin Polymerization*", Metallocenes: Synthesis, Ractivity, and Applications, vol. 2, Wiley-VCH, 1998, pp. 547-614, A. Togni and R.L. Halterman, editors.
Luft, G., "*Development of Metallocene Catalysts and their Application in the High Pressure Polymerisation Process*", (Darmstadt University of Technology), PE '99, World Congress Global Technology Update Forum, Mar. 15-16, 1999, Zurich, Switzerland.
Resconi, L. et al., "*Selectivity in Propene Polymerization with Metallocene Catalysts*", Chem. Rev. 2000, vol. 100, pp. 1253-1345.
Schaverien, C.J. et al., "*Ethylene Bis(2-indenyl) Zirconocenes: A New Class of Diastereomeric Metallocenes for the (Co) Polymerization of α-Olefins*", Organometallics 2001, vol. 20, No. 16, pp. 3436-3452, (ACI, Columbus, Ohio), Aug. 2001.
Scollard, J.D. et al., "*Polymerization of α-Olefins by Chelating Diamide Complexes of Titanium*", Macromolecules, 1996, vol. 29, pp. 5241-5243.
Smith, B.D. et al., "*Thermodynamic Data for Pure Compounds Part A, Hydrocarbons and Ketones Physical Sciences Data*", vol. 25, Elsevier, New York, 1986, pp. 308-309.
Stephenson et al., "*Handbook of the Thermodynamics of Organic Compounds*", Elsevier Science Publ. NY, p. 75, 1987.
Stratton, A.W., "*Waxes*", in Encyclo. Polymer Science and Eng., vol. 17, pp. 784-795, Second Edition, 1985.
Suzuki, N. et al., "*Olefin Polymerization Using Highly Congested Ansa-Metallocenes Under High Pressure: Formation Of Superhigh Molecular Weight Polyolefins*", Macromolecules, 2000, vol. 33, No. 3, pp. 754-759.
Yano, A., et al., "*Homo- and Copolymerization of Ethylene at High Temperature with Cationic Zirconocene Catalysts*", Macromol. Chem. Phys. 200, No. 4, pp. 917-923 (Wiley-VCH Verlag GmbH, 1999).
Yano, A., et al., "*Homo- and Copolymerization of Ethylene by Cationic Hafnocene Catalysts based on Tetrakis(pentafluorophenyl)*", Macromol. Chem. Phys. 200, No. 4, 1999, pp. 924-932, (Wiley-VCH Verlag GmbH).
Yano, A., et al., "*Novel Zirconocene Catalysts for the Production of High molecular Weight LLDPE in High Temperature Polymerization*", Macromol. Chem. Phys. 200, No. 4, 1999, pp. 933-941, (Wiley-VCH Verlag GmbH).
U.S. Appl. No. 10/667,585, filed Sep. 22, 2003, entitled "*Polymer Production at Supercritical Conditions*", by Patrick Brant, et al.

\* cited by examiner

SUPERCRITICAL POLYMERIZATION PROCESS AND POLYMERS PRODUCED THEREFROM

PRIORITY CLAIM

This application claims priority to U.S. Ser. No. 60/431,077, filed Dec. 5, 2002.

BACKGROUND OF INVENTION

1. Field of Invention

The present invention relates to branched crystalline polymers, preferably polypropylene (BCPP) compositions and supercritical polymerization processes for the preparation of such compositions.

2. Description of Related Art

Various processes have been proposed for making polypropylene compositions. Such different processes will typically have different variables and parameters, including different monomer compositions, solvents, additives, reaction conditions, catalyst systems, etc. The properties and characteristics of the final product have a great deal to do with the process variables and parameters that are selected, and it has been recognized that small modifications in such variables and parameters can create significant differences in not only the final product, e.g., polymer properties, but also in the effectiveness of the overall process, e.g., catalyst productivity, presence or absence of gel.

An ongoing need exists for processes that provide polypropylene with good processability and high melt strength, which is desirable for applications such as thermoforming, foaming, and blow molding. Poor melt strength of polypropylenes shows up as excess sag in sheet extrusion, rapid thinning of walls in parts thermoformed in the melt phase, low draw-down ratios in extrusion coating, poor bubble formation in extrusion foam materials, and relative weakness in large-part blow molding. Thus, it would be highly desirable to produce a polypropylene having enhanced melt strength as well as commercially valuable processability.

Furthermore, a need exists for a relatively straightforward method of preparing polypropylene having desirable properties, particularly a method for making a branched polymer that does not require the use of a cross-linking agent, e.g., post-polymerization treatments, or the use of comonomers that have been found to result in undesirable gel formation, such as certain types of diene comonomers. Finally, there is a need for a process demonstrating high catalyst productivity in forming the polymers described herein.

Additional references of interest include: U.S. Pat. No. 6,084,041, U.S. Pat. No. 5,969,062, U.S. Pat. No. 5,408,017, WO 93/11171, U.S. Pat. No. 6,355,741, WO 92/14766, U.S. Pat. No. 5,326,835, German Application DE 4,130,299 (equivalent to CA 2,118,711), *Olefin Polymerization Using Highly Congested ansa-Metallocenes under High Pressure: Formation of Superhigh Molecular Weight Polyolefins*, Suzuki, et al., Macromolecules, 2000, 33, 754-759, EP 1 123 226, WO 00 12572, WO 00 37514, EP 1 195 391, U.S. Pat. No. 6,355,741, and *Ethylene Bis(Indenyl)Zirconocenes . . .*, Schaverien, C. J. et al., Organometallics, ACS, Columbus Ohio, vol 20, no. 16, August 2001, pg. 3436-3452, WO 96/34023, WO 97/11098, U.S. Pat. No. 5,084,534, U.S. Pat. No. 2,852,501, WO 93/05082, EP 129 368 B1, WO 97/45434, JP 96-208535 199660807, U.S. Pat. No. 5,096,867, WO 96/12744, U.S. Pat. No. 5,408,017, U.S. Pat. No. 5,084,534, U.S. Pat. No. 6,225,432, WO 02/090399, EP 1 195 391, WO 02/50145, US 2002 013440, WO 01/46273, JP 10110003, and EP 1 008 607; JP 101 1003; and JP 3421202.

Another item of interest is an abstract obtained from the Borealis website that stated:

Barbo Loefgren, E. Kokko, L. Huhtanen, M Lahelin, Petri Lehmus, Udo Stehling "Metallocene-PP produced under supercritical conditions." 1st Bluesky Conference on Catalytic Olefin Polymerization, 17.-20.6.2002, Sorrrento, Italy., ( ), 2002. "mPP produced in bulk conditions (100% propylene), especially at elevated temperature and under supercritical conditions, shows rheological behaviour indicative for small amounts of LCB in the polymer. This is a feature that can be utilized to produce mPP with enhanced melt strength under industrially meaningful conditions."

SUMMARY OF INVENTION

This invention relates to a process to produce propylene polymers comprising contacting a metallocene catalyst compound and an activator in a reaction medium comprising propylene, from 0 to 30 volume % of one or more solvents and from 0 to 30 mole % of one or more comonomers, under temperature and pressure conditions below the melting point of the propylene polymer and where:

a) the temperature is at or above the critical temperature for the reaction medium, and the pressure is at least 500 kPa above the critical pressure of the reaction medium; or b) the temperature is 1° C. or more above the critical temperature for the reaction medium, and the pressure is at or above the critical pressure of the reaction medium; or c) the temperature is 1° C. or more above the critical temperature for the reaction medium, and the pressure is at least 500 kPa above the critical pressure of the reaction medium, provided that when the metallocene catalyst compound is 1,2-ethylene bis(indenyl)zirconium di chloride supported on silica or the metallocene catalyst compound is dimethylsilylbis(indenyl) zirconium dichloride supported on silica then the activator is not methyl alumoxane.

This invention further relates to the polymers produced by the above process.

DETAILED DESCRIPTION

In one or more specific embodiments, a process of preparing a polymer composition that includes branched crystalline polypropylene is described, which includes: contacting a metallocene catalyst compound with a polymerization medium that includes propylene monomers; and conducting polymerization of the propylene monomers under supercritical conditions for a time sufficient to provide branched crystalline polypropylene that has from 0.0 wt % to 2.0 wt % ethylene and a heat of fusion of 70 J/g or more.

Also described is a process of preparing a polymer composition that includes branched crystalline polypropylene, which includes: combining a metallocene catalyst compound with propylene monomers in a polymerization medium having less than 30 volume percent diluent; conducting polymerization of the propylene monomers in the polymerization medium at a reaction temperature of over 92° C. to form branched crystalline polypropylene; and recovering a branched crystalline polypropylene that has from 0.0 wt % to 2.0 wt % ethylene and a heat of fusion of 70 J/g or more.

Also described is a process of preparing a branched crystalline polypropylene composition, which includes: contacting a polymerization mixture that includes propylene monomers and less than 30 volume percent diluent with a bridged metallocene compound that has at least two indenyl rings or derivatives of indenyl rings, each ring being substituted at the 2 and 4 positions; and conducting polymerization of the propylene monomers under supercritical conditions for a time sufficient to form a branched crystalline polypropylene composition having a heat of fusion of 70 J/g or more.

Also described herein is a process of preparing a branched crystalline polypropylene composition, which includes: combining a catalyst system that includes at least a metallocene compound with a polymerization mixture that includes propylene monomers and less than 30 volume percent diluent in a reactor system, and carrying out polymerization of the propylene monomers in the reactor system under supercritical conditions for a time sufficient to form a branched crystalline polypropylene, in which the metallocene compound is represented by the formula:

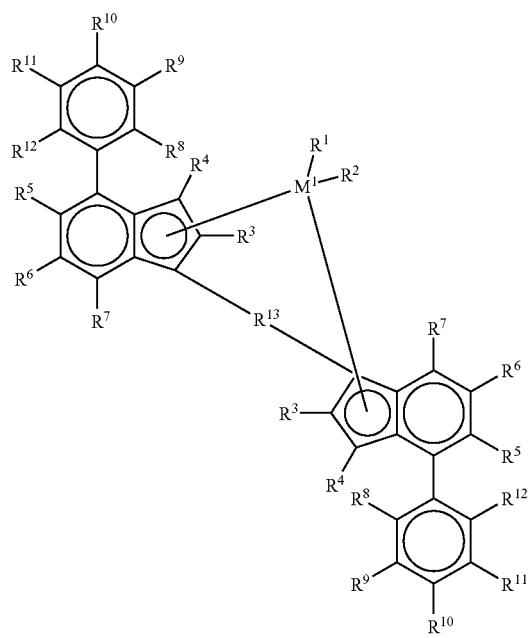

wherein:
M$^1$ is selected from the group consisting of titanium, zirconium, hafnium, vanadium, niobium, tantalum, chromium, molybdenum and tungsten;

R$^1$ and R$^2$ are identical or different, and are one of a hydrogen atom, a C$_1$-C$_{10}$ alkyl group, a C$_1$-C$_{10}$ alkoxy group, a C$_6$-C$_{10}$ aryl group, a C$_6$-C$_{10}$ aryloxy group, a C$_2$-C$_{10}$ alkenyl group, a C$_2$-C$_{40}$ alkenyl group, a C$_7$-C$_{40}$ arylalkyl group, a C$_7$-C$_{40}$ alkylaryl group, a C$_8$-C$_{40}$ arylalkenyl group, an OH group or a halogen atom; R$^1$ and R$^2$ may also be joined together to form an alkanediyl group or a conjugated C$_{4-40}$ diene ligand which is coordinated to M$^1$ in a metallocyclopentene fashion; R$^1$ and R$^2$ may also be identical or different conjugated dienes, optionally substituted with one or more hydrocarbyl, tri(hydrocarbyl)silyl groups or hydrocarbyl, tri(hydrocarbyl)silylhydrocarbyl groups, said dienes having up to 30 atoms not counting hydrogen and forming a π complex with M, examples include 1,4-diphenyl-1,3-butadiene, 1,3-pentadiene, 2-methyl-1,3-pentadiene, 2,4-hexadiene, 1-phenyl-1,3-pentadiene, 1,4-dibenzyl-1,3-butadiene, 1,4-ditolyl-1,3-butadiene, 1,4-bis(trimethylsilyl)-1,3-butadiene, and 1,4-dinaphthyl-1,3-butadiene;

Each R$^3$ is identical or different from the other R$^3$ and is each a hydrogen atom, a halogen atom, a C$_1$-C$_{10}$ alkyl group which may be halogenated, a C$_6$-C$_{10}$ aryl group which may be halogenated, a C$_2$-C$_{10}$ alkenyl group, a C$_7$-C$_{40}$-arylalkyl group, a C$_7$-C$_{40}$ alkylaryl group, a C$_8$-C$_{40}$ arylalkenyl group, a —NR'$_2$, —SR', —OR', —OSiR'$_3$ or —PR'$_2$ radical, wherein R' is one of a halogen atom, a C$_1$-C$_{10}$ alkyl group, or a C$_6$-C$_{10}$ aryl group;

R$^4$ to R$^{12}$ are identical or different and are hydrogen, or are as defined for R$^3$ or two or more adjacent radicals R$^5$ to R$^7$ together with the atoms connecting them form one or more rings;

R$^{13}$ is

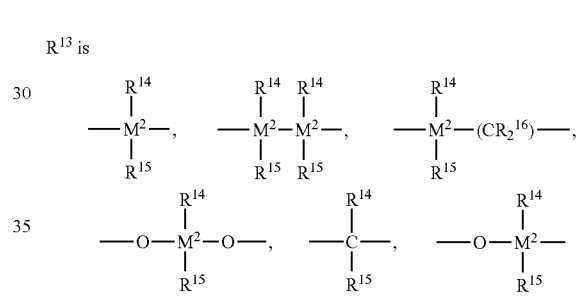

—B(R$^{14}$)—, —Al(R$^{14}$)—, —Ge—, —Sn—, —O—, —S—, —SO—, —SO$_2$—, —N(R$^{14}$)—, —CO—, —P(R$^{14}$)—, or —P(O)(R$^{14}$)—;

wherein: R$^{14}$, R$^{15}$ and R$^{16}$ are identical or different and are a hydrogen atom, a halogen atom, a C$_1$-C$_{20}$ branched or linear alkyl group, a C$_1$-C$_{20}$ fluoroalkyl or silaalkyl group, a C$_6$-C$_{30}$ aryl group, a C$_6$-C$_{30}$ fluoroaryl group, a C$_1$-C$_{20}$ alkoxy group, a C$_2$-C$_{20}$ alkenyl group, a C$_7$-C$_{40}$ arylalkyl group, a C$_8$-C$_{40}$ arylalkenyl group, a C$_7$-C$_{40}$ alkylaryl group, or R$^{14}$ and R$^{15}$, together with the atoms binding them, form a cyclic ring;

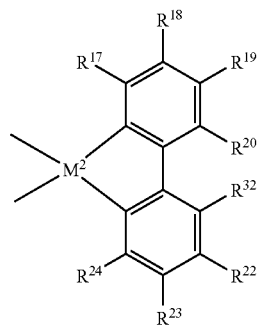

or, $R^{13}$ is represented by the formula:
wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings;

$M^2$ is one or more carbons, silicon, germanium or tin; and $R^8$, $R^9$, $R^{10}$, $R^{11}$ and $R^{12}$ are identical or different and have the meanings stated for $R^4$ to $R^7$.

Various specific embodiments, versions and examples of the invention will now be described, including preferred embodiments and definitions that are adopted herein for purposes of understanding the claimed invention. It is understood, however, that for purposes of assessing infringement, the scope of the "invention" will refer to the appended claims, including their equivalents, and elements or limitations that are equivalent to those that are recited. All references to the "invention" below are intended to distinguish claimed compositions and methods from compositions and methods not considered to be part of this invention. It is understood, therefore, that any reference to the "invention" may refer to one or more, but not necessarily all, of the inventions defined by the claims. References to specific "embodiments" are intended to correspond to claims covering those embodiments, but not necessarily to claims that cover more than those embodiments.

Definitions and Properties

Certain terms and properties, some of which appear in the claims, will now be defined, as used in this patent and for purposes of interpreting the scope of the claims. To the extent a term used in a claim is not defined below, it should be given the broadest definition persons in the pertinent art have given that term as reflected in printed publications and issued patents.

For purposes of this invention and the claims thereto, the critical temperatures (Tc) and critical pressures (Pc) are found in the Handbook of Chemistry and Physics, David R. Lide, Editor-in-Chief, 82nd edition 2001-2002, CRC Press, LLC. New York, 2001.

In particular the Tc and Pc of various molecules are:

| Name | Tc (° K.) | Pc (MPa) | Name | Tc (° K.) | Pc (MPa) |
|---|---|---|---|---|---|
| Hexane | 507.6 | 3.025 | Propane | 369.8 | 4.248 |
| Isobutane | 407.8 | 3.640 | Toluene | 591.8 | 4.11 |
| Ethane | 305.3 | 4.872 | Methane | 190.56 | 4.599 |
| Cyclobutane | 460.0 | 4.98 | Butane | 425.12 | 3.796 |
| Cyclopentane | 511.7 | 4.51 | Ethylene | 282.34 | 5.041 |
| 1-butene | 419.5 | 4.02 | Propylene | 364.9 | 4.60 |
| 1-pentene | 464.8 | 3.56 | Cyclopentene | 506.5 | 4.80 |
| Pentane | 469.7 | 3.370 | Isopentane | 460.4 | 3.38 |
| Benzene | 562.05 | 4.895 | Cyclohexane | 553.8 | 4.08 |
| 1-hexene | 504.0 | 3.21 | | | |

0° C.=273.2° K.

As used herein, the term "solvent" is defined broadly, to refer to any liquid medium in which any of the polymerization reactions described herein can take place, but not including any liquid material that is polymerized, such as monomers. The term "solvent" includes diluents, which are preferably inert, and specifically includes the solvents and diluents disclosed in Weng et al., U.S. Pat. No. 6,225,432.

The definition of the term "reactor system" used herein is any vessel, structure, enclosure, or combinations thereof in which a polymerization reaction is capable of taking place, and also includes any vessel or combination of vessels in which the various polymerization processes described herein take place, in whole or in part. A reactor system can thus be or include a single reactor vessel, or multiple reactor vessels, e.g., series or parallel reactors.

The term "metallocene" is defined broadly as a compound represented by the formula $Cp_mMR_nXq$. The symbol "Cp" refers to either a cyclopentadienyl ring, which may be substituted or unsubstituted, or a cyclopentadienyl ring derivative, such as an indenyl ring, which may also be substituted or unsubstituted. As discussed in greater detail below, a preferred metallocene compound includes two cyclopentadienyl rings, is sometimes referred to as a "bis-cyclopentadienyl" metallocene, and preferred cyclopentadienyl derivatives are bis-indenyl and bis-tetrahydroindenyl metallocene compounds. The symbol "M" refers to a Group 4, 5, or 6 transition metal, for example, titanium, zirconium, hafnium, vanadium, niobium, tantalum, chromium, molybdenum and tungsten. The symbol "R" in the general formula above refers to a hydrocarbyl group, e.g., methyl, or a hydrocarboxy group, each of which may have from one to 20 carbon atoms. The symbol "X" refers to a halogen, e.g., chlorine, bromine, or fluorine. The letter "m" can represent 1, 2, or 3; the letter "n" can represent 0, 1, 2, or 3; and the letter "q" can represent 0, 1, 2, or 3. The sum of m+n+q should be equal to the oxidation state of the transition metal. Examples of metallocene compounds are found in U.S. Pat. Nos. 4,530,914; 4,542,199; 4,769,910; 4,808,561; 4,871,705; 4,892,851; 4,933,403; 4,937,299; 5,017,714; 5,057,475; 5,120,867; 5,132,381; 5,155,080; 5,198,401; 5,278,119; 5,304,614; 5,324,800; 5,350,723; 5,391,790; 6,376,410; 6,376,412; 6,380,120; 6,376,409; 6,380,122; and 6,376,413. The portions of those patents describing the metallocene compounds and the ingredients and procedures for making and using such compounds are incorporated herein by reference. As discussed in greater detail below, preferred metallocene catalyst compounds are subsets of the general metallocene category, particularly those that provide the desired combinations of properties, as well as those that have demonstrated remarkably high productivities.

An important feature of one or more specific embodiments of the invention relates to the formation of crystalline polymers that are "branched," at least to some degree. Various procedures have been published, and either are or will be available to identify whether a polymer is branched or not, and a polymer is regarded herein as being "branched" to the extent branching can be detected, regardless of the method or equipment used for such detection. Preferably, the crystalline polypropylene is branched to a degree that it can be measured quantitatively, and even more preferably expressed in terms of a branching index. A well known branching index for monodisperse polymers is used herein, referred to herein as "Branching Index," also known as g', which is defined as the ratio of intrinsic viscosities of the branched to linear molecules, i.e., $g'=[\eta]_{br}/[\eta]_{lin}$. The term "$\eta$" stands for intrinsic solution viscosity. The term "$[\eta]_{br}$" is the intrinsic viscosity for the branched polymer molecule, and the term "$[\eta]_{lin}$" is that for a linear polymer molecule of equal molecular weight. For polydisperse samples the Branching Index is an average branching index, $<g'>_{avg}$, defined as:

$$<g'>_{avg} = \frac{[\eta]_{branched}}{[\eta]_{linear}} = \frac{\sum_{i=1}^{N} C_i \times [\eta]_i}{\sum_{i=1}^{N} C_i \times [k \times M_i^a]}$$

Here, the index i refers to a given polymer fraction, $M_i$ is the molecular weight of that fraction as measured by light scattering, $[\eta]_i$ is the intrinsic viscosity of that fraction measured by viscometry, $C_i$ is the concentration of that fraction, and "k" and "a" are the Mark Houwink coefficients for a linear polymer of the same chemical species. These quantities are measured by a GPC setup with online light scattering, viscometer, and concentration detectors. A polymer sample having branching will have intrinsic viscosity that deviates from that of a linear polymer. If a polymer sample is linear, the branching index, g', will be 1.0 (+/−0.02). If a polymer sample is branched, the average branching index will be less than 1. A lower branching index indicates more branching. In practice, average deviation levels can be calculated from GPC-3D method involving three different detectors on line—LALLS, Viscometry, DRI—to measure, respectively, the molecular weights, viscosity, and concentration of the polymer solution. First, the GPC-LALLS data is used to measure molecular weight averages ($M_w$, $M_z$). The respective intrinsic viscosity of the polymer solution, "$\eta$" is obtained from the viscometer data while the concentration at each data point is provided by the DRI technique. Finally the "$\eta$" is related to absolute molecular weight. Weight-average values of g' are to be calculated from the data points that fall in the range of from the characteristic $M_w$ of the polymer examined to the upper limit of 2,000,000 Daltons. For any case in which some values of $M_w$ are below 100,000 Daltons, the weight average is calculated using only those points between 100,000 Daltons and 2,000,000 Daltons. To calculate the branching index for polypropylene that includes at least some ethylene monomer units, the following equations should be used: g'=1.18 w, where "w" is the weight fraction of ethylene.

As used herein, the term "polypropylene" means a polymer made of at least 50% propylene units, preferably at least 70% propylene units, more preferably at least 80% propylene units, even more preferably at least 90% propylene units or 95% propylene units, and most preferably essentially 100% propylene units, which polypropylene is referred to as a "homopolymer." In one or more specific embodiments described herein, a "polypropylene" referenced herein may have 65 wt % or more propylene; or 80 wt % or more propylene; or 90 wt % or more propylene; or 97 wt % or more propylene.

A polypropylene polymer made according to the processes described herein is distinguishable from polymers that are sometimes described in the scientific or patent literature as "polypropylene" but which contain undesirably high levels of ethylene. It has been recognized that even relatively small amounts of ethylene monomer can have a significant or substantial effect on final polymer properties. Accordingly, as used herein, the term "polypropylene" also refers to a polypropylene polymer with no more than 3.0 wt % ethylene; or no more than 2.5 wt % ethylene. Preferably, the polypropylenes described herein have no more than 2.0 wt % ethylene; or no more than 1.5 wt % ethylene; or no more than 1.0 wt % ethylene.

As used herein, the term "linear polypropylene" means a polypropylene having no detectable branching (quantitatively or qualitatively), preferably a Branching Index of 1.0 (+/−0.02).

As used herein, the term "branched polypropylene" (BCPP) means a polypropylene that is branched (detected quantitatively or qualitatively), and preferably has a Branching Index, based on measured data, of less than 1.0 (+/−0.02).

As used herein, the term "polymerization medium" (also called reaction medium) includes at least the monomers that form the polypropylene polymer, and may also include solvents (including diluents), which are preferably present only in a limited amount. For example, for bulk polymerization embodiments of the processes, the amount of solvent (including diluents) is preferably negligible or even nonexistent, but the polymerization medium may optionally include amounts of solvent, preferably as specified herein. After polymerization has begun, the term "polymerization medium" also includes any products of polymerization, e.g., macromer polymers as well as the final polypropylene product, e.g., a branched crystalline polypropylene. The term "polymerization medium" does not include any part of the catalyst system, e.g., catalyst compounds, supports, activators, or scavengers. In certain embodiments of the process, the polymerization is conducted at temperatures above the critical temperature, e.g., temperatures ranging from 93° C. and above; or 95° C. and above; or 98° C. and above; or at 100° C. and above. The critical point for a particular polymerization medium can vary, depending on such factors as the particular monomers present in the system, e.g., whether only propylene is present, or whether other monomers are also present; the monomer concentration, e.g., whether a solvent/diluent is present and if so, how much is present; and the temperature of the polymerization medium, e.g., reaction temperature. The critical temperature of pure polypropylene is considered to be 91.7° C., so that a polymerization conducted at 92° C., with pure propylene, should be operating at supercritical conditions. Any change in the monomers, or monomer concentration (e.g., presence of solvent/diluent) at that temperature, may affect whether supercritical conditions exist. In one or more preferred embodiments of the processes described herein, the polymerization medium includes no more than two phases. That is, the polymerization medium has a solid phase (e.g., which includes branched crystalline polypropylene) and a vapor/liquid phase, which is the phase that at subcritical conditions would be either a vapor phase or a liquid phase, or both. At supercritical conditions, however, the vapor and liquid phases are indistinguishable. In preferred embodiments, the temperature is maintained at a level that is sufficiently low so that the branched crystalline polypropylene does not melt; thus, at least some, or even all, of the products of polymerization are solid. Preferably, the branched crystalline polypropylene produced by the reactions described herein is in particle form, e.g., granules, and thus may be easily recovered. Preferably, to obtain the solid branched crystalline polypropylene, the reaction temperature is maintained below the product melting point. For example, the reaction temperature for the supercritical polymerizations described herein are preferably maintained at 92° C. or above and 160° C. or below; or more preferably at 95° C. or above and 155° C. or below.

The terms "two-phase polymerization system" or "two-phase polymerization medium" mean a system having two and, preferably, only two phases. In certain embodiments, the two phases are referenced as a "first phase" and a "second phase." In certain embodiments, the first phase is or includes a "monomer phase," which includes monomers and may also include solvent and some or all of the product of polymerization, but preferably does not include the branched crystalline polypropylene product. That is, for example, the monomer phase can be referred to as the "propylene phase." In certain embodiments, the second phase is or includes a solid phase, which may include products of polymerization, e.g., macromers and crystalline branched polypropylene, but not monomers, e.g., propylene. As noted above, none of the parts of the catalyst system are considered to be part of the polymerization medium, although certain parts of the catalyst system can obviously be solid, e.g., supported catalysts. Furthermore, it is contemplated that parts of the catalyst system may be liquid or vapor or part of the vapor/liquid phase that exists in certain embodiments of the process. Again, however, any part of the catalyst system is not defined as being part of the polymerization medium.

As used herein, the term "slurry polymerization" means a polymerization process that involves at least two phases, e.g., in which particulate, solid polymer (e.g., granular) is formed in a liquid or vapor polymerization medium, or in a liquid/vapor polymerization medium. Certain embodiments of the processes described herein are slurry polymerizations, e.g., processes in which the products of polymerization are solid. The polymerization products (e.g., polymers) in those processes preferably have melting points sufficiently high to avoid melting during polymerization, so that they can in many cases be recovered as granular polymer. A slurry polymerization may include solvent (i.e., which is also referred to as diluent), or it may be a bulk process, discussed below.

As used herein, the term "bulk process" means a polymerization process in which the polymerization medium consists entirely of or consists essentially of monomers and any products of polymerization that has taken place, e.g. macromers and polymers, but does not include solvent (i.e., which also means that no diluent is present), or includes minor amounts of solvent, defined as less than 50 volume percent, and preferably much less.

As used herein, the term "macromer" is defined as a polymeric structure that contains monomers, e.g., propylene monomer units. A macromer is a polymer with a relatively low molecular weight, in contrast with the fully formed polymer.

The amount of vinyl chain ends is determined by $^1$H NMR as set forth in Weng et al., Macromol. Rapid Commun. 2000, 21, 1103-07.

The terms "molecular weight" ($M_n$ and $M_w$) and "polydispersity" (Mw/Mn) are intended to broadly encompass molecular weights that are obtained, measured and/or calculated using any published procedure, except to the extent a particular procedure is specified herein. Preferably, the molecular weights are measured in accordance with the procedure described in the article by T. Sun et al., T. Sun, P. Brant, R. R. Chance, and W. W. Graessley, *Macromolecules*, Volume 34, Number 19, 6812-6820, (2001). For purposes of the claims to this invention, the Mw, Mn, Mz, Mw/Mn are all determined by GPC-DRI as described in T. Sun, P. Brant, R. R. Chance, and W. W. Graessley, *Macromolecules*, Volume 34, Number 19, 6812-6820, (2001).

The "melt flow rate" (MFR) is measured in accordance with ASTM D-1238 at 230° C. and 2.16 kg load.

A property that can be used to characterize the branched crystalline polypropylenes described herein is its heat of fusion (Hf). As used herein, the heat of fusion is measured using Differential Scanning Calorimetry (DSC), using the ASTM E-794-95 procedure and a DuPont DSC-912. About 10 mg of a sheet of the polymer pressed at approximately 230° C. is removed with a punch die and is annealed at room 25° C. for 48 hours. At the end of this period, the sample is placed in a Differential Scanning Calorimeter (Perkin Elmer 7 Series Thermal Analysis System) and cooled to about −70° C. The sample is heated at about 10° C./min to attain a final temperature of about 200° C. The thermal output is recorded as the area under the melting peak of the sample and is reported in Joules per gram as the heat of fusion. Melting temperature, 2nd melt, and crystallization temperature are also obtained using this DSC procedure.

The term "isotactic" as used herein is defined as referring to a polymer sequence in which more than 50% of adjacent monomers having groups of atoms that are not part of the backbone structure are located either all above or all below the atoms in the backbone chain, when the latter are all in one plane.

The term "syndiotactic" as used herein is defined as referring to a polymer sequence in which more than 50% of adjacent monomers which have groups of atoms that are not part of the backbone structure are located in some symmetrical fashion above and below the atoms in the backbone chain, when the latter are all in one plane.

The branched polypropylene polymers described herein are characterized as being "crystalline." The percent crystallinity (% X) of a propylene polymer is defined to be: % $X=(190 \text{ J/g}-Hf)/(190 \text{ J/g})$. For purposes of this invention the crystallinity of isotactic polypropylene homopolymer is defined herein to be 190 J/g. In preferred embodiments, propylene polymers produced herein have a percent crystallinity of 30% or more, preferably from 40% to 50%.

As used herein, the term "productivity" is defined as the weight of polymer produced per weight of the catalyst used in the polymerization process per 1 hour of polymerization time (e.g., grams polymer/gram catalyst/hr).

Specific Embodiments of Processes

Certain specific embodiments of the invention will now be discussed. As described in greater detail below, at least certain embodiments of the process result in crystalline branched polypropylene, and yet avoid the necessity for using diene comonomers, particularly those diene comonomers that result in gel formation, or for using hydrogen during polymerization, and yet provide a branched polypropylene that is crystalline and has high melt strength and other desirable properties. Furthermore, a branched polypropylene having desired properties is preferably formed during polymerization, e.g., in the reactor system. Thus, no post-polymerization treatment is required (e.g. no crosslinking is required to form branching). Also, no substantial amounts of hydrogen need be added.

In one or more specific embodiments, a process of preparing a polymer composition that includes branched crystalline polypropylene is described, which includes: contacting a supported metallocene catalyst compound with a polymerization medium that includes propylene monomers; and conducting polymerization of the propylene monomers under supercritical conditions for a time sufficient to provide branched crystalline polypropylene that has from 0.0 wt % to 2.0 wt % ethylene and a heat of fusion of 70 J/g or more.

Also described is a process of preparing a polymer composition that includes branched crystalline polypropylene, which includes: combining a metallocene catalyst compound with propylene monomers in a polymerization medium having less than 30 volume percent diluent; conducting polymerization of the propylene monomers in the polymerization medium at a reaction temperature that is above the critical temperature for propylene (91.4° C.), e.g., over 92° C., to form branched crystalline polypropylene; and recovering a branched crystalline polypropylene that has from 0.0 wt % to 2.0 wt % ethylene and a heat of fusion of 70 J/g or more.

Also described is a process of preparing a branched crystalline polypropylene composition, which includes: contacting a polymerization mixture that includes propylene monomers and less than 30 volume percent diluent with a bridged metallocene compound that has at least two indenyl rings or derivatives of indenyl rings, each ring being substituted at the 2 and 4 positions; and conducting polymerization of the propylene monomers under supercritical conditions for a time sufficient to form a branched crystalline polypropylene composition having a heat of fusion of 70 J/g or more.

Also described herein is a process of preparing a branched crystalline polypropylene composition, which includes: combining a catalyst system that includes at least a metallocene compound with a polymerization mixture that includes propylene monomers and less than 30 volume percent diluent in a reactor system, and carrying out polymerization of the propylene monomers in the reactor system under supercritical conditions for a time sufficient to form a branched crystalline polypropylene, in which: the metallocene compound is represented by the formula:

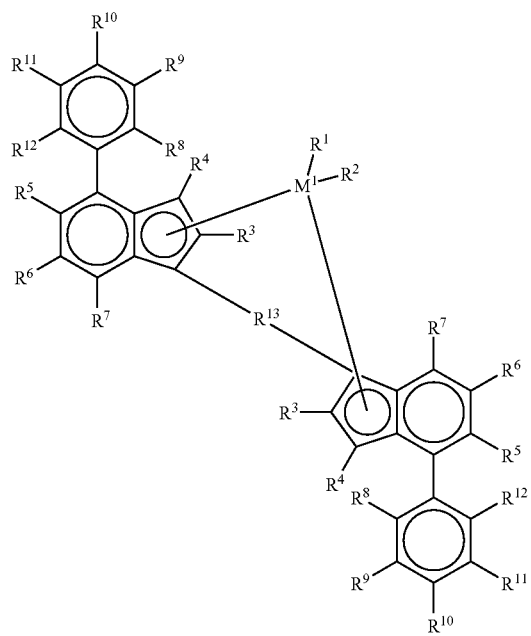

(I)

wherein:

$M^1$ is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_2$-$C_{40}$ alkenyl group, a $C_7$-$C_{40}$ arylalkyl group, a $C_7$-$C_{40}$ alkylaryl group, a $C_8$-$C_{40}$ arylalkenyl group, an OH group or a halogen atom; $R^1$ and $R^2$ may also be joined together to form an alkanediyl group or a conjugated $C_{4-40}$ diene ligand which is coordinated to $M^1$ in a metallocyclopentene fashion; $R^1$ and $R^2$ may also be identical or different conjugated dienes, optionally substituted with one or more hydrocarbyl, tri(hydrocarbyl)silyl groups or hydrocarbyl, tri(hydrocarbyl)silylhydrocarbyl groups, said dienes having up to 30 atoms not counting hydrogen and forming a π complex with M, examples include 1,4-diphenyl-1,3-butadiene, 1,3-pentadiene, 2-methyl-1,3-pentadiene, 2,4-hexadiene, 1-phenyl-1,3-pentadiene, 1,4-dibenzyl-1,3-butadiene, 1,4-ditolyl-1,3-butadiene, 1,4-bis(trimethylsilyl)-1,3-butadiene, and 1,4-dinaphthyl-1,3-butadiene;

Each $R^3$ is identical or different from the other $R^3$ and is each a hydrogen atom, a halogen atom, a $C_1$-$C_{10}$ alkyl group which may be halogenated, a $C_6$-$C_{10}$ aryl group which may be halogenated, a $C_2$-$C_{10}$ alkenyl group, a $C_7$-$C_{40}$-arylalkyl group, a $C_7$-$C_{40}$ alkylaryl group, a $C_8$-$C_{40}$ arylalkenyl group, a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group;

$R^4$ to $R^7$ are identical or different and are hydrogen, or are as defined for $R^3$ or two or more adjacent radicals $R^5$ to $R^7$ together with the atoms connecting them form one or more rings;

$R^{13}$ is

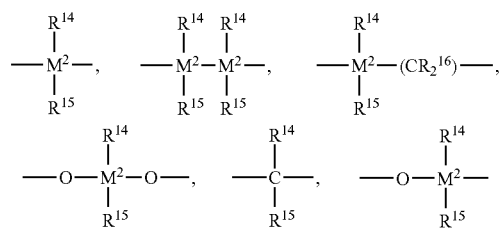

—B($R^{14}$)—, ⁻Al($R^{14}$)—, —Ge—, —Sn—, —O—, —S—, —SO—, —SO$_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

or, $R^{13}$ is represented by the formula:

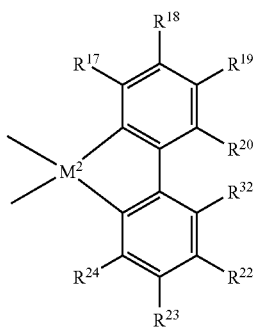

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings;

$M^2$ is one or more carbons, silicon, germanium or tin; and $R^8$, $R^9$, $R^{10}$, $R^{11}$ and $R^{12}$ are identical or different and have the meanings stated for $R^4$ to $R^7$.

In one or more of the processes described herein, the polymerization medium can have a first phase that includes propylene monomers and a second phase that includes the branched crystalline polypropylene.

In one or more of the processes described herein, the polymerization medium can have a first phase that includes propylene monomers and a second phase that includes the branched crystalline polypropylene, wherein the first phase has less than 30 volume percent diluent.

In one or more of the processes described herein, the polymerization medium can have a first phase that includes propylene monomers and a second phase that includes the branched crystalline polypropylene, wherein the second phase is a solid phase.

In one or more of the processes described herein, the polymerization medium can have a first phase that includes propylene monomers and macromers and a second phase that includes the branched crystalline polypropylene.

In one or more of the processes described herein, the polymerization of the propylene monomers is conducted at a pressure of 600 psi (4.14 mPa) or higher. Alternatively, the polymerization can be conducted at a pressure of 700 psi (4.83 mPa) or higher. Alternatively, the polymerization can be conducted at a pressure of 800 psi (15.52 mPa) or higher.

In one or more of the processes described herein, the polymerization of the propylene monomers can be conducted at a temperature of 95° C. or higher; or at a temperature of 100° C. or higher; or at a temperature ranging from 95° C. to 130° C.

This invention also relates to a process for preparing a polymer composition comprising: contacting a metallocene catalyst compound with a polymerization medium that includes propylene monomers; and conducting polymerization of the propylene monomers in the polymerization medium at a reaction temperature of over 92° C.; and recovering polypropylene that has from 0.0 wt % to 2.0 wt % ethylene, a heat of fusion of 70 J/g or more, and has a Branching Index of 0.96 or less.

In another preferred embodiment this invention relates to a process to produce propylene polymers comprising contacting a metallocene catalyst compound and an activator in a reaction medium comprising propylene, from 0 to 30 volume % of one or more solvents and from 0 to 30 mole % of one or more comonomers, under temperature and pressure conditions below the melting point of the propylene polymer and where:

a) the temperature is at or above the critical temperature for the reaction medium, and the pressure is at least 500 kPa above the critical pressure of the reaction medium; or b) the temperature is 1° C. or more above the critical temperature for the reaction medium, and the pressure is at or above the critical pressure of the reaction medium; or c) the temperature is 1° C. or more above the critical temperature for the reaction medium, and the pressure is at least 500 kPa above the critical pressure of the reaction medium, provided that when the metallocene catalyst compound is 1,2-ethylene bis(indenyl)zirconium di chloride supported on silica or the metallocene catalyst compound is dimethylsilylbis(indenyl) zirconium dichloride supported on silica then the activator is not methyl alumoxane. Preferably, the temperature is 2° C. or more above the critical temperature for the reaction medium, preferably 3° C. or more preferably, 4° C. or more preferably 5° C. or more, preferably 6° C. or more, preferably 7° C. or more, preferably 8° C. or more, preferably 9° C. or more, preferably 10° C. or more. Even more preferably the temperature is between 92 and 200° C., preferably 94 and 160° C., preferably 95 and 155° C., preferably 98 to 150° C., preferably 100 to 140° C., preferably 100 to 130° C. Preferably the pressure is 500 kPa or more above the critical pressure for the reaction medium, preferably 1000 kPa or more, preferably 1500 kPa or more, preferably 2000 kPa or more, preferably 2500 kPa or more, preferably 3000 kPa or more, preferably 3500 kPa or more, preferably 4000 kPa or more, preferably 4500 kPa or more, preferably 5000 kPa or more. Even more preferably the pressure is between 4.6 and 10 MPa, preferably 5.00 and 9 MPa, preferably 5.30 and 8 MPa, preferably 5.50 and 7 MPa. Preferably solvent is present at 0 to 25 vol %, preferably 0 to 20, preferably 0 to 15 preferably 0 to 10 preferably 0 to 5, preferably, 0 to 4, preferably 0 to 3, preferably 0 to 2, preferably 0 to 1 vol %. In particularly preferred embodiments the temperature is between 94 and 130° C. and the pressure is between 5.0 and 7 MPa.

In one or more of the processes described herein, the branched crystalline polypropylene can have a crystallization temperature (Tc) of 100° C. or more. Alternatively, the branched crystalline polypropylene can have a crystallization temperature (Tc) or 105° C. or more. Alternatively, the branched crystalline polypropylene can have a crystallization temperature (Tc) of 110° C. or more; or the branched crystalline polypropylene can have a crystallization temperature (Tc) ranging from 105° C. to 110° C.

In one or more of the processes described herein, the branched crystalline polypropylene has a melting point (Tm) of 145° C. or more. Alternatively, the branched crystalline polypropylene has a melting point (Tm) of 150° C. or more; or a melting point (Tm) of 155° C. or more; or a melting point (Tm) of 160° C. or more; or a melting point (Tm) of from 145° C. to 160° C.

In one or more of the processes described herein, the branched crystalline polypropylene can have a Melt Flow Rate of 0.5 or more. Alternatively, the branched crystalline polypropylene can have a Melt Flow Rate of 0.7 or more; or a Melt Flow Rate of 1.0 or more; or a Melt Flow Rate of 1.5 or more.

In one or more of the processes described herein, the supported metallocene includes dimethylsilylbis(2-methyl-4-phenyl-1-indenyl)zirconium dimethyl. In a further alternative, the supported metallocene may include dimethylsilylbis(2-methyl-4-naphthyl-1-indenyl)zirconium dimethyl, and or dimethylsilylbis(2-methyl-4-naphthyl-1-indenyl)zirconium dichloride.

In one or more of the processes described herein, the supported metallocene includes a dimethylanilinium tetrakis (perfluorophyl) boron activator. Alternatively, the supported metallocene includes a methylaluminoxane (MAO).

In one or more of the processes described herein, the polymerization medium has less then 25 volume percent diluent; or less then 20 volume percent diluent; or less then 10 volume percent diluent.

In one or more of the processes described herein, the branched crystalline polypropylene has a propylene content of 97 wt % or more. In certain embodiments, the branched crystalline polypropylene has from 0.0 wt % to 0.01 wt % alpha omega dienes.

Preferably, the branched crystalline polypropylene formed by any of the processes described herein is isotactic or syndiotactic.

In one or more of the processes described herein, the metallocene catalyst compound is combined with propylene in the absence of hydrogen or in the presence of hydrogen in an amount of up to 1.0 mole % hydrogen in the reactor.

In one or more of the processes described herein, the heat of fusion of the branched crystalline polypropylene is 80 J/g or more. Alternatively, the heat of fusion of the branched crystalline polypropylene is 90 J/g or more. Alternatively, the heat of fusion of the branched crystalline polypropylene is 100 J/g or more.

In one or more of the processes described herein, the branched crystalline polypropylene has a Branching Index of 0.98 or less. Alternatively, the branched crystalline polypropylene has a Branching Index of 0.95 or less. Alternatively, the branched crystalline polypropylene has a Branching Index of 0.90 or less; or a Branching Index of 0.80 or less.

In one or more of the processes described herein, the metallocene catalyst compound is or includes a substituted or unsubstituted silyl bridged bis-indenyl metallocene.

In one or more of the processes described herein, the polymerization medium includes more than 70% propylene monomers by volume prior to the beginning of polymerization. Alternatively, the polymerization medium consists essentially of propylene monomers. Alternatively, the polymerization medium consists essentially of monomers and a substantially inert solvent or diluent. Preferably, the branched polypropylene produced by one or more of the processes described herein is a homopolymer.

Preferred propylene polymers produced typically comprise 0 to 50 mole % of a comonomer, preferably 1 to 40 mole %, preferably 2 to 30 mole %, preferably 4 to 20 mole %, preferably 5 to 15 mole %, preferably 5 to 10 mole %, and have a heat of fusion of 70 J/g or more, preferably 75 or more, preferably 80 or more, preferably 85 or more, preferably 90 or more, preferably 95 or more, preferably 100 or more, preferably 105 or more, and a Branching Index ($g'_{avg}$) of 0.98 or less, preferably 0.97 or less, preferably 0.96 or less, preferably 0.95 or less, preferably 0.94 or less, preferably 0.93 or less, more preferably 0.92 or less, more preferably 0.91 or less, more preferably 0.90 or less and one or more of:
1. a weight average molecular weight (as measured by GPC DRI) of 20,000 or more, preferably 50,000 to 2,000,000, preferably 100,000 to 1,000,000, preferably 150,000 to 900,000, preferably 200,000 to 800,000;
2. a melt flow rate of 0.5 dg/min or more, preferably 0.7 dg/min or more, preferably 1.0 dg/min or more, preferably between 0.1 and 500 dg/min;
3. a percent crystallinity (% X) of 30% or more, preferably between 40 and 50%;
4. a melting temperature of 145° C. or more, preferably 150° C. or more, preferably 155° C. or more, preferably between 145 and 160° C.;
5. a crystallization temperature of 100° C. or more, preferably 105° C. or more, preferably 110° C. or more, preferably from 105 to 110° C.;
6. an Mw/Mn (as measured by GPC DRI) of about 1 to 20, preferably about 1.5 to 8, preferably 2 to 4; and
7. a ratio of extensional viscosity at break to linear viscosity of 2.5 or more, preferably 3.0 or more, more preferably 3.5 or more at strain rates from 0.1 $\sec^{-1}$ to 1.0 $\sec^{-1}$ (as measured using a Rheometric Scientific RMS-800 in parallel plate oscillatory shear mode at 180° C. from 0.1 to 400 rad/seconds).

Other Specific Embodiments

An embodiment of a process covered by one or more of the claims below includes bulk polymerization of propylene monomers under supercritical conditions, e.g., at a temperature of 91.7° C. or higher, e.g., 92° C. or above, but preferably 160° C. or lower, to form branched crystalline polypropylene in situ, e.g., in the reactor system, preferably without any post-polymerization treatment. In any one of the bulk polymerization embodiments, there is preferably no solvent or diluent. Although in some embodiments, minor amounts of solvent or diluent can be present, those amounts should be less then 30 percent by volume of the polymerization medium, or less than 25 percent by volume, or less than 20 percent by volume, or less than 20 percent by volume, or less than 15 percent by volume, or less than 10 percent by volume or less than 5 percent by volume. The use of large amounts of solvents or diluents in a polymerization reaction can have various disadvantages, such as the added complexity of the solvent or diluent as well as the fact that the lesser amounts of monomer mean that a substantial amount of the material in the reactor system is not reactive at all, e.g., inert solvents or diluents. This in turn can affect the amount and microstructure of product produced.

Preferably, in one or more of the processes described herein, the materials participating in the polymerization are in two different phases, so that a two-phase system is employed. Not only are the supported catalysts part of a solid phase, but so are the branched crystalline polypropylene polymers, which are typically present in granular or particulate form. In certain embodiments, the polymerization medium itself (i.e., excluding the catalyst system) is defined as a two-phase system, with one of the phases (e.g., the first phase) being referred to herein as a "monomer phase" (since that phase includes the propylene monomers) and another of the phases (e.g., the second phase) being referred to a "solid phase," which includes the branched crystalline polypropylene.

Embodiments of the invention include a process for producing branched polypropylene by polymerizing propylene monomers above the critical point, i.e., above the critical temperature, and also above the critical pressure. For example, the polymerization should be conducted at temperatures greater than about 92° C. and at pressures greater than about 660 psi (4.55 MPa) in the presence of a supported metallocene catalyst, which is preferably a single type of metallocene catalyst of the type described herein. Preferably, the polypropylene incorporates branching during the polymerization reaction (due to the formation of macromers having vinyl terminated ends) and no post-polymerization treatment is required, e.g., no crosslinking is required to form branching.

Embodiments of the invention incorporate in-situ branching at temperatures greater than 92° C., preferably greater than 95° C. to produce polypropylene that is branched, e.g., exhibiting a Branching Index ($g'_{avg}$) of less than 1.0, preferably less than 0.98, more preferably less than 0.95, and even more preferably less than 0.90 less; or even less than 0.80. Since many of the processes disclosed herein do not require the addition of diene monomers or the use of post-polymerization steps, e.g., crosslinking or radiation treatment, to produce branched polypropylene, the process is advantageously less complicated than other polymerization processes. Nevertheless, if desired, certain embodiments of the process may further include the addition of diene or the use of post-polymerization steps.

As discussed above, certain processes described herein utilize temperatures and pressures greater than the critical temperature and the critical pressure for propylene, which are 91.7° C. and 660 psig (4.550 MPa), respectively. The critical temperature and pressure are directly related to the density of the monomer, e.g., the propylene concentration. Therefore, the polymerization rate of propylene depends on the propylene density. Below the critical point, propylene generally exists as pure vapor, pure liquid, or coexists as vapor and liquid. The liquid density of propylene is generally about 4 to about 5 times higher than density of the corresponding vapor at polymerization temperatures below the critical point, e.g., at about 70° C. At such temperatures, polymer granules are suspended in liquid propylene, and the vapor phase does not participate in the reaction. The effective monomer concentration remains constant as long as liquid propylene is present. As the polymerization temperature increases, the density of saturated vapor and liquid approach each other and become identical at the critical point. Therefore, the phase boundary disappears after the critical point and only single phase exists. As a result, the monomer concentration in this region depends on the number of moles of monomer in the vessel and the effective monomer density is the average total density, which may be much lower than liquid propylene density.

Although in other processes, higher temperatures generally result in increased polymerization rates, they also generally cause a substantial drop in the molecular weight of the polymer product, which is often viewed as a disadvantage or shortcoming. Maintaining high molecular weight is desirable for better performance of polypropylene end-use applications, so achieving such high molecular weight results in a product with good properties.

The branched crystalline polypropylenes of the present invention are preferably polymerized in the presence of supported metallocene catalysts. As described in greater detail below, the preferred metallocene catalysts retain high desired activity levels. In preferred embodiments of the processes, the catalyst activity (e.g., for the "second metallocene" described herein) is from 2000 to 8000 g/g; or more narrowly can be from 3000 to 5000 g/g; or more narrowly still can range from 3000 to 4000 g/g. In preferred embodiments of the processes, the activity of the second metallocene is greater than 4000 g/g; or greater than 5,000 g/g/; or greater than 6,000 g/g.

In one or more embodiments of the process described herein, the resulting BCPP not only has a desired amount of branching, but also preferably has a melt flow rate (MFR) within a particular range. That range may have a lower limit of 0.1 dg/min, 0.5 dg/min, or 1.0 dg/min; and the range may have an upper limit of 500 dg/min, 400 dg/min, 300 dg/min, 200 dg/min, 100 dg/min, 50 dg/min, or 35 dg/min, with the melt flow rate ranging from any lower limit to any upper limit, depending on which claimed invention is being referenced. Moreover, the BCPP preferably has a polydispersity within a particular range. That range may have a lower limit of 1.5 or 2.0, for example; and the range may have an upper limit of 15, 10, 8, 7, or 4 with the polydispersity ranging from any lower limit to any upper limit, depending on which claimed invention is being referenced.

In a preferred embodiment, polymerization of propylene monomers to form branched polypropylene occurs in a slurry polymerization process, which can also be a bulk process, e.g. no solvent present. The polymerization medium may include monomers, preferably only propylene monomers, but optionally also other monomers. However, diene monomers, such as alpha-omega dienes, are typically not be included. Also, while the polymerization medium prior to polymerization preferably contains only propylene, an inert solvent (including diluents) may optionally be present, in addition to various additives not directly involved in polymerization, such as scavengers. The inert solvent may be a hydrocarbon solvent, such as hexane, propane, isobutene, cycloalkane, or aromatic. The polymerization medium preferably includes 30% or more propylene monomers by volume, more preferably 70% or more propylene monomers by volume, and even more preferably 95% or more propylene monomers by volume. Most preferably, the polymerization medium consists entirely or at least essentially of propylene monomers. Preferably, the polymerization medium includes 70% or less inert solvent by volume, more preferably 30% or less inert solvent by volume, and even more preferably 5% or less inert solvent by volume. Most preferably, the polymerization medium does not contain a significant amount of inert solvent, or does not contain any inert solvent.

In at least one preferred embodiment, the only monomer subjected to polymerization, i.e., being part of the polymerization medium, is propylene. That is, no comonomer, e.g., diene or ethylene or other comonomers, are included. Also, in that embodiment, the polymerization medium is preferably contacted with a metallocene catalyst system (including activators, scavengers, and other compounds that assist in the catalysis), but the polymerization medium preferably does not contact (or include) any inert solvent (including any diluent). Thus, neither the propylene monomers nor the resulting macromers nor the final BCPP product should be dissolved or suspended in liquid other than the monomers or some product of polymerization. It is contemplated that such a process is of tremendous usefulness in large scale operations since fewer potential processing problems are likely to develop, e.g., problems relating to the addition of other materials that in the past have been used to provide crosslinking.

As used herein, the term "consisting essentially of" permits a process or composition in which minor amounts of inert or substantially non-reactive materials may be added, e.g., 10% by volume or less, or more preferably 5% or less or even 2% or less by volume. Thus, with the preferred process, at the beginning of polymerization, the polymerization medium should include at least about 80% by volume propylene, preferably 90% or more or more preferably 95% or more propylene.

In a preferred embodiment, the branched (BCPP) polypropylene is made of at least 50% propylene units; or at least 60 propylene units; or at least 70 propylene units; or at least 80 propylene units; or at least 90 propylene units; or at least 95 propylene units. More preferably, the BCPP polypropylene is either a homopolymer, consisting of only propylene units, or a polymer consisting essentially of propylene units, i.e., a polypropylene having trace or minor amounts of comonomer, including alpha-omega dienes and one or more alpha-olefins, such as ethylene or $C_4$-$C_{20}$ alpha-olefins, cyclics, or aromatics.

Embodiments of the BCPP polypropylene produced have a Branching Index of less than 1.0, preferably less than 0.98 or 0.95, more preferably less than 0.90, and even more preferably less than 0.80. Since the process disclosed herein does not require the addition of diene monomers or the use of post-polymerization steps (e.g., cross-linking agents or radiation treatments) to produce branched polypropylene, the process is advantageously less complicated than other processes. Nevertheless, the process may further include the addition of diene or the use of post-polymerization steps if increased, or different, branching is desired.

Embodiments of the BCPP polypropylene also have improved extensional viscosity, and improved shear thinning behavior in comparison to linear polypropylene. The BCPP polypropylene preferably has a ratio of extensional viscosity at break to linear viscosity of at least 2.5, more preferably at least 3.0, and most preferably at least 3.5 at strain rates from 0.1 second$^{-1}$ to 1.0 second$^{-1}$. Thus, the BCPP polypropylene has improved processability in comparison to linear polypropylene. Ratio of extensional viscosity at break and linear viscosity are determined are measured using a Rheometric Scientific RMS-800 in parallel plate oscillatory shear mode at 180° C. from 0.1 to 400 rad/seconds.

Embodiments of the BCPP polypropylene have increased melt strength in comparison to linear polypropylene. Thus, the BCPP polypropylene is well suited for thermoforming, foaming, blow molding, and other applications which require a melt strength higher than that of linear polypropylene. However, the BCPP polypropylene can be used in various applications, such as thermoforming, foaming, blow molding, extrusion coating, melt blowing, fiber spinning, viscosity modifiers for lube oils, wax crystal modifiers for hydrocarbon fuels, plasticizers, functionalization of polypropylenes, processing aids, thermoplastic elastomers, impact modifiers, compatibilizers, surface modifiers, wettable polypropylenes, high density polypropylenes, elastic polypropylenes. The BCPP polypropylene compositions and their blends with other polymers and/or materials may be used in any fabricated article, such as films, fibers, sheets, plaques, hoes, belts, tires, tapes, wovens, and other dimensional objects. The BCPP polypropylene compositions and their blends with other polymers and/or materials may also be used in radiation resistance articles, for example medical gowns and other medical garments and applications.

A preferred metallocene compound that is used in the processes described herein preferably includes or is a silyl-bridged bis-cyclopentadienyl metallocene, and more preferably a bisindenyl metallocene, e.g., a silyl-bridged bis-indenyl metallocene, which may be substituted. For example, a silyl-bridged bis-indenyl metallocene that is substituted at the 2-position and the 4-position is particularly preferred. Preferably, a silyl-bridged bis-indenyl metallocene that is substituted at the 2-position with a methyl group and at the 4-position with a phenyl group is used in the processes described herein. Preferred metallocene compounds are described in greater detail below, and when used alone preferably produce isotactic polypropylene.

However, at least certain embodiments of the process involve using a metallocene compound that, when used alone, i.e., without any other catalyst compound, is capable of producing syndiotactic, rather than isotactic polypropylene. Syndiotactic producing metallocenes are very well known in the art. For example, U.S. Pat. Nos. 6,184,326 and 4,892,851 describe such metallocenes in detail, along with methods for making them, and each such description is fully incorporated herein by reference. Common syndio-specific metallocenes are generally a combination of cyclopentadienyl and fluorenyl ligands, which may be substituted.

Particularly preferred metallocenes are bis-indenyl metallocenes, particularly those having the following general formula:

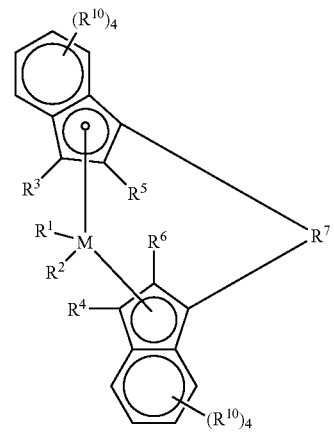

wherein: M is a metal of Group 4, 5, or 6 of the Periodic Table, preferably zirconium, hafnium and titanium, most preferably zirconium;

$R^1$ and $R^2$ are identical or different, preferably identical, and are one of a hydrogen atom, a $C_1$-$C_{10}$ alkyl group, preferably a $C_1$-$C_3$ alkyl group, a $C_1$-$C_{10}$ alkoxy group, preferably a $C_1$-$C_3$ alkoxy group, a $C_6$-$C_{10}$ aryl group, preferably a $C_6$-$C_8$ aryl group, a $C_6$-$C_{10}$ aryloxy group, preferably a $C_6$-$C_8$ aryloxy group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, or a halogen atom, preferably chlorine; or a conjugated diene which is optionally substituted with one or more hydrocarbyl, tri(hydrocarbyl) silyl groups or hydrocarbyl, tri(hydrocarbyl) silylhydrocarbyl groups, said diene having up to 30 atoms not counting hydrogen;

$R^5$ and $R^6$ are identical or different, preferably identical, are one of a hydrogen atom, a halogen atom, preferably a fluorine, chlorine or bromine atom, a $C_1$-$C_{10}$ alkyl group, preferably a $C_1$-$C_4$ alkyl group, which may be halogenated, a $C_6$-$C_{10}$ aryl group, which may be halogenated, preferably a $C_6$-$C_8$ aryl group, a $C_2$-$C_{10}$ alkenyl group, preferably a $C_2$-$C_4$ alkenyl group, a $C_7$-$C_{40}$ arylalkyl group, preferably a $C_7$-$C_{10}$ arylalkyl group, a $C_7$-$C_{40}$ alkylaryl group, preferably a $C_7$-$C_{12}$ alkylaryl group, a $C_8$-$C_{40}$ arylalkenyl group, preferably a $C_8$-$C_{12}$ arylalkenyl group, a —$NR_2^{15}$, —$SR^{15}$, —$OR^{15}$, —OSiR$_3^{15}$ or —PR$_2^{15}$ radical, wherein: R$^{15}$ is one of a halogen atom, preferably a chlorine atom, a C$_1$-C$_{10}$ alkyl group, preferably a C$_1$-C$_3$ alkyl group, or a C$_6$-C$_{10}$ aryl group, preferably a C$_6$-C$_9$ aryl group;

R$^7$ is

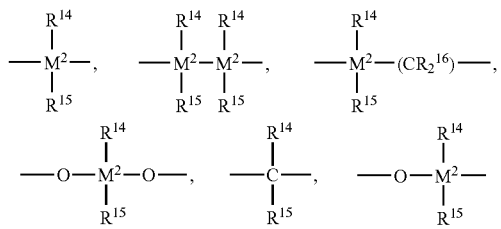

—B(R$^{14}$)—, —Al(R$^{14}$)—, —Ge—, —Sn—, —O—, —S—, —SO—, —SO$_2$—, —N(R$^{14}$)—, —CO—, —P(R$^{14}$)—, or —P(O)(R$^{14}$)—;

wherein: R$^{14}$, R$^{15}$ and R$^{16}$ are identical or different and are a hydrogen atom, a halogen atom, a C$_1$-C$_{20}$ branched or linear alkyl group, a C$_1$-C$_{20}$ fluoroalkyl or silaalkyl group, a C$_6$-C$_{30}$ aryl group, a C$_6$-C$_{30}$ fluoroaryl group, a C$_1$-C$_{20}$ alkoxy group, a C$_2$-C$_{20}$ alkenyl group, a C$_7$-C$_{40}$ arylalkyl group, a C$_8$-C$_{40}$ arylalkenyl group, a C$_7$-C$_{40}$ alkylaryl group, or R$^{14}$ and R$^{15}$, together with the atoms binding them, form a cyclic ring;

preferably, R$^{14}$, R$^{15}$ and R$^{16}$ are identical and are a hydrogen atom, a halogen atom, a C$_1$-C$_4$ alkyl group, a CF$_3$ group, a C$_6$-C$_8$ aryl group, a C$_6$-C$_{10}$ fluoroaryl group, more preferably a pentafluorophenyl group, a C$_1$-C$_4$ alkoxy group, in particular a methoxy group, a C$_2$-C$_4$ alkenyl group, a C$_7$-C$_{10}$ arylalkyl group, a C$_8$-C$_{12}$ arylalkenyl group, or a C$_7$-C$_{14}$ alkylaryl group;

or, R$^7$ is represented by the formula:

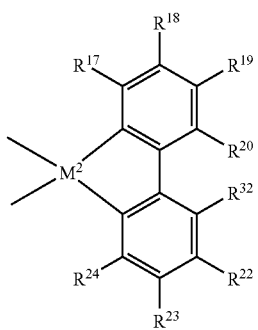

wherein: R$^{17}$ to R$^{24}$ are as defined for R$^1$ and R$^2$, or two or more adjacent radicals R$^{17}$ to R$^{24}$, including R$^{20}$ and R$^{21}$, together with the atoms connecting them form one or more rings; preferably, R$^{17}$ to R$^{24}$ are hydrogen;

M$^2$ is carbon, silicon, germanium or tin;

the radicals R$^3$, R$^4$, and R$^{10}$ are identical or different and have the meanings stated for R$^5$ and R$^6$, or two adjacent R$^{10}$ radicals are joined together to form a ring, preferably a ring containing from about 4-6 carbon atoms.

Particularly preferred metallocenes are those of the formula:

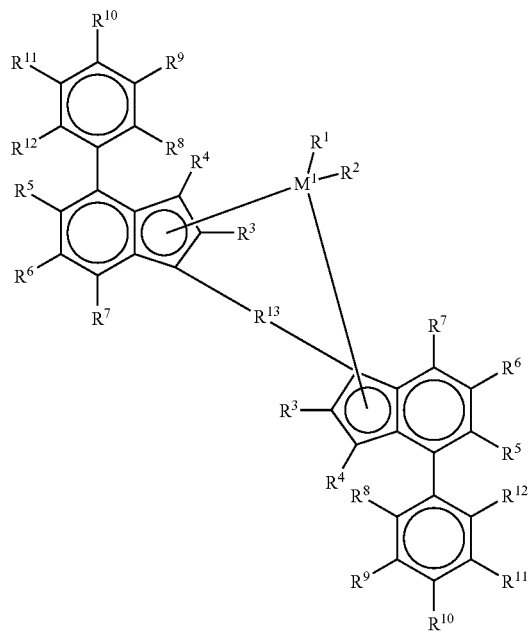

(I)

wherein: M$^1$ is selected from the group consisting of titanium, zirconium, hafnium, vanadium, niobium, tantalum, chromium, molybdenum and tungsten, preferably zirconium, hafnium or titanium, most preferably zirconium;

R$^1$ and R$^2$ are identical or different, and are one of a hydrogen atom, a C$_1$-C$_{10}$ alkyl group, a C$_1$-C$_{10}$ alkoxy group, a C$_6$-C$_{10}$ aryl group, a C$_6$-C$_{10}$ aryloxy group, a C$_2$-C$_{10}$ alkenyl group, a C$_2$-C$_{40}$ alkenyl group, a C$_7$-C$_{40}$ arylalkyl group, a C$_7$-C$_{40}$ alkylaryl group, a C$_8$-C$_{40}$ arylalkenyl group, an OH group or a halogen atom; R$^1$ and R$^2$ may also be joined together to form an alkanediyl group or a conjugated C$_{4-40}$ diene ligand which is coordinated to M$^1$ in a metallocyclopentene fashion; R$^1$ and R$^2$ may also be identical or different conjugated dienes, optionally substituted with one or more hydrocarbyl, tri(hydrocarbyl)silyl groups or hydrocarbyl, tri(hydrocarbyl)silylhydrocarbyl groups, said dienes having up to 30 atoms not counting hydrogen and forming a π complex with M, examples include 1,4-diphenyl-1,3-butadiene, 1,3-pentadiene, 2-methyl-1,3-pentadiene, 2,4-hexadiene, 1-phenyl-1,3-pentadiene, 1,4-dibenzyl-1,3-butadiene, 1,4-ditolyl-1,3-butadiene, 1,4-bis(trimethylsilyl)-1,3-butadiene, and 1,4-dinaphthyl-1,3-butadiene;

preferably R$^1$ and R$^2$ are identical and are a C$_1$-C$_3$ alkyl or alkoxy group, a C$_6$-C$_8$ aryl or aryloxy group, a C$_2$-C$_4$ alkenyl group, a C$_7$-C$_{10}$ arylalkyl group, a C$_7$-C$_{12}$ alkylaryl group, or a halogen atom, preferably chlorine;

R$^3$ are identical or different and are each a hydrogen atom, a halogen atom, a C$_1$-C$_{10}$ alkyl group which may be halogenated, a C$_6$-C$_{10}$ aryl group which may be halogenated, a C$_2$-C$_{10}$ alkenyl group, a C$_7$-C$_{40}$-arylalkyl group, a C$_7$-C$_{40}$ alkylaryl group, a C$_8$-C$_{40}$ arylalkenyl group, a —NR'$_2$, —SR', —OR', —OSiR'$_3$ or —PR'$_2$ radical, wherein R' is one of a halogen atom, a C$_1$-C$_{10}$ alkyl group, or a C$_6$-C$_{10}$ aryl group; preferably R$^3$ is not a hydrogen atom;

preferably each $R^3$ is identical and is a fluorine, chlorine or bromine, atom, a $C_1$-$C_4$ alkyl group which may be halogenated, a $C_6$-$C_8$ aryl group which may be halogenated, a —$NR'_2$, —$SR'$, —$OR'$, —$OSiR'_3$ or —$PR'_2$ radical, wherein R' is one of a chlorine atom, a $C_1$-$C_4$ alkyl group, or a $C_6$-$C_8$ aryl group;

$R^4$ to $R^7$ are identical or different and are hydrogen, or are as defined for $R^3$ or two or more adjacent radicals $R^5$ to $R^7$ together with the atoms connecting them form one or more rings, preferably a 6-membered ring, preferably 4-8 membered ring;

$R^{13}$ is

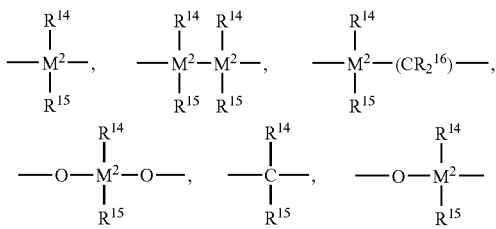

—$B(R^{14})$—, $^-Al(R^{14})$—, —Ge—, —Sn—, —O—, —S—, —SO—, —$SO_2$—, —$N(R^{14})$—, —CO—, —$P(R^{14})$—, or —$P(O)(R^{14})$—;

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring;

preferably, $R^{14}$, $R^{15}$ and $R^{16}$ are identical and are a hydrogen atom, a halogen atom, a $C_1$-$C_4$ alkyl group, a $CF_3$ group, a $C_6$-$C_8$ aryl group, a $C_6$-$C_{10}$ fluoroaryl group, more preferably a pentafluorophenyl group, a $C_1$-$C_4$ alkoxy group, in particular a methoxy group, a $C_2$-$C_4$ alkenyl group, a $C_7$-$C_{10}$ arylalkyl group, a $C_8$-$C_{12}$ arylalkenyl group, or a $C_7$-$C_{14}$ alkylaryl group;

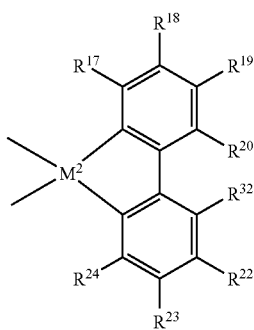

or, $R^{13}$ is represented by the formula:

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; preferably, $R^{17}$ to $R^{24}$ are hydrogen;

$M^2$ is one or more carbons, silicon, germanium or tin, preferably silicon;

$R^{13}$ may also be an amidoborane-type radical such as is described in WO00/20426 (herein fully incorporated by reference); and $R^8$, $R^9$, $R^{10}$, $R^{11}$ and $R^{12}$ are identical or different and have the meanings stated for $R^4$ to $R^7$.

In at least one embodiment, the transition metal of the metallocene compound is preferably zirconium. It is believed that polypropylene formed using zirconium metallocenes (zirconocenes) have increased catalyst activity in comparison to hafnocenes.

Preferred silyl-bridged bis-indenyl metallocenes include silyl-bridged bis-indenyl zirconocenes, such as the silyl-bridged bis-indenyl zirconocenes described above. An example of a preferred silyl-bridged bis-indenyl zirconocene is dimethylsilylbis(2-methyl-4-phenyl indenyl)zirconium dichloride. Another example is dimethylsilylbis(2-methyl-4-phenyl indenyl)zirconium dimethyl.

Preferred compounds for use in this invention include metallocene catalyst compounds represented by the formula: $L_z(Cp)(Q)M'''X_n$ where:

Cp is a substituted or unsubstituted cyclopentadienyl ring, a substituted or unsubstituted indenyl ring or a substituted or unsubstituted fluoreneyl ring;

Q is a heteroatom containing group;

z is 0 or 1;

L is a bridging group connecting Cp to Q,

M is a Group 4, 5, or 6 transition metal;

m is 3, 4, 5 or 6;

X is a halogen or a substituted or unsubstituted hydrocarbyl group, a substituted or unsubstituted hydrocarboxy group, or a substituted or unsubstituted heteroatom containing group; and n is m minus 2.

In a preferred embodiment, z is 1, L is represented by the formula: RqSi— where each R is, independently, a substituted or unsubstituted $C_1$ to $C_{20}$ hydrocarbyl group and q is 1, 2, 3 or 4; and Q is a nitrogen containing group.

In a preferred embodiment, the metallocene catalyst compound is represented by the formula: $L_z(Cp)_2M'''X_n$ where:

each Cp is independently a substituted or unsubstituted cyclopentadienyl ring, a substituted or unsubstituted indenyl ring or a substituted or unsubstituted fluoreneyl ring;

z is 0 or 1;

L is a bridging group connecting Cp to Q,

M is a Group 4, 5, or 6 transition metal;

m is 3, 4, 5 or 6;

X is a halogen or a substituted or unsubstituted hydrocarbyl group, a substituted or unsubstituted hydrocarboxy group, or a substituted or unsubstituted heteroatom containing group; and n is m minus 2.

In a preferred embodiment, z is 1, L is represented by the formula:

RqSi— where each R is, independently, a substituted or unsubstituted $C_1$ to $C_{20}$ hydrocarbyl group and q is 1, 2, 3 or 4; and both Cp groups are indenyl rings substituted at the 2 and 4 positions.

In a preferred embodiment the metallocene catalyst compound comprises one or more of:
dimethylsiladiyl(2-methyl, 4-[3',5'-di-tbutylphenyl]indenyl)$_2$zirconium dichloride;
dimethylsiladiyl(2-ethyl, 4-[3',5'-di-tbutylphenyl]indenyl)$_2$zirconium dichloride;
dimethylsiladiyl(2-n-propyl, 4-[3',5'-di-tbutylphenyl]indenyl)$_2$zirconium dichloride;
dimethylsiladiyl(2-iso-propyl, 4-[3',5'-di-tbutylphenyl]indenyl)$_2$zirconium dichloride;

dimethylsiladiyl(2-n-butyl, 4-[3',5'-di-tbutylphenyl]indenyl)₂zirconium dichloride;
dimethylsiladiyl(2-iso-butyl, 4-[3',5'-di-tbutylphenyl]indenyl)₂zirconium dichloride;
dimethylsiladiyl(2-sec-butyl, 4-[3',5'-di-tbutylphenyl]indenyl)₂zirconium dichloride;
dimethylsiladiyl(2-tert-butyl, 4-[3',5'-di-tbutylphenyl]indenyl)₂zirconium dichloride;
dimethylsiladiyl(2-methyl, 4-[3',5'-di-tbutylphenyl]indenyl)₂hafnium dichloride;
dimethylsiladiyl(2-ethyl, 4-[3',5'-di-tbutylphenyl]indenyl)₂hafnium dichloride;
dimethylsiladiyl(2-n-propyl, 4-[3',5'-di-tbutylphenyl]indenyl)₂hafnium
dimethylsiladiyl(2-iso-propyl, 4-[3',5'-di-tbutylphenyl]indenyl)₂hafnium dichloride;
dimethylsiladiyl(2-butyl, 4-[3',5'-di-tbutylphenyl]indenyl)₂hafnium dichloride;
9-silafluorendiyl(2-methyl, 4-[3',5'-di-tbutylphenyl]indenyl)₂zirconium dichloride;
9-silafluorendiyl(2-ethyl, 4-[3',5'-di-tbutylphenyl]indenyl)₂zirconium dichloride;
9-silafluorendiyl(2-n-propyl, 4-[3',5'-di-tbutylphenyl]indenyl)₂zirconium dichloride;
9-silafluorendiyl(2-iso-propyl, 4-[3',5'-di-tbutylphenyl]indenyl)₂zirconium dichloride;
9-silafluorendiyl(2-n-butyl, 4-[3',5'-di-tbutylphenyl]indenyl)₂zirconium dichloride;
9-silafluorendiyl(2-iso-butyl, 4-[3',5'-di-tbutylphenyl]indenyl)₂zirconium dichloride;
9-silafluorendiyl(2-sec-butyl, 4-[3',5'-di-tbutylphenyl]indenyl)₂zirconium dichloride;
9-silafluorendiyl(2-tert-butyl, 4-[3',5'-di-tbutylphenyl]indenyl)₂zirconium dichloride;
9-silafluorendiyl(2-methyl, 4-[3',5'-di-tbutylphenyl]indenyl)₂hafnium dichloride;
9-silafluorendiyl(2-ethyl, 4-[3',5'-di-tbutylphenyl]indenyl)₂hafnium dichloride;
9-silafluorendiyl(2-n-propyl, 4-[3',5'-di-tbutylphenyl]indenyl)₂hafnium dichloride;
9-silafluorendiyl(2-iso-propyl, 4-[3',5'-di-tbutylphenyl]indenyl)₂hafnium dichloride;
9-silafluorendiyl(2-n-butyl, 4-[3',5'-di-tbutylphenyl]indenyl)₂hafnium dichloride;
9-silafluorendiyl(2-iso-butyl, 4-[3',5'-di-tbutylphenyl]indenyl)₂hafnium dichloride;
9-silafluorendiyl(2-sec-butyl, 4-[3',5'-di-tbutylphenyl]indenyl)₂hafnium dichloride;
9-silafluorendiyl(2-tert-butyl, 4-[3',5'-di-tbutylphenyl]indenyl)₂hafnium dichloride;
dimethylsiladiyl(2-methyl, 4-[3',5'-di-tbutylphenyl]indenyl)₂zirconium dimethyl;
dimethylsiladiyl(2-ethyl, 4-[3',5'-di-tbutylphenyl]indenyl)₂zirconium dimethyl;
dimethylsiladiyl(2-n-propyl, 4-[3',5'-di-tbutylphenyl]indenyl)₂zirconium dimethyl;
dimethylsiladiyl(2-iso-propyl, 4-[3',5'-di-tbutylphenyl]indenyl)₂zirconium dimethyl;
dimethylsiladiyl(2-n-butyl, 4-[3',5'-di-tbutylphenyl]indenyl)₂zirconium dimethyl;
dimethylsiladiyl(2-iso-butyl, 4-[3',5'-di-tbutylphenyl]indenyl)₂zirconium dimethyl;
dimethylsiladiyl(2-sec-butyl, 4-[3',5'-di-tbutylphenyl]indenyl)₂zirconium dimethyl;
dimethylsiladiyl(2-tert-butyl, 4-[3',5'-di-tbutylphenyl]indenyl)₂zirconium dimethyl;
dimethylsiladiyl(2-methyl, 4-[3',5'-di-tbutylphenyl]indenyl)₂hafnium dimethyl;
dimethylsiladiyl(2-ethyl, 4-[3',5'-di-tbutylphenyl]indenyl)₂hafnium dimethyl;
dimethylsiladiyl(2-n-propyl, 4-[3',5'-di-tbutylphenyl]indenyl)₂hafnium dimethyl
dimethylsiladiyl(2-iso-propyl, 4-[3',5'-di-tbutylphenyl]indenyl)₂hafnium dimethyl;
dimethylsiladiyl(2-n-butyl, 4-[3',5'-di-tbutylphenyl]indenyl)₂hafnium dimethyl;
dimethylsiladiyl(2-iso-butyl, 4-[3',5'-di-tbutylphenyl]indenyl)₂hafnium dimethyl;
dimethylsiladiyl(2-sec-butyl, 4-[3',5'-di-tbutylphenyl]indenyl)₂hafnium dimethyl;
dimethylsiladiyl(2-tert-butyl, 4-[3',5'-di-tbutylphenyl]indenyl) 2hafnium dimethyl;
9-silafluorendiyl(2-methyl, 4-[3',5'-di-tbutylphenyl]indenyl)₂zirconium dimethyl;
9-silafluorendiyl(2-ethyl, 4-[3',5'-di-tbutylphenyl]indenyl)₂zirconium dimethyl;
9-silafluorendiyl(2-n-propyl, 4-[3',5'-di-tbutylphenyl]indenyl)₂zirconium dimethyl;
9-silafluorendiyl(2-iso-propyl, 4-[3',5'-di-tbutylphenyl]indenyl)₂zirconium dimethyl;
9-silafluorendiyl(2-n-butyl, 4-[3',5'-di-tbutylphenyl]indenyl)₂zirconium dimethyl;
9-silafluorendiyl(2-iso-butyl, 4-[3',5'-di-tbutylphenyl]indenyl)₂zirconium dimethyl;
9-silafluorendiyl(2-sec-butyl, 4-[3',5'-di-tbutylphenyl]indenyl)₂zirconium dimethyl;
9-silafluorendiyl(2-tert-butyl, 4-[3',5'-di-tbutylphenyl]indenyl)₂zirconium dimethyl;
9-silafluorendiyl(2-methyl, 4-[3',5'-di-tbutylphenyl]indenyl)₂hafnium dimethyl;
9-silafluorendiyl(2-ethyl, 4-[3',5'-di-tbutylphenyl]indenyl)₂hafnium dimethyl;
9-silafluorendiyl(2-n-propyl, 4-[3',5'-di-tbutylphenyl]indenyl) 2hafnium dimethyl;
9-silafluorendiyl(2-iso-propyl, 4-[3',5'-di-tbutylphenyl]indenyl)₂hafnium dimethyl;
9-silafluorendiyl(2-n-butyl, 4-[3',5'-di-tbutylphenyl]indenyl)₂hafnium dimethyl;
9-silafluorendiyl(2-iso-butyl, 4-[3',5'-di-tbutylphenyl]indenyl)₂hafnium dimethyl;
9-silafluorendiyl(2-sec-butyl, 4-[3',5'-di-tbutylphenyl]indenyl)₂hafnium dimethyl;
9-silafluorendiyl(2-tert-butyl, 4-[3',5'-di-tbutylphenyl]indenyl)₂hafnium dimethyl;
dimethylsiladiyl(2-methyl, 4-[3',5'-bis-trifluoromethylphenyl]indenyl)₂zirconium dichloride;
dimethylsiladiyl(2-ethyl, 4-[3',5'-bis-trifluoromethylphenyl]indenyl)₂zirconium dichloride;
dimethylsiladiyl(2-n-propyl, 4-[3',5'-bis-trifluoromethylphenyl]indenyl)₂zirconium dichloride;
dimethylsiladiyl(2-iso-propyl, 4-[3',5'-bis-trifluoromethylphenyl]indenyl)₂zirconium dichloride;
dimethylsiladiyl(2-n-butyl, 4-[3',5'-bis-trifluoromethylphenyl]indenyl)₂zirconium dichloride;
dimethylsiladiyl(2-iso-butyl, 4-[3',5'-bis-trifluoromethylphenyl]indenyl)₂zirconium dichloride;
dimethylsiladiyl(2-sec-butyl, 4-[3',5'-bis-trifluoromethylphenyl]indenyl)₂zirconium dichloride;
dimethylsiladiyl(2-tert-butyl, 4-[3',5'-bis-trifluoromethylphenyl]indenyl)₂zirconium dichloride;
dimethylsiladiyl(2-methyl, 4-[3',5'-bis-trifluoromethylphenyl]indenyl)₂hafnium dichloride;

dimethylsiladiyl(2-ethyl, 4-[3',5'-bis-trifluoromethylphenyl]indenyl)₂hafnium dichloride;
dimethylsiladiyl(2-n-propyl, 4-[3',5'-bis-trifluoromethylphenyl]indenyl)₂hafnium dichloride;
dimethylsiladiyl(2-iso-propyl, 4-[3',5'-bis-trifluoromethylphenyl]indenyl)₂hafnium dichloride;
dimethylsiladiyl(2-n-butyl, 4-[3',5'-bis-trifluoromethylphenyl]indenyl)₂hafnium dichloride;
dimethylsiladiyl(2-iso-butyl, 4-[3',5'-bis-trifluoromethylphenyl]indenyl)₂hafnium dichloride;
dimethylsiladiyl(2-sec-butyl, 4-[3',5'-bis-trifluoromethylphenyl]indenyl)₂hafnium dichloride;
dimethylsiladiyl(2-tert-butyl, 4-[3',5'-bis-trifluoromethylphenyl]indenyl)₂hafnium dichloride;
9-silafluorendiyl(2-methyl, 4-[3',5'-bis-trifluoromethylphenyl]indenyl)₂zirconium dichloride;
dimethylsiladiyl(2-ethyl, 4-[3',5'-bis-trifluoromethylphenyl]indenyl)₂hafnium dichloride;
9-silafluorendiyl(2-n-propyl, 4-[3',5'-bis-trifluoromethylphenyl]indenyl)₂zirconium dichloride;
9-silafluorendiyl(2-iso-propyl, 4-[3',5'-bis-trifluoromethylphenyl]indenyl)₂zirconium dichloride;
9-silafluorendiyl(2-n-butyl, 4-[3',5'-bis-trifluoromethylphenyl]indenyl)₂zirconium dichloride;
9-silafluorendiyl(2-iso-butyl, 4-[3',5'-bis-trifluoromethylphenyl]indenyl)₂zirconium dichloride;
9-silafluorendiyl(2-sec-butyl, 4-[3',5'-bis-trifluoromethylphenyl]indenyl)₂zirconium dichloride;
9-silafluorendiyl(2-tert-butyl, 4-[3',5'-bis-trifluoromethylphenyl]indenyl)₂zirconium dichloride;
9-silafluorendiyl(2-methyl, 4-[3',5'-bis-trifluoromethylphenyl]indenyl)₂hafnium dichloride;
9-silafluorendiyl(2-ethyl, 4-[3',5'-bis-trifluoromethylphenyl]indenyl)₂hafnium dichloride;
9-silafluorendiyl(2-n-propyl, 4-[3',5'-bis-trifluoromethylphenyl]indenyl)₂hafnium dichloride;
9-silafluorendiyl(2-iso-propyl, 4-[3',5'-bis-trifluoromethylphenyl]indenyl)₂hafnium dichloride;
9-silafluorendiyl(2-n-butyl, 4-[3',5'-bis-trifluoromethylphenyl]indenyl)₂hafnium dichloride;
9-silafluorendiyl(2-iso-butyl, 4-[3',5'-bis-trifluoromethylphenyl]indenyl)₂hafnium dichloride;
9-silafluorendiyl(2-sec-butyl, 4-[3',5'-bis-trifluoromethylphenyl]indenyl)₂hafnium dichloride;
9-silafluorendiyl(2-tert-butyl, 4-[3',5'-bis-trifluoromethylphenyl]indenyl)₂hafnium dichloride;
dimethylsiladiyl(2-methyl, 4-[3',5'-bis-trifluoromethylphenyl]indenyl)₂zirconium dimethyl;
dimethylsiladiyl(2-ethyl, 4-[3',5'-bis-trifluoromethylphenyl]indenyl)₂zirconium dimethyl;
dimethylsiladiyl(2-n-propyl, 4-[3',5'-bis-trifluoromethylphenyl]indenyl)₂zirconium dimethyl;
dimethylsiladiyl(2-iso-propyl, 4-[3',5'-bis-trifluoromethylphenyl]indenyl)₂zirconium dimethyl;
dimethylsiladiyl(2-n-butyl, 4-[3',5'-bis-trifluoromethylphenyl]indenyl)₂zirconium dimethyl;
dimethylsiladiyl(2-iso-butyl, 4-[3',5'-bis-trifluoromethylphenyl]indenyl)₂zirconium dimethyl;
dimethylsiladiyl(2-sec-butyl, 4-[3',5'-bis-trifluoromethylphenyl]indenyl)₂zirconium dimethyl;
dimethylsiladiyl(2-tert-butyl, 4-[3',5'-bis-trifluoromethylphenyl]indenyl)₂zirconium dimethyl;
dimethylsiladiyl(2-methyl, 4-[3',5'-bis-trifluoromethylphenyl]indenyl)₂hafnium dimethyl;
dimethylsiladiyl(2-ethyl, 4-[3',5'-bis-trifluoromethylphenyl]indenyl)₂hafnium dimethyl;
dimethylsiladiyl(2-n-propyl, 4-[3',5'-bis-trifluoromethylphenyl]indenyl)₂hafnium dimethyl;
dimethylsiladiyl(2-iso-propyl, 4-[3',5'-bis-trifluoromethylphenyl]indenyl)₂hafnium dimethyl;
dimethylsiladiyl(2-n-butyl, 4-[3',5'-bis-trifluoromethylphenyl]indenyl)₂hafnium dimethyl;
dimethylsiladiyl(2-iso-butyl, 4-[3',5'-bis-trifluoromethylphenyl]indenyl)₂hafnium dimethyl;
dimethylsiladiyl(2-sec-butyl, 4-[3',5'-bis-trifluoromethylphenyl]indenyl)₂hafnium dimethyl;
dimethylsiladiyl(2-tert-butyl, 4-[3',5'-bis-trifluoromethylphenyl]indenyl)₂hafnium dimethyl;
9-silafluorendiyl(2-methyl, 4-[3',5'-bis-trifluoromethylphenyl]indenyl)₂zirconium dimethyl;
dimethylsiladiyl(2-ethyl, 4-[3',5'-bis-trifluoromethylphenyl]indenyl)₂hafnium dimethyl;
9-silafluorendiyl(2-n-propyl, 4-[3',5'-bis-trifluoromethylphenyl]indenyl)₂zirconium dimethyl;
9-silafluorendiyl(2-iso-propyl, 4-[3',5'-bis-trifluoromethylphenyl]indenyl)₂zirconium dimethyl;
9-silafluorendiyl(2-n-butyl, 4-[3',5'-bis-trifluoromethylphenyl]indenyl)₂zirconium dimethyl;
9-silafluorendiyl(2-iso-butyl, 4-[3',5'-bis-trifluoromethylphenyl]indenyl)₂zirconium dimethyl;
9-silafluorendiyl(2-sec-butyl, 4-[3',5'-bis-trifluoromethylphenyl]indenyl)₂zirconium dimethyl;
9-silafluorendiyl(2-tert-butyl, 4-[3',5'-bis-trifluoromethylphenyl]indenyl)₂zirconium dimethyl;
9-silafluorendiyl(2-methyl, 4-[3',5'-bis-trifluoromethylphenyl]indenyl)₂hafnium dimethyl;
9-silafluorendiyl(2-ethyl, 4-[3',5'-bis-trifluoromethylphenyl]indenyl)₂hafnium dimethyl;
9-silafluorendiyl(2-n-propyl, 4-[3',5'-bis-trifluoromethylphenyl]indenyl)₂hafnium dimethyl;
9-silafluorendiyl(2-iso-propyl, 4-[3',5'-bis-trifluoromethylphenyl]indenyl)₂hafnium dimethyl;
9-silafluorendiyl(2-n-butyl, 4-[3',5'-bis-trifluoromethylphenyl]indenyl)₂hafnium dimethyl;
9-silafluorendiyl(2-iso-butyl, 4-[3',5'-bis-trifluoromethylphenyl]indenyl)₂hafnium dimethyl;
9-silafluorendiyl(2-sec-butyl, 4-[3',5'-bis-trifluoromethylphenyl]indenyl)₂hafnium dimethyl;
9-silafluorendiyl(2-tert-butyl, 4-[3',5'-bis-trifluoromethylphenyl]indenyl)₂hafnium dimethyl;
dimethylsiladiyl(2-ethyl, 4-[3',5'-di-iso-propylphenyl]indenyl)₂zirconium dichloride;
dimethylsiladiyl(2-n-propyl, 4-[3',5'-di-iso-propylphenyl]indenyl)₂zirconium dichloride
dimethylsiladiyl(2-iso-propyl, 4-[3',5'-di-iso-propylphenyl]indenyl)₂zirconium dichloride;
dimethylsiladiyl(2-n-butyl, 4-[3',5'-di-iso-propylphenyl]indenyl)₂zirconium dichloride;
dimethylsiladiyl(2-iso-butyl, 4-[3',5'-di-iso-propylphenyl]indenyl)₂zirconium dichloride;
dimethylsiladiyl(2-sec-butyl, 4-[3',5'-di-iso-propylphenyl]indenyl)₂zirconium dichloride;
dimethylsiladiyl(2-tert-butyl, 4-[3',5'-di-iso-propylphenyl]indenyl)₂zirconium dichloride;
dimethylsiladiyl(2-ethyl, 4-[3',5'-di-iso-propylphenyl]indenyl)₂hafnium dichloride;
dimethylsiladiyl(2-n-propyl, 4-[3',5'-di-iso-propylphenyl]indenyl)₂hafnium dichloride;
dimethylsiladiyl(2-iso-propyl, 4-[3',5'-di-iso-propylphenyl]indenyl)₂hafnium dichloride;
dimethylsiladiyl(2-n-butyl, 4-[3',5'-di-iso-propylphenyl]indenyl)₂hafnium dichloride;

dimethylsiladiyl(2-iso-butyl, 4-[3',5'-di-iso-propylphenyl] indenyl)₂hafnium dichloride;
dimethylsiladiyl(2-sec-butyl, 4-[3',5'-di-iso-propylphenyl] indenyl)₂hafnium dichloride;
dimethylsiladiyl(2-tert-butyl, 4-[3',5'-di-iso-propylphenyl] indenyl)₂hafnium dichloride;
9-silafluorendiyl(2-ethyl, 4-[3',5'-di-iso-propylphenyl]indenyl)₂zirconium dichloride;
9-silafluorendiyl(2-n-propyl, 4-[3',5'-di-iso-propylphenyl] indenyl)₂zirconium dichloride;
9-silafluorendiyl(2-iso-propyl, 4-[3',5'-di-iso-propylphenyl] indenyl)₂zirconium dichloride;
9-silafluorendiyl(2-n-butyl, 4-[3',5'-di-iso-propylphenyl]indenyl)₂zirconium dichloride;
9-silafluorendiyl(2-iso-butyl, 4-[3',5'-di-iso-propylphenyl] indenyl)₂zirconium dichloride;
9-silafluorendiyl(2-sec-butyl, 4-[3',5'-di-iso-propylphenyl] indenyl)₂zirconium dichloride;
9-silafluorendiyl(2-tert-butyl, 4-[3',5'-di-iso-propylphenyl] indenyl)₂zirconium dichloride;
9-silafluorendiyl(2-ethyl, 4-[3',5'-di-iso-propylphenyl]indenyl)₂hafnium dichloride;
9-silafluorendiyl(2-n-propyl, 4-[3',5'-di-iso-propylphenyl] indenyl)₂hafnium dichloride;
9-silafluorendiyl(2-iso-propyl, 4-[3',5'-di-iso-propylphenyl] indenyl)₂hafnium dichloride;
9-silafluorendiyl(2-n-butyl, 4-[3',5'-di-iso-propylphenyl]indenyl)₂hafnium dichloride;
9-silafluorendiyl(2-iso-butyl, 4-[3',5'-di-iso-propylphenyl] indenyl)₂hafnium dichloride;
9-silafluorendiyl(2-sec-butyl, 4-[3',5'-di-iso-propylphenyl] indenyl)₂hafnium dichloride;
9-silafluorendiyl(2-tert-butyl, 4-[3',5'-di-iso-propylphenyl] indenyl)₂hafnium dichloride;
dimethylsiladiyl(2-ethyl, 4-[3',5'-di-iso-propylphenyl]indenyl)₂zirconium dimethyl;
dimethylsiladiyl(2-n-propyl, 4-[3',5'-di-iso-propylphenyl] indenyl)₂zirconium dimethyl
dimethylsiladiyl(2-iso-propyl, 4-[3',5'-di-iso-propylphenyl] indenyl)₂zirconium dimethyl;
dimethylsiladiyl(2-n-butyl, 4-[3',5'-di-iso-propylphenyl]indenyl)₂zirconium dimethyl;
dimethylsiladiyl(2-isobutyl, 4-[3',5'-di-iso-propylphenyl]indenyl)₂zirconium dimethyl;
dimethylsiladiyl(2-sec-butyl, 4-[3',5'-di-iso-propylphenyl] indenyl)₂zirconium dimethyl;
dimethylsiladiyl(2-tert-butyl, 4-[3',5'-di-iso-propylphenyl] indenyl)₂zirconium dimethyl;
dimethylsiladiyl(2-ethyl, 4-[3',5'-di-iso-propylphenyl]indenyl) 2hafnium dimethyl;
dimethylsiladiyl(2-n-propyl, 4-[3',5'-di-iso-propylphenyl] indenyl)₂hafnium dimethyl;
dimethylsiladiyl(2-iso-propyl, 4-[3',5'-di-iso-propylphenyl] indenyl)₂hafnium dimethyl;
dimethylsiladiyl(2-n-butyl, 4-[3',5'-di-iso-propylphenyl]indenyl)₂hafnium dimethyl;
dimethylsiladiyl(2-iso-butyl, 4-[3',5'-di-iso-propylphenyl] indenyl)₂zirconium dimethyl;
dimethylsiladiyl(2-sec-butyl, 4-[3',5'-di-iso-propylphenyl] indenyl)₂zirconium dimethyl;
dimethylsiladiyl(2-tert-butyl, 4-[3',5'-di-iso-propylphenyl] indenyl)₂zirconium dimethyl;
9-silafluorendiyl(2-ethyl, 4-[3',5'-di-iso-propylphenyl]indenyl)₂zirconium dimethyl;
9-silafluorendiyl(2-n-propyl, 4-[3',5'-di-iso-propylphenyl] indenyl)₂zirconium dimethyl;
9-silafluorendiyl(2-iso-propyl, 4-[3',5'-di-iso-propylphenyl] indenyl)₂zirconium dimethyl;
9-silafluorendiyl(2-n-butyl, 4-[3',5'-di-iso-propylphenyl]indenyl)₂zirconium dimethyl;
9-silafluorendiyl(2-iso-butyl, 4-[3',5'-di-iso-propylphenyl] indenyl)₂zirconium dimethyl;
9-silafluorendiyl(2-sec-butyl, 4-[3',5'-di-iso-propylphenyl] indenyl)₂zirconium dimethyl;
9-silafluorendiyl(2-tert-butyl, 4-[3',5'-di-iso-propylphenyl] indenyl)₂zirconium dimethyl;
9-silafluorendiyl(2-ethyl, 4-[3',5'-di-iso-propylphenyl]indenyl)₂hafnium dimethyl;
9-silafluorendiyl(2-n-propyl, 4-[3',5'-di-iso-propylphenyl] indenyl)₂hafnium dimethyl;
9-silafluorendiyl(2-iso-propyl, 4-[3',5'-di-iso-propylphenyl] indenyl)₂hafnium dimethyl;
9-silafluorendiyl(2-n-butyl, 4-[3',5'-di-iso-propylphenyl]indenyl)₂hafnium dimethyl;
9-silafluorendiyl(2-iso-butyl, 4-[3',5'-di-iso-propylphenyl] indenyl)₂hafnium dimethyl;
9-silafluorendiyl(2-sec-butyl, 4-[3',5'-di-iso-propylphenyl] indenyl)₂hafnium dimethyl;
9-silafluorendiyl(2-tert-butyl, 4-[3',5'-di-iso-propylphenyl] indenyl)₂hafnium dimethyl;
dimethylsiladiyl(2-methyl, 4-[3',5'-di-phenylphenyl]indenyl)₂zirconium dichloride;
dimethylsiladiyl(2-ethyl, 4-[3',5'-di-phenylphenyl]indenyl)₂zirconium dichloride;
dimethylsiladiyl(2-n-propyl, 4-[3',5'-di-phenylphenyl]indenyl)₂zirconium dichloride;
dimethylsiladiyl(2-iso-propyl, 4-[3',5'-di-phenylphenyl]indenyl)₂zirconium dichloride;
dimethylsiladiyl(2-n-butyl, 4-[3',5'-di-phenylphenyl]indenyl)₂zirconium dichloride;
dimethylsiladiyl(2-iso-butyl, 4-[3',5'-di-phenylphenyl]indenyl)₂zirconium dichloride;
dimethylsiladiyl(2-sec-butyl, 4-[3',5'-di-phenylphenyl]indenyl)₂zirconium dichloride;
dimethylsiladiyl(2-tert-butyl, 4-[3',5'-di-phenylphenyl]indenyl)₂zirconium dichloride;
dimethylsiladiyl(2-methyl, 4-[3',5'-di-phenylphenyl]indenyl)₂hafnium dichloride;
dimethylsiladiyl(2-ethyl, 4-[3',5'-di-phenylphenyl]indenyl)₂hafnium dichloride;
dimethylsiladiyl(2-n-propyl, 4-[3',5'-di-phenylphenyl]indenyl)₂hafnium dichloride;
dimethylsiladiyl(2-iso-propyl, 4-[3',5'-di-phenylphenyl]indenyl)₂hafnium dichloride;
dimethylsiladiyl(2-n-butyl, 4-[3',5'-di-phenylphenyl]indenyl)₂hafnium dichloride;
dimethylsiladiyl(2-iso-butyl, 4-[3',5'-di-phenylphenyl]indenyl)₂hafnium dichloride;
dimethylsiladiyl(2-sec-butyl, 4-[3',5'-di-phenylphenyl]indenyl)₂hafnium dichloride;
dimethylsiladiyl(2-tert-butyl, 4-[3',5'-di-phenylphenyl]indenyl)₂hafnium dichloride;
9-silafluorendiyl(2-methyl, 4-[3',5'-di-phenylphenyl]indenyl)₂zirconium dichloride;
9-silafluorendiyl(2-ethyl, 4-[3',5'-di-phenylphenyl]indenyl)₂zirconium dichloride;
9-silafluorendiyl(2-n-propyl, 4-[3',5'-di-phenylphenyl]indenyl)₂zirconium dichloride;
9-silafluorendiyl(2-iso-propyl, 4-[3',5'-di-phenylphenyl]indenyl)₂zirconium dichloride;
9-silafluorendiyl(2-n-butyl, 4-[3',5'-di-phenylphenyl]indenyl)₂zirconium dichloride;

9-silafluorendiyl(2-iso-butyl, 4-[3',5'-di-phenylphenyl]indenyl)$_2$zirconium dichloride;
9-silafluorendiyl(2-sec-butyl, 4-[3',5'-di-phenylphenyl]indenyl)$_2$zirconium dichloride;
9-silafluorendiyl(2-tert-butyl, 4-[3',5'-di-phenylphenyl]indenyl)$_2$zirconium dichloride;
9-silafluorendiyl(2-methyl, 4-[3',5'-di-phenylphenyl]indenyl)$_2$hafnium dichloride;
9-silafluorendiyl(2-ethyl, 4-[3',5'-di-phenylphenyl]indenyl)$_2$hafnium dichloride;
9-silafluorendiyl(2-n-propyl, 4-[3',5'-di-phenylphenyl]indenyl)$_2$hafnium dichloride;
9-silafluorendiyl(2-iso-propyl, 4-[3',5'-di-phenylphenyl]indenyl)$_2$hafnium dichloride;
9-silafluorendiyl(2-n-butyl, 4-[3',5'-di-phenylphenyl]indenyl)$_2$hafnium dichloride;
9-silafluorendiyl(2-iso-butyl, 4-[3',5'-di-phenylphenyl]indenyl)$_2$hafnium dichloride;
9-silafluorendiyl(2-sec-butyl, 4-[3',5'-di-phenylphenyl]indenyl)$_2$hafnium dichloride;
9-silafluorendiyl(2-tert-butyl, 4-[3',5'-di-phenylphenyl]indenyl)$_2$hafnium dichloride;
dimethylsiladiyl(2-methyl, 4-[3',5'-di-phenylphenyl]indenyl)$_2$zirconium dimethyl;
dimethylsiladiyl(2-ethyl, 4-[3',5'-di-phenylphenyl]indenyl)$_2$zirconium dimethyl;
dimethylsiladiyl(2-n-propyl, 4-[3',5'-di-phenylphenyl]indenyl)$_2$zirconium dimethyl;
dimethylsiladiyl(2-iso-propyl, 4-[3',5'-di-phenylphenyl]indenyl)$_2$zirconium dimethyl;
dimethylsiladiyl(2-n-butyl, 4-[3',5'-di-phenylphenyl]indenyl)$_2$zirconium dimethyl;
dimethylsiladiyl(2-iso-butyl, 4-[3',5'-di-phenylphenyl]indenyl)$_2$zirconium dimethyl;
dimethylsiladiyl(2-sec-butyl, 4-[3',5'-di-phenylphenyl]indenyl)$_2$zirconium dimethyl;
dimethylsiladiyl(2-tert-butyl, 4-[3',5'-di-phenylphenyl]indenyl)$_2$zirconium dimethyl;
dimethylsiladiyl(2-methyl, 4-[3',5'-di-phenylphenyl]indenyl)$_2$hafnium dimethyl;
dimethylsiladiyl(2-ethyl, 4-[3',5'-di-phenylphenyl]indenyl)$_2$hafnium dimethyl;
dimethylsiladiyl(2-n-propyl, 4-[3',5'-di-phenylphenyl]indenyl)$_2$hafnium dimethyl;
dimethylsiladiyl(2-iso-propyl, 4-[3',5'-di-phenylphenyl]indenyl)$_2$hafnium dimethyl;
dimethylsiladiyl(2-n-butyl, 4-[3',5'-di-phenylphenyl]indenyl)$_2$hafnium dimethyl;
dimethylsiladiyl(2-iso-butyl, 4-[3',5'-di-phenylphenyl]indenyl)$_2$hafnium dimethyl;
dimethylsiladiyl(2-sec-butyl, 4-[3',5'-di-phenylphenyl]indenyl)$_2$hafnium dimethyl;
dimethylsiladiyl(2-tert-butyl, 4-[3',5'-di-phenylphenyl]indenyl)$_2$hafnium dimethyl;
9-silafluorendiyl(2-methyl, 4-[3',5'-di-phenylphenyl]indenyl)$_2$zirconium dimethyl;
9-silafluorendiyl(2-ethyl, 4-[3',5'-di-phenylphenyl]indenyl)$_2$zirconium dimethyl;
9-silafluorendiyl(2-n-propyl, 4-[3',5'-di-phenylphenyl]indenyl)$_2$zirconium dimethyl;
9-silafluorendiyl(2-iso-propyl, 4-[3',5'-di-phenylphenyl]indenyl)$_2$zirconium dimethyl;
9-silafluorendiyl(2-n-butyl, 4-[3',5'-di-phenylphenyl]indenyl)$_2$zirconium dimethyl;
9-silafluorendiyl(2-iso-butyl, 4-[3',5'-di-phenylphenyl]indenyl)$_2$zirconium dimethyl;
9-silafluorendiyl(2-sec-butyl, 4-[3',5'-di-phenylphenyl]indenyl)$_2$zirconium dimethyl;
9-silafluorendiyl(2-tert-butyl, 4-[3',5'-di-phenylphenyl]indenyl)$_2$zirconium dimethyl;
9-silafluorendiyl(2-methyl, 4-[3',5'-di-phenylphenyl]indenyl)$_2$hafnium dimethyl;
9-silafluorendiyl(2-ethyl, 4-[3',5'-di-phenylphenyl]indenyl)$_2$hafnium dichloride;
9-silafluorendiyl(2-n-propyl, 4-[3',5'-di-phenylphenyl]indenyl)$_2$hafnium dimethyl;
9-silafluorendiyl(2-iso-propyl, 4-[3',5'-di-phenylphenyl]indenyl)$_2$hafnium dimethyl;
9-silafluorendiyl(2-n-butyl, 4-[3',5'-di-phenylphenyl]indenyl)$_2$hafnium dimethyl;
9-silafluorendiyl(2-iso-butyl, 4-[3',5'-di-phenylphenyl]indenyl)$_2$hafnium dimethyl;
9-silafluorendiyl(2-sec-butyl, 4-[3',5'-di-phenylphenyl]indenyl)$_2$hafnium dimethyl;
9-silafluorendiyl(2-tert-butyl, 4-[3',5'-di-phenylphenyl]indenyl)$_2$hafnium dimethyl;
dimethylsiladiyl(2-methyl, 4-[3',5'-di-tbutylphenyl]indenyl)$_2$η$^4$-1,4-diphenyl-1,3-butadiene;
dimethylsiladiyl(2-ethyl, 4-[3',5'-di-tbutylphenyl]indenyl)$_2$η$^4$-1,4-diphenyl-1,3-butadiene;
dimethylsiladiyl(2-n-propyl, 4-[3',5'-di-tbutylphenyl]indenyl)$_2$η$^4$-1,4-diphenyl-1,3-butadiene;
dimethylsiladiyl(2-iso-propyl, 4-[3',5'-di-tbutylphenyl]indenyl)$_2$η$^4$-1,4-diphenyl-1,3-butadiene;
dimethylsiladiyl(2-n-butyl, 4-[3',5'-di-tbutylphenyl]indenyl)$_2$η$^4$-1,4-diphenyl-1,3-butadiene;
dimethylsiladiyl(2-iso-butyl, 4-[3',5'-di-tbutylphenyl]indenyl)$_2$η$^4$-1,4-diphenyl-1,3-butadiene;
dimethylsiladiyl(2-sec-butyl, 4-[3',5'-di-tbutylphenyl]indenyl)$_2$η$^4$-1,4-diphenyl-1,3-butadiene;
dimethylsiladiyl(2-tert-butyl, 4-[3',5'-di-tbutylphenyl]indenyl)$_2$η$^4$-1,4-diphenyl-1,3-butadiene;
dimethylsiladiyl(2-ethyl, 4-[3',5'-bis-trifluoromethylphenyl]indenyl)$_2$η$^4$-1,4-diphenyl-1,3-butadiene;
dimethylsiladiyl(2-n-propyl, 4-[3',5'-bis-trifluoromethylphenyl]indenyl)$_2$η$^4$-1,4-diphenyl-1,3-butadiene;
dimethylsiladiyl(2-iso-propyl, 4-[3',5'-bis-trifluoromethylphenyl]indenyl)$_2$η$^4$-1,4-diphenyl-1,3-butadiene;
dimethylsiladiyl(2-n-butyl, 4-[3',5'-bis-trifluoromethylphenyl]indenyl)$_2$η$^4$-1,4-diphenyl-1,3-butadiene;
dimethylsiladiyl(2-iso-butyl, 4-[3',5'-bis-trifluoromethylphenyl]indenyl)$_2$η$^4$-1,4-diphenyl-1,3-butadiene;
dimethylsiladiyl(2-sec-butyl, 4-[3',5'-bis-trifluoromethylphenyl]indenyl)$_2$η$^4$-1,4-diphenyl-1,3-butadiene;
dimethylsiladiyl(2-tert-butyl, 4-[3',5'-bis-trifluoromethylphenyl]indenyl)$_2$η$^4$-1,4-diphenyl-1,3-butadiene;
dimethylsiladiyl(2-ethyl, 4-[3',5'-di-iso-propylphenyl]indenyl)$_2$η$^4$-1,4-diphenyl-1,3-butadiene;
dimethylsiladiyl(2-n-propyl, 4-[3',5'-di-iso-propylphenyl]indenyl)$_2$η$^4$-1,4-diphenyl-1,3-butadiene;
dimethylsiladiyl(2-iso-propyl, 4-[3',5'-di-iso-propylphenyl]indenyl)$_2$η$^4$-1,4-diphenyl-1,3-butadiene;
dimethylsiladiyl(2-n-butyl, 4-[3',5'-di-iso-propylphenyl]indenyl)$_2$η$^4$-1,4-diphenyl-1,3-butadiene;
dimethylsiladiyl(2-iso-butyl, 4-[3',5'-di-iso-propylphenyl]indenyl)$_2$η$^4$-1,4-diphenyl-1,3-butadiene;
dimethylsiladiyl(2-sec-butyl, 4-[3',5'-di-iso-propylphenyl]indenyl)$_2$η$^4$-1,4-diphenyl-1,3-butadiene;
dimethylsiladiyl(2-tert-butyl, 4-[3',5'-di-iso-propylphenyl]indenyl)$_2$η$^4$-1,4-diphenyl-1,3-butadiene;
dimethylsiladiyl(2-methyl, 4-[3',5'-di-phenylphenyl]indenyl)$_2$η$^4$-1,4-diphenyl-1,3-butadiene;

dimethylsiladiyl(2-ethyl, 4-[3',5'-di-phenylphenyl]indenyl)$_2\eta^4$-1,4-diphenyl-1,3-butadiene;
dimethylsiladiyl(2-n-propyl, 4-[3',5'-di-phenylphenyl]indenyl)$_2\eta^4$-1,4-diphenyl-1,3-butadiene;
dimethylsiladiyl(2-iso-propyl, 4-[3',5'-di-phenylphenyl]indenyl)$_2\eta^4$-1,4-diphenyl-1,3-butadiene;
dimethylsiladiyl(2-n-butyl, 4-[3',5'-di-phenylphenyl]indenyl)$_2\eta^4$-1,4-diphenyl-1,3-butadiene;
dimethylsiladiyl(2-iso-butyl, 4-[3',5'-di-phenylphenyl]indenyl)$_2\eta^4$-1,4-diphenyl-1,3-butadiene;
dimethylsiladiyl(2-sec-butyl, 4-[3',5'-di-phenylphenyl]indenyl)$_2\eta^4$-1,4-diphenyl-1,3-butadiene;
dimethylsiladiyl(2-tert-butyl, 4-[3',5'-di-phenylphenyl]indenyl)$_2\eta^4$-1,4-diphenyl-1,3-butadiene;
9-silafluorendiyl(2-methyl, 4-[3',5'-di-tbutylphenyl]indenyl)$_2\eta^4$-1,4-diphenyl-1,3-butadiene;
9-silafluorendiyl(2-ethyl, 4-[3',5'-di-tbutylphenyl]indenyl)$_2\eta^4$-1,4-diphenyl-1,3-butadiene;
9-silafluorendiyl(2-n-propyl, 4-[3',5'-di-tbutylphenyl]indenyl)$_2\eta^4$-1,4-diphenyl-1,3-butadiene;
9-silafluorendiyl(2-iso-propyl, 4-[3',5'-di-tbutylphenyl]indenyl)$_2\eta^4$-1,4-diphenyl-1,3-butadiene;
9-silafluorendiyl(2-n-butyl, 4-[3',5'-di-tbutylphenyl]indenyl)$_2\eta^4$-1,4-diphenyl-1,3-butadiene;
9-silafluorendiyl(2-iso-butyl, 4-[3',5'-di-tbutylphenyl]indenyl)$_2\eta^4$-1,4-diphenyl-1,3-butadiene;
9-silafluorendiyl(2-sec-butyl, 4-[3',5'-di-tbutylphenyl]indenyl)$_2\eta^4$-1,4-diphenyl-1,3-butadiene;
9-silafluorendiyl(2-tert-butyl, 4-[3',5'-di-tbutylphenyl]indenyl)$_2\eta^4$-1,4-diphenyl-1,3-butadiene;
9-silafluorendiyl(2-ethyl, 4-[3',5'-bis-trifluoromethylphenyl]indenyl)$_2\eta^4$-1,4-diphenyl-1,3-butadiene;
9-silafluorendiyl(2-n-propyl, 4-[3',5'-bis-trifluoromethylphenyl]indenyl)$_2\eta^4$-1,4-diphenyl-1,3-butadiene;
9-silafluorendiyl(2-iso-propyl, 4-[3',5'-bis-trifluoromethylphenyl]indenyl)$_2\eta^4$-1,4-diphenyl-1,3-butadiene;
9-silafluorendiyl(2-n-butyl, 4-[3',5'-bis-trifluoromethylphenyl]indenyl)$_2\eta^4$-1,4-diphenyl-1,3-butadiene;
9-silafluorendiyl(2-iso-butyl, 4-[3',5'-bis-trifluoromethylphenyl]indenyl)$_2\eta^4$-1,4-diphenyl-1,3-butadiene;
9-silafluorendiyl(2-sec-butyl, 4-[3',5'-bis-trifluoromethylphenyl]indenyl)$_2\eta^4$-1,4-diphenyl-1,3-butadiene;
9-silafluorendiyl(2-tert-butyl, 4-[3',5'-bis-trifluoromethylphenyl]indenyl)$_2\eta^4$-1,4-diphenyl-1,3-butadiene;
9-silafluorendiyl(2-ethyl, 4-[3',5'-di-iso-propylphenyl]indenyl)$_2\eta^4$-1,4-diphenyl-1,3-butadiene;
9-silafluorendiyl(2-n-propyl, 4-[3',5'-di-iso-propylphenyl]indenyl)$_2\eta^4$-1,4-diphenyl-1,3-butadiene;
9-silafluorendiyl(2-iso-propyl, 4-[3',5'-di-iso-propylphenyl]indenyl)$\eta^4$-1,4-diphenyl-1,3-butadiene;
9-silafluorendiyl(2-n-butyl, 4-[3',5'-di-iso-propylphenyl]indenyl)$_2\eta^4$-1,4-diphenyl-1,3-butadiene;
9-silafluorendiyl(2-iso-butyl, 4-[3',5'-di-iso-propylphenyl]indenyl)$_2\eta^4$-1,4-diphenyl-1,3-butadiene;
9-silafluorendiyl(2-sec-butyl, 4-[3',5'-di-iso-propylphenyl]indenyl)$_2\eta^4$-1,4-diphenyl-1,3-butadiene;
9-silafluorendiyl(2-tert-butyl, 4-[3',5'-di-iso-propylphenyl]indenyl)$_2\eta^4$-1,4-diphenyl-1,3-butadiene;
9-silafluorendiyl(2-methyl, 4-[3',5'-di-phenylphenyl]indenyl)$_2\eta^4$-1,4-diphenyl-1,3-butadiene;
9-silafluorendiyl(2-ethyl, 4-[3',5'-di-phenylphenyl]indenyl)$_2\eta^4$-1,4-diphenyl-1,3-butadiene;
9-silafluorendiyl(2-n-propyl, 4-[3',5'-di-phenylphenyl]indenyl)$_2\eta^4$-1,4-diphenyl-1,3-butadiene;
9-silafluorendiyl(2-iso-propyl, 4-[3',5'-di-phenylphenyl]indenyl)$_2\eta^4$-1,4-diphenyl-1,3-butadiene;
9-silafluorendiyl(2-n-butyl, 4-[3',5'-di-phenylphenyl]indenyl)$_2\eta^4$-1,4-diphenyl-1,3-butadiene;
9-silafluorendiyl(2-iso-butyl, 4-[3',5'-di-phenylphenyl]indenyl)$_2\eta^4$-1,4-diphenyl-1,3-butadiene;
9-silafluorendiyl(2-sec-butyl, 4-[3',5'-di-phenylphenyl]indenyl)$_2\eta^4$-1,4-diphenyl-1,3-butadiene;
9-silafluorendiyl(2-tert-butyl, 4-[3',5'-di-phenylphenyl]indenyl)$_2\eta^4$-1,4-diphenyl-1,3-butadiene;
dimethylamidoborane(2-methyl, 4-[3',5'-di-tbutylphenyl]indenyl)$_2$zirconium dichloride;
dimethylamidoborane(2-ethyl, 4-[3',5'-di-tbutylphenyl]indenyl)$_2$zirconium dichloride;
dimethylamidoborane(2-n-propyl, 4-[3',5'-di-tbutylphenyl]indenyl)$_2$zirconium dichloride;
dimethylamidoborane(2-iso-propyl, 4-[3',5'-di-tbutylphenyl]indenyl)$_2$zirconium dichloride;
dimethylamidoborane(2-n-butyl, 4-[3',5'-di-tbutylphenyl]indenyl)$_2$zirconium dichloride;
dimethylamidoborane(2-iso-butyl, 4-[3',5'-di-tbutylphenyl]indenyl)$_2$zirconium dichloride;
dimethylamidoborane(2-sec-butyl, 4-[3',5'-di-tbutylphenyl]indenyl)$_2$zirconium dichloride;
dimethylamidoborane(2-tert-butyl, 4-[3',5'-di-tbutylphenyl]indenyl)$_2$zirconium dichloride;
dimethylamidoborane(2-ethyl, 4-[3',5'-bis-trifluoromethylphenyl]indenyl)$_2$zirconium dichloride;
dimethylamidoborane(2-n-propyl, 4-[3',5'-bis-trifluoromethylphenyl]indenyl)$_2$zirconium dichloride;
dimethylamidoborane(2-iso-propyl, 4-[3',5'-bis-trifluoromethylphenyl]indenyl)$_2$zirconium dichloride;
dimethylamidoborane(2-n-butyl, 4-[3',5'-bis-trifluoromethylphenyl]indenyl)$_2$zirconium dichloride;
dimethylamidoborane(2-iso-butyl, 4-[3',5'-bis-trifluoromethylphenyl]indenyl)$_2$zirconium dichloride;
dimethylamidoborane(2-sec-butyl, 4-[3',5'-bis-trifluoromethylphenyl]indenyl)$_2$zirconium dichloride;
dimethylamidoborane(2-tert-butyl, 4-[3',5'-bis-trifluoromethylphenyl]indenyl)$_2$zirconium dichloride;
dimethylamidoborane(2-ethyl, 4-[3',5'-di-iso-propylphenyl]indenyl)$_2$zirconium dichloride;
dimethylamidoborane(2-n-propyl, 4-[3',5'-di-iso-propylphenyl]indenyl)$_2$zirconium dichloride
dimethylamidoborane(2-iso-propyl, 4-[3',5'-di-iso-propylphenyl]indenyl)$_2$zirconium dichloride;
dimethylamidoborane(2-n-butyl, 4-[3',5'-di-iso-propylphenyl]indenyl)$_2$zirconium dichloride;
dimethylamidoborane(2-iso-butyl, 4-[3',5'-di-iso-propylphenyl]indenyl)$_2$zirconium dichloride;
dimethylamidoborane(2-sec-butyl, 4-[3',5'-di-iso-propylphenyl]indenyl)$_2$zirconium dichloride;
dimethylamidoborane(2-tert-butyl, 4-[3',5'-di-iso-propylphenyl]indenyl)$_2$zirconium dichloride;
dimethylamidoborane(2-methyl, 4-[3',5'-di-phenylphenyl]indenyl)$_2$zirconium dichloride;
dimethylamidoborane(2-ethyl, 4-[3',5'-di-phenylphenyl]indenyl)$_2$zirconium dichloride;
dimethylamidoborane(2-n-propyl, 4-[3',5'-di-phenylphenyl]indenyl)$_2$zirconium dichloride;
dimethylamidoborane(2-iso-propyl, 4-[3',5'-di-phenylphenyl]indenyl)$_2$zirconium dichloride;
dimethylamidoborane(2-n-butyl, 4-[3',5'-di-phenylphenyl]indenyl)$_2$zirconium dichloride;
dimethylamidoborane(2-iso-butyl, 4-[3',5'-di-phenylphenyl]indenyl)$_2$zirconium dichloride;
dimethylamidoborane(2-sec-butyl, 4-[3',5'-di-phenylphenyl]indenyl)$_2$zirconium dichloride;

dimethylamidoborane(2-tert-butyl, 4-[3',5'-di-phenylphenyl]indenyl)$_2$zirconium dichloride;
dimethylamidoborane(2-methyl, 4-[3',5'-di-tbutylphenyl]indenyl)$_2\eta^4$-1,4-diphenyl-1,3-butadiene;
dimethylamidoborane(2-ethyl, 4-[3',5'-di-tbutylphenyl]indenyl)$_2\eta^4$-1,4-diphenyl-1,3-butadiene;
dimethylamidoborane(2-n-propyl, 4-[3',5'-di-tbutylphenyl]indenyl)$_2\eta^4$-1,4-diphenyl-1,3-butadiene;
dimethylamidoborane(2-iso-propyl, 4-[3',5'-di-tbutylphenyl]indenyl)$_2\eta^4$-1,4-diphenyl-1,3-butadiene;
dimethylamidoborane(2-n-butyl, 4-[3',5'-di-tbutylphenyl]indenyl)$_2\eta^4$-1,4-diphenyl-1,3-butadiene;
dimethylamidoborane(2-iso-butyl, 4-[3',5'-di-tbutylphenyl]indenyl)$_2\eta^4$-1,4-diphenyl-1,3-butadiene;
dimethylamidoborane(2-sec-butyl, 4-[3',5'-di-tbutylphenyl]indenyl)$_2\eta^4$-1,4-diphenyl-1,3-butadiene;
dimethylamidoborane(2-tert-butyl, 4-[3',5'-di-tbutylphenyl]indenyl)$_2\eta^4$-1,4-diphenyl-1,3-butadiene;
dimethylamidoborane(2-ethyl, 4-[3',5'-bis-trifluoromethylphenyl]indenyl)$_2\eta^4$-1,4-diphenyl-1,3-butadiene;
dimethylamidoborane(2-n-propyl, 4-[3',5'-bis-trifluoromethylphenyl]indenyl)$_2\eta^4$-1,4-diphenyl-1,3-butadiene;
dimethylamidoborane(2-iso-propyl, 4-[3',5'-bis-trifluoromethylphenyl]indenyl)$_2\eta^4$-1,4-diphenyl-1,3-butadiene;
dimethylamidoborane(2-n-butyl, 4-[3',5'-bis-trifluoromethylphenyl]indenyl)$_2\eta^4$-1,4-diphenyl-1,3-butadiene;
dimethylamidoborane(2-iso-butyl, 4-[3',5'-bis-trifluoromethylphenyl]indenyl)$_2\eta^4$-1,4-diphenyl-1,3-butadiene;
dimethylamidoborane(2-sec-butyl, 4-[3',5'-bis-trifluoromethylphenyl]indenyl)$_2\eta^4$-1,4-diphenyl-1,3-butadiene;
dimethylamidoborane(2-tert-butyl, 4-[3',5'-bis-trifluoromethylphenyl]indenyl)$_2\eta^4$-1,4-diphenyl-1,3-butadiene;
dimethylamidoborane(2-ethyl, 4-[3',5'-di-iso-propylphenyl]indenyl)$_2\eta^4$-1,4-diphenyl-1,3-butadiene;
dimethylamidoborane(2-n-propyl, 4-[3',5'-di-iso-propylphenyl]indenyl)$_2\eta^4$-1,4-diphenyl-1,3-butadiene;
dimethylamidoborane(2-iso-propyl, 4-[3',5'-di-iso-propylphenyl]indenyl)$\eta^4$-1,4-diphenyl-1,3-butadiene;
dimethylamidoborane(2-n-butyl, 4-[3',5'-di-iso-propylphenyl]indenyl)$_2\eta^4$-1,4-diphenyl-1,3-butadiene;
dimethylamidoborane(2-iso-butyl, 4-[3',5'-di-iso-propylphenyl]indenyl)$_2\eta^4$-1,4-diphenyl-1,3-butadiene;
dimethylamidoborane(2-sec-butyl, 4-[3',5'-di-iso-propylphenyl]indenyl)$_2\eta^4$-1,4-diphenyl-1,3-butadiene;
dimethylamidoborane(2-tert-butyl, 4-[3',5'-di-iso-propylphenyl]indenyl)$_2\eta^4$-1,4-diphenyl-1,3-butadiene;
dimethylamidoborane(2-methyl, 4-[3',5'-di-phenylphenyl]indenyl)$_2\eta^4$-1,4-diphenyl-1,3-butadiene;
dimethylamidoborane(2-ethyl, 4-[3',5'-di-phenylphenyl]indenyl)$_2\eta^4$-1,4-diphenyl-1,3-butadiene;
dimethylamidoborane(2-n-propyl, 4-[3',5'-di-phenylphenyl]indenyl)$_2\eta^4$-1,4-diphenyl-1,3-butadiene;
dimethylamidoborane(2-iso-propyl, 4-[3',5'-di-phenylphenyl]indenyl)$_2\eta^4$-1,4-diphenyl-1,3-butadiene;
dimethylamidoborane(2-n-butyl, 4-[3',5'-di-phenylphenyl]indenyl)$_2\eta^4$-1,4-diphenyl-1,3-butadiene;
dimethylamidoborane(2-iso-butyl, 4-[3',5'-di-phenylphenyl]indenyl)$_2\eta^4$-1,4-diphenyl-1,3-butadiene;
dimethylamidoborane(2-sec-butyl, 4-[3',5'-di-phenylphenyl]indenyl)$_2\eta^4$-1,4-diphenyl-1,3-butadiene;
dimethylamidoborane(2-tert-butyl, 4-[3',5'-di-phenylphenyl]indenyl)$_2\eta^4$-1,4-diphenyl-1,3-butadiene;
dimethylamidoborane(2-methyl, 4-[3',5'-di-tbutylphenyl]indenyl)$_2$zirconium dimethyl;
dimethylamidoborane(2-ethyl, 4-[3',5'-di-tbutylphenyl]indenyl)$_2$zirconium dimethyl;
dimethylamidoborane(2-n-propyl, 4-[3',5'-di-tbutylphenyl]indenyl)$_2$zirconium dimethyl;
dimethylamidoborane(2-iso-propyl, 4-[3',5'-di-tbutylphenyl]indenyl)$_2$zirconium dimethyl;
dimethylamidoborane(2-n-butyl, 4-[3',5'-di-tbutylphenyl]indenyl)$_2$zirconium dimethyl;
dimethylamidoborane(2-iso-butyl, 4-[3',5'-di-tbutylphenyl]indenyl)$_2$zirconium dimethyl;
dimethylamidoborane(2-sec-butyl, 4-[3',5'-di-tbutylphenyl]indenyl)$_2$zirconium dimethyl;
dimethylamidoborane(2-tert-butyl, 4-[3',5'-di-tbutylphenyl]indenyl)$_2$zirconium dimethyl;
dimethylamidoborane(2-ethyl, 4-[3',5'-bis-trifluoromethylphenyl]indenyl)$_2$zirconium dimethyl;
dimethylamidoborane(2-n-propyl, 4-[3',5'-bis-trifluoromethylphenyl]indenyl)$_2$zirconium dimethyl;
dimethylamidoborane(2-iso-propyl, 4-[3',5'-bis-trifluoromethylphenyl]indenyl)$_2$zirconium dimethyl;
dimethylamidoborane(2-n-butyl, 4-[3,5'-bis-trifluoromethylphenyl]indenyl)$_2$zirconium dimethyl;
dimethylamidoborane(2-iso-butyl, 4-[3',5'-bis-trifluoromethylphenyl]indenyl)$_2$zirconium dimethyl;
dimethylamidoborane(2-sec-butyl, 4-[3',5'-bis-trifluoromethylphenyl]indenyl)$_2$zirconium dimethyl;
dimethylamidoborane(2-tert-butyl, 4-[3',5'-bis-trifluoromethylphenyl]indenyl)$_2$zirconium dimethyl;
dimethylamidoborane(2-ethyl, 4-[3',5'-di-iso-propylphenyl]indenyl)$_2$zirconium dimethyl;
dimethylamidoborane(2-n-propyl, 4-[3',5'-di-iso-propylphenyl]indenyl)$_2$zirconium dimethyl
dimethylamidoborane(2-iso-propyl, 4-[3',5'-di-iso-propylphenyl]indenyl)$_2$zirconium dimethyl;
dimethylamidoborane(2-n-butyl, 4-[3',5'-di-iso-propylphenyl]indenyl)$_2$zirconium dimethyl;
dimethylamidoborane(2-iso-butyl, 4-[3',5'-di-iso-propylphenyl]indenyl)$_2$zirconium dimethyl;
dimethylamidoborane(2-sec-butyl, 4-[3',5'-di-iso-propylphenyl]indenyl)$_2$zirconium dimethyl;
dimethylamidoborane(2-tert-butyl, 4-[3',5'-di-iso-propylphenyl]indenyl)$_2$zirconium dimethyl;
dimethylamidoborane(2-methyl, 4-[3',5'-di-phenylphenyl]indenyl)$_2$zirconium dimethyl;
dimethylamidoborane(2-ethyl, 4-[3',5'-di-phenylphenyl]indenyl)$_2$zirconium dimethyl;
dimethylamidoborane(2-n-propyl, 4-[3',5'-di-phenylphenyl]indenyl)$_2$zirconium dimethyl;
dimethylamidoborane(2-iso-propyl, 4-[3',5'-di-phenylphenyl]indenyl)$_2$zirconium dimethyl;
dimethylamidoborane(2-n-butyl, 4-[3',5'-di-phenylphenyl]indenyl)$_2$zirconium dimethyl;
dimethylamidoborane(2-iso-butyl, 4-[3',5'-di-phenylphenyl]indenyl)$_2$zirconium dimethyl;
dimethylamidoborane(2-sec-butyl, 4-[3',5'-di-phenylphenyl]indenyl)$_2$zirconium dimethyl;
dimethylamidoborane(2-tert-butyl, 4-[3',5'-di-phenylphenyl]indenyl)$_2$zirconium dimethyl;
diisopropylamidoborane(2-methyl, 4-[3',5'-di-tbutylphenyl]indenyl)$_2$zirconium dichloride;
diisopropylamidoborane(2-ethyl, 4-[3',5'-di-tbutylphenyl]indenyl)$_2$zirconium dichloride;
diisopropylamidoborane(2-n-propyl, 4-[3',5'-di-tbutylphenyl]indenyl)$_2$zirconium dichloride;
diisopropylamidoborane(2-iso-propyl, 4-[3',5'-di-tbutylphenyl]indenyl)$_2$zirconium dichloride;
diisopropylamidoborane(2-n-butyl, 4-[3',5'-di-tbutylphenyl]indenyl)$_2$zirconium dichloride;

diisopropylamidoborane(2-iso-butyl, 4-[3',5'-di-tbutylphenyl]indenyl)$_2$zirconium dichloride;
diisopropylamidoborane(2-sec-butyl, 4-[3',5'-di-tbutylphenyl]indenyl)$_2$zirconium dichloride
diisopropylamidoborane(2-tert-butyl, 4-[3',5'-di-tbutylphenyl]indenyl)$_2$zirconium dichloride;
diisopropylamidoborane(2-ethyl, 4-[3',5'-bis-trifluoromethylphenyl]indenyl)$_2$zirconium dichloride;
diisopropylamidoborane(2-n-propyl, 4-[3',5'-bis-trifluoromethylphenyl]indenyl)$_2$zirconium dichloride;
diisopropylamidoborane(2-iso-propyl, 4-[3',5'-bis-trifluoromethylphenyl]indenyl)$_2$zirconium dichloride;
diisopropylamidoborane(2-n-butyl, 4-[3',5'-bis-trifluoromethylphenyl]indenyl)$_2$zirconium dichloride;
diisopropylamidoborane(2-iso-butyl, 4-[3',5'-bis-trifluoromethylphenyl]indenyl)$_2$zirconium dichloride;
diisopropylamidoborane(2-sec-butyl, 4-[3',5'-bis-trifluoromethylphenyl]indenyl)$_2$zirconium dichloride;
diisopropylamidoborane(2-tert-butyl, 4-[3',5'-bis-trifluoromethylphenyl]indenyl)$_2$zirconium dichloride;
diisopropylamidoborane(2-ethyl, 4-[3',5'-di-iso-propylphenyl]indenyl)$_2$zirconium dichloride;
diisopropylamidoborane(2-n-propyl, 4-[3',5'-di-iso-propylphenyl]indenyl)$_2$zirconium dichloride
diisopropylamidoborane(2-iso-propyl, 4-[3',5'-di-iso-propylphenyl]indenyl)$_2$zirconium dichloride;
diisopropylamidoborane(2-n-butyl, 4-[3',5'-di-iso-propylphenyl]indenyl)$_2$zirconium dichloride;
diisopropylamidoborane(2-iso-butyl, 4-[3',5'-di-iso-propylphenyl]indenyl)$_2$zirconium dichloride;
diisopropylamidoborane(2-sec-butyl, 4-[3',5'-di-iso-propylphenyl]indenyl)$_2$zirconium dichloride;
diisopropylamidoborane(2-tert-butyl, 4-[3',5'-di-iso-propylphenyl]indenyl)$_2$zirconium dichloride;
diisopropylamidoborane(2-methyl, 4-[3',5'-di-phenylphenyl]indenyl)$_2$zirconium dichloride;
diisopropylamidoborane(2-ethyl, 4-[3',5'-di-phenylphenyl]indenyl)$_2$zirconium dichloride;
diisopropylamidoborane(2-n-propyl, 4-[3',5'-di-phenylphenyl]indenyl)$_2$zirconium dichloride;
diisopropylamidoborane(2-iso-propyl, 4-[3',5'-di-phenylphenyl]indenyl)$_2$zirconium dichloride;
diisopropylamidoborane(2-n-butyl, 4-[3',5'-di-phenylphenyl]indenyl)$_2$zirconium dichloride;
diisopropylamidoborane(2-iso-butyl, 4-[3',5'-di-phenylphenyl]indenyl)$_2$zirconium dichloride;
diisopropylamidoborane(2-sec-butyl, 4-[3',5'-di-phenylphenyl]indenyl)$_2$zirconium dichloride;
diisopropylamidoborane(2-tert-butyl, 4-[3',5'-di-phenylphenyl]indenyl)$_2$zirconium dichloride;
diisopropylamidoborane(2-methyl, 4-[3',5'-di-tbutylphenyl]indenyl)$_2$$\eta^4$-1,4-diphenyl-1,3-butadiene;
diisopropylamidoborane(2-ethyl, 4-[3',5'-di-tbutylphenyl]indenyl)$_2$$\eta^4$-1,4-diphenyl-1,3-butadiene;
diisopropylamidoborane(2-n-propyl, 4-[3,5'-di-tbutylphenyl]indenyl)$_2$$\eta^4$-1,4-diphenyl-1,3-butadiene;
diisopropylamidoborane(2-iso-propyl, 4-[3',5'-di-tbutylphenyl]indenyl)$_2$$\eta^4$-1,4-diphenyl-1,3-butadiene;
diisopropylamidoborane(2-n-butyl, 4-[3',5'-di-tbutylphenyl]indenyl)$_2$$\eta^4$-1,4-diphenyl-1,3-butadiene;
diisopropylamidoborane(2-iso-butyl, 4-[3',5'-di-tbutylphenyl]indenyl)$_2$$\eta^4$-1,4-diphenyl-1,3-butadiene;
diisopropylamidoborane(2-sec-butyl, 4-[3',5'-di-tbutylphenyl]indenyl)$_2$$\eta^4$-1,4-diphenyl-1,3-butadiene;
diisopropylamidoborane(2-tert-butyl, 4-[3',5'-di-tbutylphenyl]indenyl)$_2$$\eta^4$-1,4-diphenyl-1,3-butadiene;
diisopropylamidoborane(2-ethyl, 4-[3',5'-bis-trifluoromethylphenyl]indenyl)$_2$$\eta^4$-1,4-diphenyl-1,3-butadiene;
diisopropylamidoborane(2-n-propyl, 4-[3',5'-bis-trifluoromethylphenyl]indenyl)$_2$$\eta^4$-1,4-diphenyl-1,3-butadiene;
diisopropylamidoborane(2-iso-propyl, 4-[3',5'-bis-trifluoromethylphenyl]indenyl)$_2$$\eta^4$-1,4-diphenyl-1,3-butadiene;
diisopropylamidoborane(2-n-butyl, 4-[3',5'-bis-trifluoromethylphenyl]indenyl)$_2$$\eta^4$-1,4-diphenyl-1,3-butadiene;
diisopropylamidoborane(2-iso-butyl, 4-[3',5'-bis-trifluoromethylphenyl]indenyl)$_2$$\eta^4$-1,4-diphenyl-1,3-butadiene;
diisopropylamidoborane(2-sec-butyl, 4-[3',5'-bis-trifluoromethylphenyl]indenyl)$_2$$\eta^4$-1,4-diphenyl-1,3-butadiene;
diisopropylamidoborane(2-tert-butyl, 4-[3',5'-bis-trifluoromethylphenyl]indenyl)$_2$$\eta^4$-1,4-diphenyl-1,3-butadiene;
diisopropylamidoborane(2-ethyl, 4-[3',5'-di-iso-propylphenyl]indenyl)$_2$$\eta^4$-1,4-diphenyl-1,3-butadiene;
diisopropylamidoborane(2-n-propyl, 4-[3',5'-di-iso-propylphenyl]indenyl)$_2$$\eta^4$-1,4-diphenyl-1,3-butadiene;
diisopropylamidoborane(2-iso-propyl, 4-[3',5'-di-iso-propylphenyl]indenyl)$\eta^4$-1,4-diphenyl-1,3-butadiene;
diisopropylamidoborane(2-n-butyl, 4-[3',5'-di-iso-propylphenyl]indenyl)$_2$$\eta^4$-1,4-diphenyl-1,3-butadiene;
diisopropylamidoborane(2-iso-butyl, 4-[3',5'-di-iso-propylphenyl]indenyl)$_2$$\eta^4$-1,4-diphenyl-1,3-butadiene;
diisopropylamidoborane(2-sec-butyl, 4-[3',5'-di-iso-propylphenyl]indenyl)$_2$$\eta^4$-1,4-diphenyl-1,3-butadiene;
diisopropylamidoborane(2-tert-butyl, 4-[3',5'-di-iso-propylphenyl]indenyl)$_2$$\eta^4$-1,4-diphenyl-1,3-butadiene;
diisopropylamidoborane(2-methyl, 4-[3',5'-di-phenylphenyl]indenyl)$_2$$\eta^4$-1,4-diphenyl-1,3-butadiene;
diisopropylamidoborane(2-ethyl-4-[3',5'-di-phenylphenyl]indenyl)$_2$$\eta^4$-1,4-diphenyl-1,3-butadiene;
diisopropylamidoborane(2-n-propyl, 4-[3',5'-di-phenylphenyl]indenyl)$_2$$\eta^4$-1,4-diphenyl-1,3-butadiene;
diisopropylamidoborane(2-iso-propyl, 4-[3',5'-di-phenylphenyl]indenyl)$_2$$\eta^4$-1,4-diphenyl-1,3-butadiene;
diisopropylamidoborane(2-n-butyl, 4-[3',5'-di-phenylphenyl]indenyl)$_2$$\eta^4$-1,4-diphenyl-1,3-butadiene;
diisopropylamidoborane(2-iso-butyl, 4-[3',5'-di-phenylphenyl]indenyl)$_2$$\eta^4$-1,4-diphenyl-1,3-butadiene;
diisopropylamidoborane(2-sec-butyl, 4-[3',5'-di-phenylphenyl]indenyl)$_2$$\eta^4$-1,4-diphenyl-1,3-butadiene;
diisopropylamidoborane(2-tert-butyl, 4-[3',5'-di-phenylphenyl]indenyl)$_2$$\eta^4$-1,4-diphenyl-1,3-butadiene;
diisopropylamidoborane(2-methyl, 4-[3',5'-di-tbutylphenyl]indenyl)$_2$zirconium dimethyl;
diisopropylamidoborane(2-ethyl, 4-[3',5'-di-tbutylphenyl]indenyl)$_2$zirconium dimethyl;
diisopropylamidoborane(2-n-propyl, 4-[3',5'-di-tbutylphenyl]indenyl)$_2$zirconium dimethyl;
diisopropylamidoborane(2-iso-propyl, 4-[3',5'-di-tbutylphenyl]indenyl)$_2$zirconium dimethyl;
diisopropylamidoborane(2-n-butyl, 4-[3',5'-di-tbutylphenyl]indenyl)$_2$zirconium dimethyl;
diisopropylamidoborane(2-iso-butyl, 4-[3',5'-di-tbutylphenyl]indenyl)$_2$zirconium dimethyl;
diisopropylamidoborane(2-sec-butyl, 4-[3',5'-di-tbutylphenyl]indenyl)$_2$zirconium dimethyl;
diisopropylamidoborane(2-tert-butyl, 4-[3',5'-di-tbutylphenyl]indenyl)$_2$zirconium dimethyl;
diisopropylamidoborane(2-ethyl, 4-[3',5'-bis-trifluoromethylphenyl]indenyl)$_2$zirconium dimethyl;
diisopropylamidoborane(2-n-propyl, 4-[3',5'-bis-trifluoromethylphenyl]indenyl)$_2$zirconium dimethyl;
diisopropylamidoborane(2-iso-propyl, 4-[3',5'-bis-trifluoromethylphenyl]indenyl)$_2$zirconium dimethyl;

diisopropylamidoborane(2-n-butyl, 4-[3',5'-bis-trifluoromethylphenyl]indenyl)$_2$zirconium dimethyl;
diisopropylamidoborane(2-iso-butyl, 4-[3',5'-bis-trifluoromethylphenyl]indenyl)$_2$zirconium dimethyl;
diisopropylamidoborane(2-sec-butyl, 4-[3',5'-bis-trifluoromethylphenyl]indenyl)$_2$zirconium dimethyl;
diisopropylamidoborane(2-tert-butyl, 4-[3',5'-bis-trifluoromethylphenyl]indenyl)$_2$zirconium dimethyl;
diisopropylamidoborane(2-ethyl, 4-[3',5'-di-iso-propylphenyl]indenyl)$_2$zirconium dimethyl;
diisopropylamidoborane(2-n-propyl, 4-[3',5'-di-iso-propylphenyl]indenyl)$_2$zirconium dimethyl
diisopropylamidoborane(2-iso-propyl, 4-[3',5'-di-iso-propylphenyl]indenyl)$_2$zirconium dimethyl;
diisopropylamidoborane(2-n-butyl, 4-[3',5'-di-iso-propylphenyl]indenyl)$_2$zirconium dimethyl;
diisopropylamidoborane(2-iso-butyl, 4-[3',5'-di-iso-propylphenyl]indenyl)$_2$zirconium dimethyl;
diisopropylamidoborane(2-sec-butyl, 4-[3',5'-di-iso-propylphenyl]indenyl)$_2$zirconium dimethyl;
diisopropylamidoborane(2-tert-butyl, 4-[3',5'-di-iso-propylphenyl]indenyl)$_2$zirconium dimethyl;
diisopropylamidoborane(2-methyl, 4-[3',5'-di-phenylphenyl]indenyl)$_2$zirconium dimethyl;
diisopropylamidoborane(2-ethyl, 4-[3',5'-di-phenylphenyl]indenyl)$_2$zirconium dimethyl;
diisopropylamidoborane(2-n-propyl, 4-[3',5'-di-phenylphenyl]indenyl)$_2$zirconium dimethyl;
diisopropylamidoborane(2-iso-propyl, 4-[3',5'-di-phenylphenyl]indenyl)$_2$zirconium dimethyl;
diisopropylamidoborane(2-n-butyl, 4-[3',5'-di-phenylphenyl]indenyl)$_2$zirconium dimethyl;
diisopropylamidoborane(2-iso-butyl, 4-[3',5'-di-phenylphenyl]indenyl)$_2$zirconium dimethyl;
diisopropylamidoborane(2-sec-butyl, 4-[3',5'-di-phenylphenyl]indenyl)$_2$zirconium dimethyl;
diisopropylamidoborane(2-tert-butyl, 4-[3',5'-di-phenylphenyl]indenyl)$_2$zirconium dimethyl;
bis(trimethylsilyl)amidoborane(2-methyl, 4-[3',5'-di-tbutylphenyl]indenyl)$_2$zirconium dichloride;
bis(trimethylsilyl)amidoborane(2-ethyl, 4-[3',5'-di-tbutylphenyl]indenyl)$_2$zirconium dichloride;
bis(trimethylsilyl)amidoborane(2-n-propyl, 4-[3',5'-di-tbutylphenyl]indenyl)$_2$zirconium dichloride;
bis(trimethylsilyl)amidoborane(2-iso-propyl, 4-[3',5'-di-tbutylphenyl]indenyl)$_2$zirconium dichloride;
bis(trimethylsilyl)amidoborane(2-n-butyl, 4-[3',5'-di-tbutylphenyl]indenyl)$_2$zirconium dichloride;
bis(trimethylsilyl)amidoborane(2-iso-butyl, 4-[3',5'-di-tbutylphenyl]indenyl)$_2$zirconium dichloride;
bis(trimethylsilyl)amidoborane(2-sec-butyl, 4-[3',5'-di-tbutylphenyl]indenyl)$_2$zirconium dichloride;
bis(trimethylsilyl)amidoborane(2-tert-butyl, 4-[3',5'-di-tbutylphenyl]indenyl)$_2$zirconium dichloride;
bis(trimethylsilyl)amidoborane(2-ethyl, 4-[3',5'-bis-trifluoromethylphenyl]indenyl)$_2$zirconium dichloride;
bis(trimethylsilyl)amidoborane(2-n-propyl, 4-[3',5'-bis-trifluoromethylphenyl]indenyl)$_2$zirconium dichloride;
bis(trimethylsilyl)amidoborane(2-iso-propyl, 4-[3',5'-bis-trifluoromethylphenyl]indenyl)$_2$zirconium dichloride;
bis(trimethylsilyl)amidoborane(2-n-butyl, 4-[3',5'-bis-trifluoromethylphenyl]indenyl)$_2$zirconium dichloride;
bis(trimethylsilyl)amidoborane(2-iso-butyl, 4-[3',5'-bis-trifluoromethylphenyl]indenyl)$_2$zirconium dichloride;
bis(trimethylsilyl)amidoborane(2-sec-butyl, 4-[3',5'-bis-trifluoromethylphenyl]indenyl)$_2$zirconium dichloride;
bis(trimethylsilyl)amidoborane(2-tert-butyl, 4-[3',5'-bis-trifluoromethylphenyl]indenyl)$_2$zirconium dichloride;
bis(trimethylsilyl)amidoborane(2-ethyl, 4-[3',5'-di-iso-propylphenyl]indenyl)$_2$zirconium dichloride;
bis(trimethylsilyl)amidoborane(2-n-propyl, 4-[3',5'-di-iso-propylphenyl]indenyl)$_2$zirconium dichloride
bis(trimethylsilyl)amidoborane(2-iso-propyl, 4-[3',5'-di-iso-propylphenyl]indenyl)$_2$zirconium dichloride;
bis(trimethylsilyl)amidoborane(2-n-butyl, 4-[3',5'-di-iso-propylphenyl]indenyl)$_2$zirconium dichloride;
bis(trimethylsilyl)amidoborane(2-iso-butyl, 4-[3',5'-di-iso-propylphenyl]indenyl)$_2$zirconium dichloride;
bis(trimethylsilyl)amidoborane(2-sec-butyl, 4-[3',5'-di-iso-propylphenyl]indenyl)$_2$zirconium dichloride;
bis(trimethylsilyl)amidoborane(2-tert-butyl, 4-[3',5'-di-iso-propylphenyl]indenyl)$_2$zirconium dichloride;
bis(trimethylsilyl)amidoborane(2-methyl, 4-[3',5'-di-phenylphenyl]indenyl)$_2$zirconium dichloride;
bis(trimethylsilyl)amidoborane(2-ethyl, 4-[3',5'-di-phenylphenyl]indenyl)$_2$zirconium dichloride;
bis(trimethylsilyl)amidoborane(2-n-propyl, 4-[3',5'-di-phenylphenyl]indenyl)$_2$zirconium dichloride;
bis(trimethylsilyl)amidoborane(2-iso-propyl, 4-[3',5'-di-phenylphenyl]indenyl)$_2$zirconium dichloride;
bis(trimethylsilyl)amidoborane(2-n-butyl, 4-[3',5'-di-phenylphenyl]indenyl)$_2$zirconium dichloride;
bis(trimethylsilyl)amidoborane(2-iso-butyl, 4-[3',5'-di-phenylphenyl]indenyl)$_2$zirconium dichloride;
bis(trimethylsilyl)amidoborane(2-sec-butyl, 4-[3',5'-di-phenylphenyl]indenyl)$_2$zirconium dichloride;
bis(trimethylsilyl)amidoborane(2-tert-butyl, 4-[3',5'-di-phenylphenyl]indenyl)$_2$zirconium dichloride;
bis(trimethylsilyl)amidoborane(2-methyl, 4-[3',5'-di-tbutylphenyl]indenyl)$_2\eta^4$-1,4-diphenyl-1,3-butadiene;
bis(trimethylsilyl)amidoborane(2-ethyl, 4-[3',5'-di-tbutylphenyl]indenyl)$_2\eta^4$-1,4-diphenyl-1,3-butadiene;
bis(trimethylsilyl)amidoborane(2-n-propyl, 4-[3',5'-di-tbutylphenyl]indenyl)$_2\eta^4$-1,4-diphenyl-1,3-butadiene;
bis(trimethylsilyl)amidoborane(2-iso-propyl, 4-[3',5'-di-tbutylphenyl]indenyl)$_2\eta^4$-1,4-diphenyl-1,3-butadiene;
bis(trimethylsilyl)amidoborane(2-n-butyl, 4-[3',5'-di-tbutylphenyl]indenyl)$_2\eta^4$-1,4-diphenyl-1,3-butadiene;
bis(trimethylsilyl)amidoborane(2-iso-butyl, 4-[3',5'-di-tbutylphenyl]indenyl)$_2\eta^4$-1,4-diphenyl-1,3-butadiene;
bis(trimethylsilyl)amidoborane(2-sec-butyl, 4-[3',5'-di-tbutylphenyl]indenyl)$_2\eta^4$-1,4-diphenyl-1,3-butadiene;
bis(trimethylsilyl)amidoborane(2-tert-butyl, 4-[3',5'-di-tbutylphenyl]indenyl)$_2\eta^4$-1,4-diphenyl-1,3-butadiene;
bis(trimethylsilyl)amidoborane(2-ethyl, 4-[3',5'-bis-trifluoromethylphenyl]indenyl)$_2\eta^4$-1,4-diphenyl-1,3-butadiene;
bis(trimethylsilyl)amidoborane(2-n-propyl, 4-[3',5'-bis-trifluoromethylphenyl]indenyl)$_2\eta^4$-1,4-diphenyl-1,3-butadiene;
bis(trimethylsilyl)amidoborane(2-iso-propyl, 4-[3',5'-bis-trifluoromethylphenyl]indenyl)$_2\eta^4$-1,4-diphenyl-1,3-butadiene;
bis(trimethylsilyl)amidoborane(2-n-butyl, 4-[3',5'-bis-trifluoromethylphenyl]indenyl)$_2\eta^4$-1,4-diphenyl-1,3-butadiene;
bis(trimethylsilyl)amidoborane(2-iso-butyl, 4-[3',5'-bis-trifluoromethylphenyl]indenyl)$_2\eta^4$-1,4-diphenyl-1,3-butadiene;
bis(trimethylsilyl)amidoborane(2-sec-butyl, 4-[3',5'-bis-trifluoromethylphenyl]indenyl)$_2\eta^4$-1,4-diphenyl-1,3-butadiene;

bis(trimethylsilyl)amidoborane(2-tert-butyl, 4-[3',5'-bis-trifluoromethylphenyl]indenyl)$_2\eta^4$-1,4-diphenyl-1,3-butadiene;
bis(trimethylsilyl)amidoborane(2-ethyl, 4-[3',5'-di-iso-propylphenyl]indenyl)$_2\eta^4$-1,4-diphenyl-1,3-butadiene;
bis(trimethylsilyl)amidoborane(2-n-propyl, 4-[3',5'-di-iso-propylphenyl]indenyl)$_2\eta^4$-1,4-diphenyl-1,3-butadiene;
bis(trimethylsilyl)amidoborane(2-iso-propyl, 4-[3',5'-di-iso-propylphenyl]indenyl) $\eta^4$-1,4-diphenyl-1,3-butadiene;
bis(trimethylsilyl)amidoborane(2-n-butyl, 4-[3',5'-di-iso-propylphenyl]indenyl)$_2\eta^4$-1,4-diphenyl-1,3-butadiene;
bis(trimethylsilyl)amidoborane(2-iso-butyl, 4-[3',5'-di-iso-propylphenyl]indenyl)$_2\eta^4$-1,4-diphenyl-1,3-butadiene;
bis(trimethylsilyl)amidoborane(2-sec-butyl, 4-[3',5'-di-iso-propylphenyl]indenyl)$_2\eta^4$-1,4-diphenyl-1,3-butadiene;
bis(trimethylsilyl)amidoborane(2-tert-butyl, 4-[3',5'-di-iso-propylphenyl]indenyl)$_2\eta^4$-1,4-diphenyl-1,3-butadiene;
bis(trimethylsilyl)amidoborane(2-methyl, 4-[3',5'-di-phenylphenyl]indenyl)$_2\eta^4$-1,4-diphenyl-1,3-butadiene;
bis(trimethylsilyl)amidoborane(2-ethyl, 4-[3',5'-di-phenylphenyl]indenyl)$_2\eta^4$-1,4-diphenyl-1,3-butadiene;
bis(trimethylsilyl)amidoborane(2-n-propyl, 4-[3',5'-di-phenylphenyl]indenyl)$_2\eta^4$-1,4-diphenyl-1,3-butadiene;
bis(trimethylsilyl)amidoborane(2-iso-propyl, 4-[3',5'-di-phenylphenyl]indenyl)$_2\eta^4$-1,4-diphenyl-1,3-butadiene;
bis(trimethylsilyl)amidoborane(2-n-butyl, 4-[3',5'-di-phenylphenyl]indenyl)$_2\eta^4$-1,4-diphenyl-1,3-butadiene;
bis(trimethylsilyl)amidoborane(2-iso-butyl, 4-[3',5'-di-phenylphenyl]indenyl)$_2\eta^4$-1,4-diphenyl-1,3-butadiene;
bis(trimethylsilyl)amidoborane(2-sec-butyl, 4-[3',5'-di-phenylphenyl]indenyl)$_2\eta^4$-1,4-diphenyl-1,3-butadiene;
bis(trimethylsilyl)amidoborane(2-tert-butyl, 4-[3',5'-di-phenylphenyl]indenyl)$_2\eta^4$-1,4-diphenyl-1,3-butadiene;
bis(trimethylsilyl)amidoborane(2-methyl, 4-[3',5'-di-tbutylphenyl]indenyl)$_2$zirconium dimethyl;
bis(trimethylsilyl)amidoborane(2-ethyl, 4-[3',5'-di-tbutylphenyl]indenyl)$_2$zirconium dimethyl;
bis(trimethylsilyl)amidoborane(2-n-propyl, 4-[3',5'-di-tbutylphenyl]indenyl)$_2$zirconium dimethyl;
bis(trimethylsilyl)amidoborane(2-iso-propyl, 4-[3',5'-di-tbutylphenyl]indenyl)$_2$zirconium dimethyl;
bis(trimethylsilyl)amidoborane(2-n-butyl, 4-[3',5'-di-tbutylphenyl]indenyl)$_2$zirconium dimethyl;
bis(trimethylsilyl)amidoborane(2-iso-butyl, 4-[3',5'-di-tbutylphenyl]indenyl)$_2$zirconium dimethyl;
bis(trimethylsilyl)amidoborane(2-sec-butyl, 4-[3',5'-di-tbutylphenyl]indenyl)$_2$zirconium dimethyl;
bis(trimethylsilyl)amidoborane(2-tert-butyl, 4-[3',5'-di-tbutylphenyl]indenyl)$_2$zirconium dimethyl;
bis(trimethylsilyl)amidoborane(2-ethyl, 4-[3',5'-bis-trifluoromethylphenyl]indenyl)$_2$zirconium dimethyl;
bis(trimethylsilyl)amidoborane(2-n-propyl, 4-[3',5'-bis-trifluoromethylphenyl]indenyl)$_2$zirconium dimethyl;
bis(trimethylsilyl)amidoborane(2-iso-propyl, 4-[3',5'-bis-trifluoromethylphenyl]indenyl)$_2$zirconium dimethyl;
bis(trimethylsilyl)amidoborane(2-n-butyl, 4-[3',5'-bis-trifluoromethylphenyl]indenyl)$_2$zirconium dimethyl;
bis(trimethylsilyl)amidoborane(2-iso-butyl, 4-[3',5'-bis-trifluoromethylphenyl]indenyl)$_2$zirconium dimethyl;
bis(trimethylsilyl)amidoborane(2-sec-butyl, 4-[3',5'-bis-trifluoromethylphenyl]indenyl)$_2$zirconium dimethyl;
bis(trimethylsilyl)amidoborane(2-tert-butyl, 4-[3',5'-bis-trifluoromethylphenyl]indenyl)$_2$zirconium dimethyl;
bis(trimethylsilyl)amidoborane(2-ethyl, 4-[3',5'-di-iso-propylphenyl]indenyl)$_2$zirconium dimethyl;
bis(trimethylsilyl)amidoborane(2-n-propyl, 4-[3',5'-di-iso-propylphenyl]indenyl)$_2$zirconium dimethyl
bis(trimethylsilyl)amidoborane(2-iso-propyl, 4-[3',5'-di-iso-propylphenyl]indenyl)$_2$zirconium dimethyl;
bis(trimethylsilyl)amidoborane(2-n-butyl, 4-[3',5'-di-iso-propylphenyl]indenyl)$_2$zirconium dimethyl;
bis(trimethylsilyl)amidoborane(2-iso-butyl, 4-[3',5'-di-iso-propylphenyl]indenyl)$_2$zirconium dimethyl;
bis(trimethylsilyl)amidoborane(2-sec-butyl, 4-[3',5'-di-iso-propylphenyl]indenyl)$_2$zirconium dimethyl;
bis(trimethylsilyl)amidoborane(2-tert-butyl, 4-[3',5'-di-iso-propylphenyl]indenyl)$_2$zirconium dimethyl;
bis(trimethylsilyl)amidoborane(2-methyl, 4-[3',5'-di-phenylphenyl]indenyl)$_2$zirconium dimethyl;
bis(trimethylsilyl)amidoborane(2-ethyl, 4-[3',5'-di-phenylphenyl]indenyl)$_2$zirconium dimethyl;
bis(trimethylsilyl)amidoborane(2-n-propyl, 4-[3',5'-di-phenylphenyl]indenyl)$_2$zirconium dimethyl;
bis(trimethylsilyl)amidoborane(2-iso-propyl, 4-[3',5'-di-phenylphenyl]indenyl)$_2$zirconium dimethyl;
bis(trimethylsilyl)amidoborane(2-n-butyl, 4-[3',5'-di-phenylphenyl]indenyl)$_2$zirconium dimethyl;
bis(trimethylsilyl)amidoborane(2-iso-butyl, 4-[3',5'-di-phenylphenyl]indenyl)$_2$zirconium dimethyl;
bis(trimethylsilyl)amidoborane(2-sec-butyl, 4-[3',5'-di-phenylphenyl]indenyl)$_2$zirconium dimethyl; and
bis(trimethylsilyl)amidoborane(2-tert-butyl, 4-[3',5'-di-phenylphenyl]indenyl)$_2$zirconium dimethyl.

Activators

The terms "cocatalyst" and "activator" are used herein interchangeably and are defined to be any compound or component which can activate a bulky ligand transition metal compound, e.g., any of the metallocenes defined above. Alumoxane may be used as an activator. A variety of methods can be used for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, each of which is fully incorporated herein by reference. It may be preferable to use a visually clear methylalumoxane. A cloudy or gelled alumoxane can be filtered to produce a clear solution or clear alumoxane can be decanted from the cloudy solution.

Also useful in the described processes are ionizing activators, neutral or ionic, or compounds such as dimethylanilinium tetrakis(perfluorophenyl) boron and tri(n-butyl)ammonium tetrakis(pentaflurophenyl)boron, which ionize the neutral metallocene compound. Such ionizing compounds may contain an active proton, or some other cation associated with but not coordinated or only loosely coordinated to the remaining ion of the ionizing compound. Combinations of activators are also contemplated for use in the process, for example, alumoxane and ionizing activators in combinations, see for example, WO 94/07928. In preferred embodiments of the process, dimethylanilinium tetrakis(perfluorophenyl) boron is used to activate the metallocene compound, e.g., by affixing the dimethylanilinium tetrakis (perfluorophenyl) boron to the support, together with the metallocene compound. In preferred embodiments, the support is a silica compound.

Descriptions of ionic catalysts for coordination polymerization comprised of metallocene cations activated by non-coordinating anions appear in EP-A-0 277 003, EP-A-0 277 004 and U.S. Pat. No. 5,198,401 and WO-A-30 92/00333 (incorporated herein by reference). These teach a preferred method of preparation wherein metallocenes are protonated by an anion precursor such that an alkyl/hydride group is abstracted from a transition metal to make it both cationic and charge-balanced by the non-coordinating anion.

The term "noncoordinating anion" means an anion which either does not coordinate to a cation or which is only weakly coordinated to a cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this disclosure are those which are compatible, stabilize the metallocene cation in the sense of balancing its ionic charge in a +1 state, yet retain sufficient liability to permit displacement by an ethylenically or acetylenically unsaturated monomer during polymerization.

The use of ionizing ionic compounds not containing an active proton but capable of producing both the active metallocene cation and an noncoordinating anion is also known, see, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl) boron, see, EP-A-0 520 732 (incorporated herein by reference). Ionic catalysts for addition polymerization can also be prepared by oxidation of the metal centers of transition metal compounds by anion precursors containing metallic oxidizing groups along with the anion groups. See, EP-A-0 495 375 (incorporated herein by reference).

Where the metal ligands include halogen moieties (for example, bis-cyclopentadienyl zirconium dichloride) which are not capable of ionizing abstraction under standard conditions, they can be converted via known alkylation reactions with organometallic compounds such as lithium or aluminum hydrides or alkyls, alkylalumoxanes, Grignard reagents, etc. See, EP-A-0 500 944 and EP-A1-0 570 982 (incorporated herein by reference) for in situ processes describing the reaction of alkyl aluminum compounds with dihalo-substituted metallocene compounds prior to or with the addition of activating anionic compounds.

Preferred activators for use in this invention include: trimethylammonium tetraphenylborate, triethylammonium tetraphenylborate, tripropylammonium tetraphenylborate, tri(n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis (pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, trimethylammonium tetrakis(perfluoronaphthyl)borate, triethylammonium tetrakis(perfluoronaphthyl)borate, tripropylammonium tetrakis(perfluoronaphthyl)borate, tri(n-butyl)ammonium tetrakis(perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium) tetrakis(perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl)ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium) tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(tert-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium) tetrakis(3,5-bis(trifluoromethyl)phenyl)borate, di-(iso-propyl)ammonium tetrakis(pentafluorophenyl)borate, dicyclohexylammonium tetrakis(pentafluorophenyl)borate; tri(o-tolyl)phosphonium tetrakis(pentafluorophenyl)borate, tri(2,6-dimethylphenyl) phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, and benzene(diazonium)tetrakis(3,5-bis(trifluoromethyl)phenyl)borate. Most preferably, the activator is N,N-dimethylanilinium tetrakis(perfluorophenyl)borate, N,N-dimethylanilinium tetrakis(perfluoronaphthyl)borate, N,N-dimethylanilinium tetrakis(perfluorobiphenyl)borate, N,N-dimethylanilinium tetrakis(3,5-bis(trifluoromethyl)

phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, and/or triphenylcarbenium tetra(perfluorophenyl)borate.

Catalyst Supports.

The metallocenes referenced herein may be supported using a porous particulate material, such as for example, talc, inorganic oxides, inorganic chlorides and resinous materials such as polyolefin or polymeric compounds.

Preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Preferably the support material is porous silica which has a surface area in the range of from about 10 to about 700 $m^2/g$, a total pore volume in the range of from about 0.1 to about 4.0 cc/g and an average particle size in the range of from about 10 to about 500 μm. More preferably, the surface area is in the range of from about 50 to about 500 $m^2/g$, the pore volume is in the range of from about 0.5 to about 3.5 cc/g and the average particle size is in the range of from about 20 to about 200 μm. Most preferably the surface area is in the range of from about 100 to about 400 $m^2/g$, the pore volume is in the range of from about 0.8 to about 3.0 cc/g and the average particle size is in the range of from about 30 to about 100 μm. The average pore size of typical porous support materials is ≧10 Å. Preferably, a support material is used that has an average pore diameter of ≧50 Å and most preferably it is in the range of from about 75 to about 350 Å. It may be particularly desirable to dehydrate the silica at a temperature of from about 100° C. to about 800° C. anywhere from about 3 to about 24 hours.

The metallocenes, activator and support material may be combined in any number of ways. Suitable support techniques are described in U.S. Pat. Nos. 4,808,561 and 4,701,432 (each fully incorporated herein by reference.). Preferably the metallocenes and activator are combined and their reaction product supported on the porous support material as described in U.S. Pat. No. 5,240,894 and WO 94/28034, WO 96/00243, and WO 96/00245 (each fully incorporated herein by reference.) Alternatively, the metallocenes may be preactivated separately and then combined with the support material either separately or together. If the metallocenes and activator are separately supported, then preferably, they are dried then combined as a powder before use in polymerization. Regardless of whether the metallocene and activator are separately precontacted or whether the metallocene and activator are combined at once, two or more metallocene compounds may be supported together (co-deposit) or separately (physical blend).

The total volume of reaction solution applied to porous support is preferably less than about 4 times the total pore volume of the porous support, more preferably less than about 3 times the total pore volume of the porous support and even more preferably in the range of from more than about 1 to less than about 2.5 times the total pore volume of the porous support. Procedures for measuring the total pore volume of porous support are well known in the art. The preferred method is described in Volume 1, Experimental Methods in Catalyst Research, Academic Press, 1968, pages 67-96.

Methods of supporting ionic catalysts including metallocene cations and noncoordinating anions are described in WO 91/09882, WO 94/03506, WO 96/04319 and U.S. Pat. No. 5,643,847 (incorporated herein by reference). The methods generally include either physical adsorption on traditional polymeric or inorganic supports that have been largely dehydrated and dehydroxylated, or using neutral anion precursors that are sufficiently strong Lewis acids to activate retained hydroxy groups in silica containing inorganic oxide supports such that the Lewis acid becomes covalently bound and the hydrogen of the hydroxy group is available to protonate the metallocene compounds.

The supported catalyst system may be used directly in polymerization or the catalyst system may be prepolymerized using methods well known in the art. The supported catalyst is typically added to the polymerization medium as a suspension in mineral oil. For details regarding prepolymerization, see U.S. Pat. Nos. 4,923,833 and 4,921,825, EP 0 279 863 and EP 0 354 893 each of which is fully incorporated herein by reference.

For preparation of the branched polypropylene, preactivation of the metallocene may be advantageous. For example, it is widely known in the art that preactivation of the metallocene before addition to a continuous reactor yields higher activities than continuous addition of metallocene and activator in two separate streams. Furthermore, it may be advantageous to control precontacting time to maximize catalyst effectiveness, e.g., avoiding excessive aging of the activated catalyst composition.

Monomers

The process described herein may be used for the polymerization of propylene and one or more comonomers. Typical comonomers monomers include olefins having from 4 to 30 carbon atoms, preferably 4-12 carbon atoms, and more preferably 4 to 8 carbon atoms. Useful monomers include linear, branched or cyclic olefins; linear, branched or cyclic alpha olefins; linear, branched or cyclic diolefins; linear, branched or cyclic alpha-omega olefins; linear, branched or cyclic polyenes; and linear, branched or cyclic alpha olefins.

In a preferred embodiment the polymer produced herein is a propylene homopolymer or copolymer. The comonomer is preferably a C4 to C20 linear, branched or cyclic monomer, and in one embodiment is a C4 to C12 linear or branched alpha-olefin, preferably butene, pentene, hexene, heptene, octene, nonene, decene, dodecene, 4-methyl-pentene-1,3-methyl pentene-1,5-ethyl-1-nonene, 3,5,5-trimethyl-hexene-1, norbornene, norbornadiene, vinyl norbornene, ethylidene norbornene, and the like. Ethylene may be present at 5 mol % or less.

In another embodiment the polymer produced herein is a copolymer of one or more linear or branched C3 to C30 prochiral alpha-olefins or C5 to C30 ring containing olefins or combinations thereof capable of being polymerized by either stereospecific and non-stereospecific catalysts. Prochiral, as used herein, refers to monomers that favor the formation of isotactic or syndiotactic polymer when polymerized using stereospecific catalyst(s).

Useful comonomers also include aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to C1 to C10 alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene.

Non aromatic cyclic group containing monomers are also useful as comonomers. These monomers can contain up to 30 carbon atoms. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, C1 to C10 alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin comonomers useful in this invention include any hydrocarbon structure, preferably C4 to C30, having at least two unsaturated bonds, wherein at least two of the unsaturated bonds are readily incorporated into a polymer by either a stereospecific or a non-stereospecific catalyst(s). It is further preferred that the diolefin comonomers be selected from alpha, omega-diene comonomers (i.e. di-vinyl monomers). More preferably, the diolefin comonomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment one or more dienes are present in the polymer produced herein at up to 10 weight %, preferably at 0.00001 to 1.0 weight %, preferably 0.002 to 0.5 weight %, even more preferably 0.003 to 0.2 weight %, based upon the total weight of the composition. In some embodiments 500 ppm or less of diene is added to the polymerization, preferably 400 ppm or less, preferably or 300 ppm or less. In other embodiments at least 50 ppm of diene is added to the polymerization, or 100 ppm or more, or 150 ppm or more.

In a preferred embodiment the polymer comprises less than 3 weight % ethylene, preferably less than 2.5 weight %, preferably less than 2 weight %, preferably less than 1.5 weight %, preferably less than 1 weight %, preferably less than 0.75 weight %, preferably 0.5 weight %, preferably less than 0.25 weight %, preferably less than 0.15 weight %, preferably less than 0.1 weight %.

Reactors

The processes described herein may be used for the polymerization of propylene in high-pressure reactors. The most general requirement for a suitable reactor is that the reactor must be substantially unreactive with the polymerization reaction components. Likewise, the reactor must be able to withstand the high pressures and temperatures that occur during the polymerization reaction. Such reactors are known as high-pressure reactors for purposes of this disclosure. Withstanding these high pressures and temperatures will allow the reactor to maintain the propylene under supercritical conditions. Suitable reaction vessels include those known in the art to maintain supercritical or other high-pressure ethylene polymerization reactions. Suitable reactors are selected from autoclave, tubular, and autoclave/tubular reactors. For purposes of this disclosure, high temperature and pressure are defined as temperatures and pressures greater than the reaction medium's critical point. Invention processes typically use bulk propylene as the reaction medium. Typically, invention polymerization processes are operated such that the reaction medium is at high enough temperatures and pressures so that the medium is in a supercritical state.

In a preferred embodiment the process described herein may be used in autoclave and or tubular reactors. Typically, autoclave reactors have length-to-diameter ratios of 1:1 to 20:1 and are fitted with a high-speed (up to 1500 RPM) multiblade stirrer.

Autoclave pressures are typically greater than 6 MPa. Coupled with these, maximum autoclave pressures are typically less than 260 MPa. When the autoclave has a low length-to-diameter ratio (such as less than 4) propylene and other monomers are typically injected at only one position. But injection at two or more positions in the autoclave is also possible. For instance, in reactors where the length-to-diameter ratio is around 4-20, the reactor can contain up to six different injection positions.

Additionally, in the larger (longer) autoclaves, one or more lateral fixing devices support the high-speed stirrer. These fixing devices can also divide the autoclave into two or more zones. Mixing blades on the stirrer can differ from zone to zone to allow for plug flow or back mixing, largely independently, in the separate zones. Two or more autoclaves with one or more zones can connect in series to tailor polymer structure.

A tubular reactor is another reactor type capable of operating up to about 350 MPa. It is fitted with external cooling and one or more injection points along the (tubular) reaction zone. As in autoclaves, these injection points serve as entry points for propylene, one or more comonomer, catalyst, or mixtures of these. In tubular reactors, external cooling allows for increased monomer conversion relative to an autoclave, where the low surface-to-volume ratio hinders any significant heat removal. Tubular reactors have a special outlet valve that car, send a pressure shockwave backward along the tube. The shockwave helps dislodge any polymer residue that has formed on reactor walls during operation. Another way of dealing with wall deposits is to fabricate the tube with smooth, polished internal surfaces Tubular reactors can operate at pressures up to 360 MPa. They have lengths of 100-2000 meters and internal diameters usually less than 10 cm.

Reactors that pair autoclaves with tubular reactors can also serve in invention processes. In such instances, the autoclave typically precedes the tubular reactor. Such systems may have injection of additional catalyst and/or feed components at several points in the autoclave and more particularly along the tube length.

In both autoclaves and tubular reactors, feeds are injected at or below room temperature to provide maximum polymer production within the limits of maximum operating temperature or within product specifications. In autoclave operation, a preheater operates at startup, but not after the reaction reaches steady state if the first mixing zone has some back-mixing characteristics. In tubular reactors, the feed is first heated in a preheater or prewarmer before passing into the cooled section where reaction takes place.

In both multizone autoclaves and tubular reactors, catalyst can not only be injected at the inlet, but also optionally at one or more points along the reactor. The catalyst feeds injected at the inlet and other injection points can be the same or different in terms of content, density, concentration, etc. Choosing different catalyst feeds allows polymer design tailoring.

The autoclave or tubular reactor effluent is depressurized on entering the high pressure separator (HPS).

At the reactor outlet valve the pressure drops to begin the separation of polymer and unreacted monomer, co-monomers, propane, etc. The temperature in this vessel is typically maintained above the polymer product's crystallization point but the pressure may be below the critical point. The pressure need only be high enough that the propylene can be condensed against standard cooling water. The liquid recycle stream can then be recycled to the reactor with a liquid pumping system instead of the hyper-compressors required for Polyethylene units. The relatively low pressure in this separator will reduce the monomer concentration in the liquid polymer phase which will result in a much lower polymerization rate. This polymerization rate may be low enough to operate this system without adding a catalyst poison or "killer". If no poison is added to the system then the recycle stream will not require treating before it can be fed back to the reactors If however a catalyst killer is required (e.g., to prevent reactions in the high pressure recycle) then provision is preferably made to remove any potential catalyst poisons from the recycled propylene rich monomer stream e.g. by the use of fixed bed adsorbents or by scavenging with an aluminum alkyl.

Alternatively, the HPS may be operated over propylene's critical pressure but within the propylene/polypropylene two phase region. This is an economically preferred method if polypropylene is to be produced with a revamped HPPE plant. The recycled HPS overhead is cooled and dewaxed before being returned to the suction of the secondary compressor, which is typical of HPPE plant operation.

The polymer from this intermediate or high pressure vessel will then go through another pressure reduction step to a low pressure separator.

In addition to autoclave reactors, tubular reactors, or reactors combining these, loop-type reactors may be used with the process of this invention as well. In this reactor type, monomer enters and polymer exits continuously at different points along the loop, while an in-line pump continuously circulates the contents (reaction liquid). The feed/product takeoff rates control total average residence time. A cooling jacket removes reaction heat from the loop.

Industrially a loop reactor is not operated at the high pressures encountered in autoclaves and tubes. One version of the PP process operates in a supercritical region but below the cloud point curve of the polymer and at temperatures below the polymer crystallization point. Thus the polymer is present as a slurry with the temperature below the melting point of the polymer to avoid fouling deposition of polymer on the wall thereby reducing heat exchange.

Commercial low pressure loop reactors typically have diameters of 16 to 24 inches and lengths of 100 to 200+ meters. Operation in a single supercritical polypropylene in propylene solution phase typically uses pressures of greater than 25 to 30 MPa. At these pressures smaller diameter thicker wall loop tubing is generally used resulting in potential difficulties in pump around efficiency and maximum allowable reactor capacity.

In another embodiment, the processes of this invention may be used in the reactor systems described in U.S. Pat. No. 6,355,741, which discloses a reactor with at least two loops. Invention processes can be used with these two-loop reactors especially, if at least one of the loops uses invention supercritical conditions.

Reaction Conditions

Preferred residence time in high pressure reactors are generally in the range of 15 munites or less, preferably 10 minutes or less, preferably 5 minutes or less, more preferably between 30 seconds and 5 minutes.

Feed inlet temperatures are generally at or below room temperature to provide cooling to the exothermic reaction in the reactor operating above the crystallization temperature of the polymer product.

Propylene and higher olefins are far less susceptible to temperature runaway and explosive decomposition than ethylene, so potentially a higher maximum reactor operating temperature can be tolerated but within the limits of catalyst activity, molecular weight and isotactivity requirements of the products.

Pressure

Two phase operation is preferred for production of polymers containing more long chain branching since a metallocene catalytic complex may be preferentially soluble in the polymer rich phase allowing chain end incorporation of the terminally unsaturated polypropylene based chains in subsequent copolymerizations in a propylene starved medium.

Branching may also be favored by running the reaction to conversions above 30%.

Comonomers, Dual Catalysts and Polymer Structure

In reactors with multiple injection points for catalyst and feed there exists the possibility to tailor the polymer design. Use of more than one catalyst having different molecular weight and structural capabilities allows a wide variety of product compositions (e.g. bimodal, linear mixed with long chain branched).

The various olefins will have differing reactivity ratios for a given catalyst so a plug flow type operation will allow compositional tapering if, for instance, no feeds are injected down the reactor or compensation of the tapering if the more reactive monomer is injected preferentially along the tube. Operation of two autoclaves in series or parallel can allow the use of tailoring by altering the composition of fresh feed to the second reactor.

Catalyst Killing

The reactor effluent is depressurized to an intermediate pressure significantly below the cloud point pressure but nevertheless supercritical for that composition. This allows separation of a polymer rich phase for further purification and a propylene rich phase for recycle compression back to the reactor.

This separation is carried out in a vessel known as a high pressure separator (HPS). Since this vessel also has a significant residence time, the catalyst activity is typically killed by addition of a polar species such as water, alcohol or sodium/calcium stearate. The choice and quantity of killing agent will depend on the requirements for clean up of the recycle propylene and comonomers as well as the product properties, if the killing agent has low volatility.

Alternatively the intermediate separation can be done at pressures well below the critical point so that the monomer concentration and therefore reactivity in the high pressure separator is relatively low. The relatively small amount of continued polymerization in this vessel may not be a problem, so addition of catalyst deactivating compounds may be avoided presuming that no undesired reactions occur in the high or intermediate pressure recycle system. If no killing compounds are added then the killer removal step can be eliminated.

Choice of Propylene Feed Purity

Propylene is available commercially at two levels of purity—polymer grade at 99.5% and chemical grade at about 93 to 95%. The choice of feed will set the level of purge required from the recycle to avoid over dilution of the feed by inert propane. The presence of propane in the reactor and HPS will raise the pressure of the cloud point curve for a given temperature but will decrease the polymerization efficiency due to a decrease in propylene (and other olefin) concentrations in the reactor. The elevation of cloud point pressure due to propane will widen the operating window of the HPS. In copolymerizations of propylene with limited amounts of ethylene, a similar effect in raising the cloud point pressure will be noted due to the presence of low levels of ethylene in the HPS.

Low Pressure Separator Operation

The LPS running at just above atmospheric pressure is a sub critical flash of light components, reactants and oligomers thereof, for the purpose of producing a low volatile containing polymer melt entering the finishing extruder or static mixer.

Applications

The polymer compositions of this invention (and blends thereof as described above) may be used in any known thermoplastic or elastomer application. Examples include uses in molded parts, films, tapes, sheets, tubing, hose, sheeting, wire and cable coating, adhesives, shoesoles, bumpers, gaskets, bellows, films, fibers, elastic fibers, non-wovens, spunbonds, sealants, surgical gowns and medical devices.

Adhesives

The polymers of this invention or blends thereof can be used as adhesives, either alone or combined with tackifiers. Preferred tackifiers are described above. The tackifier is typically present at about 1 weight % to about 50 weight %, based upon the weight of the blend, more preferably 10 weight % to 40 weight even more preferably 20 weight % to 40 weight %. Other additives, as described above, may be added also.

The adhesives of this invention can be used in any adhesive application, including but not limited to, disposables, packaging, laminates, pressure sensitive adhesives, tapes labels, wood binding, paper binding, non-wovens, road marking, reflective coatings, and the like. In a preferred embodiment the adhesives of this invention can be used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Films

The compositions described above and the blends thereof may be formed into monolayer or multilayer films. These films may be formed by any of the conventional techniques known in the art including extrusion, co-extrusion, extrusion coating, lamination, blowing and casting. The film may be obtained by the flat film or tubular process which may be followed by orientation in an uniaxial direction or in two mutually perpendicular directions in the plane of the film. One or more of the layers of the film may be oriented in the transverse and/or longitudinal directions to the same or different extents. This orientation may occur before or after the individual layers are brought together. For example a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. Typically the films are oriented in the Machine Direction (MD) at a ratio of up to 15, preferably between 5 and 7, and in the Transverse Direction (TD) at a ratio of up to 15 preferably 7 to 9. However in another embodiment the film is oriented to the same extent in both the MD and TD directions.

In another embodiment the layer comprising the polyolefin composition of this invention (and/or blends thereof) may be combined with one or more other layers. The other layer(s) may be any layer typically included in multilayer film structures. For example the other layer or layers may be:

1. Polyolefins

Preferred polyolefins include homopolymers or copolymers of C2 to C40 olefins, preferably C2 to C20 olefins, preferably a copolymer of an alpha-olefin and another olefin or alpha-olefin (ethylene is defined to be an alpha-olefin for purposes of this invention). Preferably homopolyethylene, homopolypropylene, propylene copolymerized with ethylene and or butene, ethylene copolymerized with one or more of propylene, butene or hexene, and optional dienes. Preferred examples include thermoplastic polymers such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene and/or butene and/or hexene, elastomers such as ethylene propylene rubber, ethylene propylene diene monomer rubber, neoprene, and blends of thermoplastic polymers and elastomers, such as for example, thermoplastic elastomers and rubber toughened plastics.

2. Polar Polymers

Preferred polar polymers include homopolymers and copolymers of esters, amides, acetates, anhydrides, copolymers of a C2 to C20 olefin, such as ethylene and/or propylene and/or butene with one or more polar monomers such as acetates, anhydrides, esters, alcohol, and or acrylics. Preferred examples include polyesters, polyamides, ethylene vinyl acetate copolymers, and polyvinyl chloride.

3. Cationic Polymers

Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexane, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

4. Miscellaneous

Other preferred layers can be paper, wood, cardboard, metal, metal foils (such as aluminum foil and tin foil), metallized surfaces, glass (including silicon oxide (SiO.x) coatings applied by evaporating silicon oxide onto a film surface), fabric, spunbonded fibers, and non-wovens (particularly polypropylene spun bonded fibers or non-wovens), and substrates coated with inks, dyes, pigments, and the like.

The films may vary in thickness depending on the intended application, however films of a thickness from 1 to 250 μm are usually suitable. Films intended for packaging are usually from 10 to 60 micron thick. The thickness of the sealing layer is typically 0.2 to 50 μm. There may be a sealing layer on both the inner and outer surfaces of the film or the sealing layer may be present on only the inner or the outer surface.

Additives such as block, antiblock, antioxidants, pigments, fillers, processing aids, UV stabilizers, neutralizers, lubricants, surfactants and/or nucleating agents may also be present in one or more than one layer in the films. Preferred additives include silicon dioxide, titanium dioxide, polydimethylsiloxane, talc, dyes, wax, calcium sterate, carbon black, low molecular weight resins and glass beads.

In another embodiment one more layers may be modified by corona treatment, electron beam irradiation, gamma irradiation, or microwave irradiation. In a preferred embodiment one or both of the surface layers is modified by corona treatment.

The films described herein may also comprise from 5 to 60 weight %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130 to 180° C. Preferred hydrocarbon resins include those described above. The films comprising a hydrocarbon resin may be oriented in uniaxial or biaxial directions to the same or different degrees.

Molded Products

The polyolefin composition described above may also be used to prepare the molded products of this invention in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, Concise Encyclopedia of Polymer Science and Engineering 90-92 (Jacqueline I. Kroschwitz, ed., John Wiley & Sons 1990).

The polymer compositions described above may also be used to prepare nonwoven fabrics and fibers in any nonwoven fabric and fiber making process, including but not limited to, melt blowing, spunbonding, film aperturing, and staple fiber carding. A continuous filament process may also be used. Preferably a spunbonding process is used. The spunbonding process involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding. The fabric may be prepared with mixed metallocene polypropylene alone, physically blended with other mixed metallocene polypropylene or physically blended with single metallocene polypropylene. Likewise the fabrics of this invention may be prepared with mixed metallocene polypropylene physically blended with conventional Ziegler-Natta produced polymer. If blended, the fabric of this invention is preferably comprised of at least 50% mixed metallocene polypropylene. With these nonwoven fabrics, manufacturers can maintain the desirable properties of fabrics prepared with metallocene produced polypropylene while increasing fabric strength and potentially increased line speed compared to fabrics made using conventional polymers.

EXAMPLES

Example 1

In the following example, various samples of polypropylene were formed using two different metallocene catalysts at similar polymerization conditions. The properties of the samples are reflected in Table 1.

The results in Table 1 demonstrate the dramatically superior results that were obtained using the indenyl metallocene having substitutions at the 2- and 4-positions, as opposed to using an indenyl metallocene that was unsubstituted at the 4-position. Specifically, the activities of the catalysts used in forming Samples 3 and 4 were almost ten times as high as the activities of the catalysts used in forming Samples 1 and 2. Also, the results show the further improvement in catalyst activity due to conducting polymerization under supercritical conditions (Sample 4) in comparison with polymerization under subcritical conditions (Sample 3). Also noteworthy was the fact that the supercritical conditions did not cause any significant deterioration of melting point Tm.

Sample 1 was prepared from 1000 ml of propylene and 0.2 g of 20% of dimethylsilylbis(2-methyl-1-indenyl)zirconium dichloride activated by methylaluminumoxane activator supported on silica (Catalyst A). Sample 2 was prepared from 1000 ml of propylene and 0.2 g of 20% of dimethylsilylbis(2-methyl-1-indenyl)zirconium dichloride (Catalyst B). Sample 3 was prepared from 1000 ml of propylene and 0.45 g of 20% of dimethylsilylbis(2-methyl-4-phenyl-1- indenyl)zirconium dimethyl (Catalyst C). Sample 4 was prepared from 1000 ml of propylene and 0.45 g of 20% or dimethylsilylbis(2-methyl-4-phenyl-1-indenyl)zirconium dimethyl (Catalyst D).

Each polymerization was conducted separately in a batch reactor with the stirrer set at 800 rpm for 60 min. The propylene was added in two intervals. First, 800 ml of propylene at room temperature was added to the reactor. The catalyst was then flushed with 200 ml of propylene at room temperature and introduced to the reactor through a catalyst tube (1 ml of white oil was added to the catalyst tube). Triethyl aluminum scavenger (1 ml, 25 wt % in toluene) was charged to the reactor through a stainless steel tube. Each of the polypropylene samples was characterized using H NMR, DSC, and GPC methods. The amount of vinyl chain ends is determined by $^1$H NMR as set forth in Weng et al., Macromol. Rapid Commun. 2000, 21, 1103-07.reference on p.14. The molecular weight data ($M_n$, $M_w$, $M_z$) and MWD were obtained from GPC-DRI and GPC-VIS methods. Branching was measured using GPC-MALLS and are reported as "g" at each molecular weight in the GPC trace. Relating the measured g to branched structure requires the application of Zimm-Stockmayer theory, which assumes a random distribution of branch sizes for each population of branched structures (singly, doubly, triply branched, etc.) at each molecular weight as described by B. H. Zimm and W. H. Stockmayer, *J. Chem. Phys.* 17, 1301 (1949). The glass transition temperature (Tg) and melting point data were collected on a DuPont DSC 912 instrument with thin molded film samples, scanning at 10° C./min. The melting temperatures reported were obtained from the second melt. The rheology test samples were compression molded at 180-190° C. with 0.1-0.2 weight percent BHT/B225 stabilizer added to the powder samples. The complex viscosity measurements were done by subjecting these samples to a frequency sweep from 0.01 rad/s to 390 rad/s in dynamic oscillatory mode using 10% strain. The extensional viscosity data was collected by using a Rheometrics Scientific ARES at 190° C. The MFR measurements (ASTM 1238) were made using the MI instrument (BPC L121) at 190° C. under 2.06 kg load.

TABLE 1

| Sample | Catalyst | Temperature | Pressure (bar/MPa) | Catalyst Activity (g polymer/ g cat/hr) | $T_m$ (° C.) | g' - average (viscosity) |
|---|---|---|---|---|---|---|
| 1 | A | 70 | 34.2/3.4 | 135 | — | — |
| 2 | B | 93.9 | 53/5.3 | 290 | 145.1 | — |
| 3 | C | 70 | 35/3.5 | 1,933 | 149.4 | 1.017 |
| 4 | D | 94.5 | 53.4/5.3 | 2,597 | 148.4 | 0.970 |

Example 2

In the following example, various samples of polypropylene were formed using different polymerization conditions. The properties of the samples are reflected in Table 2.

Identical samples of polypropylene were prepared from 1000 ml of propylene and dimethylsilylbis(2-methyl-4-phenyl-1-indenyl)zirconium dimethyl in combination with dimethylanilinium tetrakis (perfluorophenyl) boron activator (Catalyst E). High purity liquid propylene monomer (99.5%) was purchase from Matheson and further purified by passing the propylene monomer through a mole sieve column commercially available from Matheson, Texas and an oxygen removal column commercially available from Labclear, California.

Each polymerization was conducted separately in a batch reactor with the stirrer set at 800 rpm for 60 min. The propylene was added in two intervals. First, 800 ml of propylene at room temperature was added to the reactor. The catalyst (10.04 wt % in white oil prepared using Davison 952 silica calcined at 600° C.) was then flushed with 200 ml of propylene at room temperature and introduced to the reactor through a catalyst tube (1 ml of white oil was added to the catalyst tube). Triethyl aluminum scavenger, (1 ml, 25 wt % in toluene) was charged to the reactor through a stainless steel tube.

All polymerizations were conducted in a high pressure RC-1 reaction calorimeter commercially available from Mettler. The reactor was recertified to 1176 psi (8.11 MPa) at a maximum operating temperature of 175° C. to accommodate the planned experiments. Each of the polypropylene samples was characterized using H NMR, DSC, Ml, melt rheology, and GPC methods described above.

TABLE 2

| | Sample | | | | | |
|---|---|---|---|---|---|---|
| | 5 | 6 | 7 | 8 | 9 | 10 |
| Temperature (° C.) | 75 | 80 | 85 | 90 | 93 | 95 |
| Pressure (psi) | 500 | 542 | 597 | 674 | 707 | 725 |
| Vinyl (%) | 6 | 7 | 11 | 13 | 19 | 15 |
| GPC-DRI | | | | | | |
| $M_w$ (k) | 822 | 623 | 600 | 520 | 450 | 458 |
| $M_n$ (k) | 361 | 260 | 231 | 202 | 154 | 158 |
| PD | 2.3 | 2.4 | 2.6 | 2.6 | 3.0 | 2.9 |
| GPC-VIS | | | | | | |
| $M_w$ (k) | 802 | 644 | 600 | 520 | 450 | 514 |
| $M_n$ (k) | 248 | 238 | 231 | 202 | 154 | 165 |
| PD | 3.2 | 2.7 | 2.6 | 2.6 | 3.0 | 3.1 |
| Branching Index (g') | 0.994 | 0.971 | 0.960 | 0.947 | 0.933 | 0.934 |
| DSC (° C.) | | | | | | |
| $T_m$ | 149 | 148 | 150 | 146 | 150 | 151 |
| $T_c$ | 111 | 106 | 109 | 106 | 109 | 108 |
| MFR (dg/min) | 0.3 | 0.3 | 0.3 | 0.7 | 1.6 | 1.7 |

The results demonstrate improved properties of Samples 9 and 10, i.e., polypropylene prepared under supercritical conditions, over the properties of Samples 5-8, i.e., polypropylene prepared under subcritical conditions. All the samples were prepared using identical catalyst systems and monomer concentration; the only variables were temperature and pressure. The branching and melt flow rates were substantially higher for Samples 9 and 10 than for Samples 5-8, demonstrating the improved results due to the use of supercritical conditions.

We claim:

1. A process of preparing a branched homopropylene composition comprising: contacting a polymerization mixture that comprises propylene monomers with a metallocene catalyst compound having at least two indenyl rings or derivative of indenyl rings, wherein each ring is substituted at the 2 and 4 positions, activated with a non-coordinating anion, under temperature and pressure conditions below the melting point of the propylene polymer and where:

a) the temperature is at or above the critical temperature for the reaction medium, and the pressure is at least 500 kPa above the critical pressure of the reaction medium; or
b) the temperature is 1° C. or more above the critical temperature for the reaction medium, and the pressure is at or above the critical pressure of the reaction medium; or
c) the temperature is 1° C. or more above the critical temperature for the reaction medium, and the pressure is at least 500 kPa above the critical pressure of the reaction medium, and conducting polymerization of the propylene monomers for a time sufficient to form the branched homopropylene composition having a heat of fusion of 70 J/g, a $T_m$ of 145° C. or more and a branching index (g') of 0.97 or less.

2. The process of claim 1 wherein the temperature is 2° C. or more above the critical temperature for the reaction medium.

3. The process of claim 1 wherein the temperature is between 94 and 160° C.

4. The process of claim 1 wherein the pressure is 1000 kPa or more above the critical pressure for the reaction medium.

5. The process of claim 1 wherein the pressure is between 5.0 and 9 MPa.

6. The process of claim 1 wherein the temperature is between 94 and 130° C. and the pressure is between 5.0 and 7 MPa.

7. The process of claim 1 wherein solvent is present at 0 to 15 vol %.

8. The process of claim 1 where the metallocene catalyst compound is represented by the formula: $L_z(Cp)_2M^m X_n$ where: each Cp is independently a substituted indenyl ring wherein each ring is substituted at the 2 and 4 positions;
z is 0 or 1;
L is a bridging group connecting Cp to Cp, M is a Group 4, 5, or 6 transition metal;
m is 3, 4, 5 or 6;
X is a halogen or a substituted or unsubstituted hydrocarbyl group, a substituted or unsubstituted hydrocarboxy group, or a substituted or unsubstituted heteroatom containing group; and
n is m minus 2.

9. The process of claim 8 wherein z is 1, L is represented by the formula: RqSi-where each R is, independently, a substituted or unsubstituted $C_1$ to $C_{20}$ hydrocarbyl group and q is 1, 2, 3 or 4; and both Cp groups are indenyl rings substituted at the 2 and 4 positions.

10. The process of any of claims 1 to 7 wherein the metallocene catalyst compound comprises one or more of:
dimethylsiladiyl(2-methyl, 4-[3',5'-di-tbutylphenyl]indenyl)₂zirconium dichloride;
dimethylsiladiyl(2-ethyl, 4-[3',5'-di-tbutylphenyl]indenyl)₂zirconium dichloride;
dimethylsiladiyl(2-n-propyl, 4-[3',5'-di-tbutylphenyl]indenyl)₂zirconium dichloride;
dimethylsiladiyl(2-iso-propyl, 4-[3',5'-di-tbutylphenyl]indenyl)₂zirconium dichloride;
dimethylsiladiyl(2-n-butyl, 4-[3',5'-di-tbutylphenyl]indenyl)₂zirconium dichloride;
dimethylsiladiyl(2-iso-butyl, 4-[3',5'-di-tbutylphenyl]indenyl)₂zirconium dichloride;
dimethylsiladiyl(2-sec-butyl, 4-[3',5'-di-tbutylphenyl]indenyl)₂zirconium dichloride;
dimethylsiladiyl(2-tert-butyl, 4-[3',5'-di-tbutylphenyl]indenyl)₂zirconium dichloride;
dimethylsiladiyl(2-methyl, 4-[3',5'-di-tbutylphenyl]indenyl)₂hafnium dichloride;
dimethylsiladiyl(2-ethyl, 4-[3',5'-di-tbutylphenyl]indenyl)₂hafnium dichloride;
dimethylsiladiyl(2-n-propyl, 4-[3',5'-di-tbutylphenyl]indenyl)₂hafnium dimethyl;
dimethylsiladiyl(2-iso-propyl, 4-[3',5'-di-tbutylphenyl]indenyl)₂hafnium dichloride;
dimethylsiladiyl(2-butyl, 4-[3',5'-di-tbutylphenyl]indenyl)₂hafnium dichloride;
9-silafluorendiyl(2-methyl, 4-[3',5'-di-tbutylphenyl]indenyl)₂zirconium dichloride;
9-silafluorendiyl(2-ethyl, 4-[3',5'-di-tbutylphenyl]indenyl)₂zirconium dichloride;
9-silafluorendiyl(2-n-propyl, 4-[3',5'-di-tbutylphenyl]indenyl)₂zirconium dichloride;
9-silafluorendiyl(2-iso-propyl, 4-[3',5'-di-tbutylphenyl]indenyl)₂zirconium dichloride;
9-silafluorendiyl(2-n-butyl, 4-[3',5'-di-tbutylphenyl]indenyl)₂zirconium dichloride;
9-silafluorendiyl(2-iso-butyl, 4-[3',5'-di-tbutylphenyl]indenyl)₂zirconium dichloride;
9-silafluorendiyl(2-sec-butyl, 4-[3',5'-di-tbutylphenyl]indenyl)₂zirconium dichloride;
9-silafluorendiyl(2-tert-butyl, 4-[3',5'-di-tbutylphenyl]indenyl)₂zirconium dichloride;
9-silafluorendiyl(2-methyl, 4-[3',5'-di-tbutylphenyl]indenyl)₂hafnium dichloride;
9-silafluorendiyl(2-ethyl, 4-[3',5'-di-tbutylphenyl]indenyl)₂hafnium dichloride;
9-silafluorendiyl(2-n-propyl, 4-[3',5'-di-tbutylphenyl]indenyl)₂hafnium dichloride;
9-silafluorendiyl(2-iso-propyl, 4-[3',5'-di-tbutylphenyl]indenyl)₂hafnium dichloride;
9-silafluorendiyl(2-n-butyl, 4-[3',5'-di-tbutylphenyl]indenyl)₂hafnium dichloride;
9-silafluorendiyl(2-iso-butyl, 4-[3',5'-di-tbutylphenyl]indenyl)₂hafnium dichloride;
9-silafluorendiyl(2-sec-butyl, 4-[3',5'-di-tbutylphenyl]indenyl)₂hafnium dichloride;
9-silafluorendiyl(2-tert-butyl, 4-[3',5'-di-tbutylphenyl]indenyl)₂hafnium dichloride;
dimethylsiladiyl(2-methyl, 4-[3',5'-di-tbutylphenyl]indenyl)₂zirconium dimethyl;
dimethylsiladiyl(2-ethyl, 4-[3',5'-di-tbutylphenyl]indenyl)₂zirconium dimethyl;
dimethylsiladiyl(2-n-propyl, 4-[3',5'-di-tbutylphenyl]indenyl)₂zirconium dimethyl;
dimethylsiladiyl(2-iso-propyl, 4-[3',5'-di-tbutylphenyl]indenyl)₂zirconium dimethyl;
dimethylsiladiyl(2-n-butyl, 4-[3',5'-di-tbutylphenyl]indenyl)₂zirconium dimethyl;
dimethylsiladiyl(2-iso-butyl, 4-[3',5'-di-tbutylphenyl]indenyl)₂zirconium dimethyl;
dimethylsiladiyl(2-sec-butyl, 4-[3',5'-di-tbutylphenyl]indenyl)₂zirconium dimethyl;
dimethylsiladiyl(2-tert-butyl, 4-[3',5'-di-tbutylphenyl]indenyl)₂zirconium dimethyl;
dimethylsiladiyl(2-methyl, 4-[3',5'-di-tbutylphenyl]indenyl)₂hafnium dimethyl;
dimethylsiladiyl(2-ethyl, 4-[3',5'-di-tbutylphenyl]indenyl)₂hafnium dimethyl;
dimethylsiladiyl(2-n-propyl, 4-[3',5'-di-tbutylphenyl]indenyl)₂hafnium dimethyl;
dimethylsiladiyl(2-iso-propyl, 4-[3',5'-di-tbutylphenyl]indenyl)₂hafnium dimethyl;

dimethylsiladiyl(2-n-butyl, 4-[3',5'-di-tbutylphenyl]indenyl)₂hafnium dimethyl;
dimethylsiladiyl(2-iso-butyl, 4-[3',5'-di-tbutylphenyl]indenyl)₂hafnium dimethyl;
dimethylsiladiyl(2-sec-butyl, 4-[3',5'-di-tbutylphenyl]indenyl)₂hafnium dimethyl;
dimethylsiladiyl(2-tert-butyl, 4-[3',5'-di-tbutylphenyl]indenyl)₂hafnium dimethyl;
9-silafluorendiyl(2-methyl, 4-[3',5'-di-tbutylphenyl]indenyl)₂zirconium dimethyl;
9-silafluorendiyl(2-ethyl, 4-[3',5'-di-tbutylphenyl]indenyl)₂zirconium dimethyl;
9-silafluorendiyl(2-n-propyl, 4-[3',5'-di-tbutylphenyl]indenyl)₂zirconium dimethyl;
9-silafluorendiyl(2-iso-propyl, 4-[3',5'-di-tbutylphenyl]indenyl)₂zirconium dimethyl;
9-silafluorendiyl(2-n-butyl, 4-[3',5'-di-tbutylphenyl]indenyl)₂zirconium dimethyl;
9-silafluorendiyl(2-iso-butyl, 4-[3',5'-di-tbutylphenyl]indenyl)₂zirconium dimethyl;
9-silafluorendiyl(2-sec-butyl, 4-[3',5'-di-tbutylphenyl]indenyl)₂zirconium dimethyl;
9-silafluorendiyl(2-tert-butyl, 4-[3',5'-di-tbutylphenyl]indenyl)₂zirconium dimethyl;
9-silafluorendiyl(2-methyl, 4-[3',5'-di-tbutylphenyl]indenyl)₂hafnium dimethyl;
9-silafluorendiyl(2-ethyl, 4-[3',5'-di-tbutylphenyl]indenyl)₂hafnium dimethyl;
9-silafluorendiyl(2-n-propyl, 4-[3',5'-di-tbutylphenyl]indenyl)₂hafnium dimethyl;
9-silafluorendiyl(2-iso-propyl, 4-[3',5'-di-tbutylphenyl]indenyl)₂hafnium dimethyl;
9-silafluorendiyl(2-n-butyl, 4-[3',5'-di-tbutylphenyl]indenyl)₂hafnium dimethyl;
9-silafluorendiyl(2-iso-butyl, 4-[3',5'-di-tbutylphenyl]indenyl)₂hafnium dimethyl;
9-silafluorendiyl(2-sec-butyl, 4-[3',5'-di-tbutylphenyl]indenyl)₂hafnium dimethyl;
9-silafluorendiyl(2-tert-butyl, 4-[3',5'-di-tbutylphenyl]indenyl)₂hafnium dimethyl;
dimethylsiladiyl(2-methyl, 4-[3',5'-bis-trifluoromethylphenyl]indenyl)₂zirconium dichloride;
dimethylsiladiyl(2-ethyl, 4-[3',5'-bis-trifluoromethylphenyl]indenyl)₂zirconium dichloride;
dimethylsiladiyl(2-n-propyl, 4-[3',5'-bis-trifluoromethylphenyl]indenyl)₂zirconium dichloride;
dimethylsiladiyl(2-iso-propyl, 4-[3',5'-bis-trifluoromethylphenyl]indenyl)₂zirconium dichloride;
dimethylsiladiyl(2-n-butyl, 4-[3',5'-bis-trifluoromethylphenyl]indenyl)₂zirconium dichloride;
dimethylsiladiyl(2-iso-butyl, 4-[3',5'-bis-trifluoromethylphenyl]indenyl)₂zirconium dichloride;
dimethylsiladiyl(2-sec-butyl, 4-[3',5'-bis-trifluoromethylphenyl]indenyl)₂zirconium dichloride;
dimethylsiladiyl(2-tert-butyl, 4-[3',5'-bis-trifluoromethylphenyl]indenyl)₂zirconium dichloride;
dimethylsiladiyl(2-methyl, 4-[3',5'-bis-trifluoromethylphenyl]indenyl)₂hafnium dichloride;
dimethylsiladiyl(2-ethyl, 4-[3',5'-bis-trifluoromethylphenyl]indenyl)₂hafnium dichloride;
dimethylsiladiyl(2-n-propyl, 4-[3',5'-bis-trifluoromethylphenyl]indenyl)₂hafnium dichloride;
dimethylsiladiyl(2-iso-propyl, 4-[3',5'-bis-trifluoromethylphenyl]indenyl)₂hafnium dichloride;
dimethylsiladiyl(2-n-butyl, 4-[3',5'-bis-trifluoromethylphenyl]indenyl)₂hafnium dichloride;
dimethylsiladiyl(2-iso-butyl, 4-[3',5'-bis-trifluoromethylphenyl]indenyl)₂hafnium dichloride;
dimethylsiladiyl(2-sec-butyl, 4-[3',5'-bis-trifluoromethylphenyl]indenyl)₂hafnium dichloride;
dimethylsiladiyl(2-tert-butyl, 4-[3',5'-bis-trifluoromethylphenyl]indenyl)₂hafnium dichloride;
9-silafluorendiyl(2-methyl, 4-[3',5'-bis-trifluoromethylphenyl]indenyl)₂zirconium dichloride;
dimethylsiladiyl(2-ethyl, 4-[3',5'-bis-trifluoromethylphenyl]indenyl)₂hafnium dichloride;
9-silafluorendiyl(2-n-propyl, 4-[3',5'-bis-trifluoromethylphenyl]indenyl)₂zirconium dichloride;
9-silafluorendiyl(2-iso-propyl, 4-[3',5'-bis-trifluoromethylphenyl]indenyl)₂zirconium dichloride;
9-silafluorendiyl(2-n-butyl, 4-[3',5'-bis-trifluoromethylphenyl]indenyl)₂zirconium dichloride
9-silafluorendiyl(2-iso-butyl, 4-[3',5'-bis-trifluoromethylphenyl]indenyl)₂zirconium dichloride;
9-silafluorendiyl(2-sec-butyl, 4-[3',5'-bis-trifluoromethylphenyl]indenyl)₂zirconium dichloride;
9-silafluorendiyl(2-tert-butyl, 4-[3',5'-bis-trifluoromethylphenyl]indenyl)₂zirconium dichloride;
9-silafluorendiyl(2-methyl, 4-[3',5'-bis-trifluoromethylphenyl]indenyl)₂hafnium dichloride;
9-silafluorendiyl(2-ethyl, 4-[3',5'-bis-trifluoromethylphenyl]indenyl)₂hafnium dichloride;
9-silafluorendiyl(2-n-propyl, 4-[3',5'-bis-trifluoromethylphenyl]indenyl)₂hafnium dichloride;
9-silafluorendiyl(2-iso-propyl-4-[3',5'-bis-trifluoromethylphenyl]indenyl)₂hafnium dichloride;
9-silafluorendiyl(2-n-butyl, 4-[3',5'-bis-trifluoromethylphenyl]indenyl)₂hafnium dichloride;
9-silafluorendiyl(2-iso-butyl, 4-[3',5'-bis-trifluoromethylphenyl]indenyl)₂hafnium dichloride;
9-silafluorendiyl(2-sec-butyl, 4-[3',5'-bis-trifluoromethylphenyl]indenyl)₂hafnium dichloride;
9-silafluorendiyl(2-tert-butyl, 4-[3',5'-bis-trifluoromethylphenyl]indenyl)₂hafnium dichloride;
dimethylsiladiyl(2-methyl, 4-[3',5'-bis-trifluoromethylphenyl]indenyl)₂zirconium dimethyl;
dimethylsiladiyl(2-ethyl, 4-[3',5'-bis-trifluoromethylphenyl]indenyl)₂zirconium dimethyl;
dimethylsiladiyl(2-n-propyl, 4-[3',5'-bis-trifluoromethylphenyl]indenyl)₂zirconium dimethyl;
dimethylsiladiyl(2-iso-propyl, 4-[3',5'-bis-trifluoromethylphenyl]indenyl)₂zirconium dimethyl;
dimethylsiladiyl(2-n-butyl, 4-[3',5'-bis-trifluoromethylphenyl]indenyl)₂zirconium dimethyl;
dimethylsiladiyl(2-iso-butyl, 4-[3',5'-bis-trifluoromethylphenyl]indenyl)₂zirconium dimethyl;
dimethylsiladiyl(2-sec-butyl, 4-[3',5'-bis-trifluoromethylphenyl]indenyl)₂zirconium dimethyl;
dimethylsiladiyl(2-tert-butyl, 4-[3',5'-bis-trifluoromethylphenyl]indenyl)₂zirconium dimethyl;
dimethylsiladiyl(2-methyl, 4-[3',5'-bis-trifluoromethylphenyl]indenyl)₂hafnium dimethyl;
dimethylsiladiyl(2-ethyl, 4-[3',5'-bis-trifluoromethylphenyl]indenyl)₂hafnium dimethyl;
dimethylsiladiyl(2-n-propyl, 4-[3',5'-bis-trifluoromethylphenyl]indenyl)₂hafnium dimethyl;
dimethylsiladiyl(2-iso-propyl, 4-[3',5'-bis-trifluoromethylphenyl]indenyl)₂hafnium dimethyl;
dimethylsiladiyl(2-n-butyl, 4-[3',5'-bis-trifluoromethylphenyl]indenyl)₂hafnium dimethyl;
dimethylsiladiyl(2-iso-butyl, 4-[3',5'-bis-trifluoromethylphenyl]indenyl)₂hafnium dimethyl;

dimethylsiladiyl(2-sec-butyl, 4-[3',5'-bis-trifluoromethylphenyl]indenyl)₂hafnium dimethyl;
dimethylsiladiyl(2-tert-butyl, 4-[3',5'-bis-trifluoromethylphenyl]indenyl)₂hafnium dimethyl;
9-silafluorendiyl(2-methyl, 4-[3',5'-bis-trifluoromethylphenyl]indenyl)₂zirconium dimethyl;
dimethylsiladiyl(2-ethyl, 4-[3',5'-bis-trifluoromethylphenyl]indenyl)₂hafnium dimethyl;
9-silafluorendiyl(2-n-propyl, 4-[3',5'-bis-trifluoromethylphenyl]indenyl)₂zirconium dimethyl;
9-silafluorendiyl(2-iso-propyl, 4-[3',5'-bis-trifluoromethylphenyl]indenyl)₂zirconium dimethyl;
9-silafluorendiyl(2-n-butyl, 4-[3',5'-bis-trifluoromethylphenyl]indenyl)₂zirconium dimethyl;
9-silafluorendiyl(2-iso-butyl, 4-[3',5'-bis-trifluoromethylphenyl]indenyl)₂zirconium dimethyl;
9-silafluorendiyl(2-sec-butyl, 4-[3',5'-bis-trifluoromethylphenyl]indenyl)₂zirconium dimethyl;
9-silafluorendiyl(2-tert-butyl, 4-[3',5'-bis-trifluoromethylphenyl]indenyl)₂zirconium dimethyl;
9-silafluorendiyl(2-methyl, 4-[3',5'-bis-trifluoromethylphenyl]indenyl)₂hafnium dimethyl;
9-silafluorendiyl(2-ethyl, 4-[3',5'-bis-trifluoromethylphenyl]indenyl)₂hafnium dimethyl;
9-silafluorendiyl(2-n-propyl, 4-[3',5'-bis-trifluoromethylphenyl]indenyl)₂hafnium dimethyl;
9-silafluorendiyl(2-iso-propyl, 4-[3',5'-bis-trifluoromethylphenyl]indenyl)₂ hafnium dimethyl;
9-silafluorendiyl(2-n-butyl, 4-[3',5'-bis-trifluoromethylphenyl]indenyl)₂hafnium dimethyl;
9-silafluorendiyl(2-iso-butyl, 4-[3',5'-bis-trifluoromethylphenyl]indenyl)₂hafnium dimethyl;
9-silafluorendiyl(2-sec-butyl, 4-[3',5'-bis-trifluoromethylphenyl]indenyl)₂hafnium dimethyl;
9-silafluorendiyl(2-tert-butyl, 4-[3',5'-bis-trifluoromethylphenyl]indenyl)₂hafnium dimethyl;
dimethylsiladiyl(2-ethyl, 4-[3',5'-di-iso-propylphenyl]indenyl)₂zirconium dichloride;
dimethylsiladiyl(2-n-propyl, 4-[3',5'-di-iso-propylphenyl]indenyl)₂zirconium dichloride;
dimethylsiladiyl(2-iso-propyl, 4-[3',5'-di-iso-propylphenyl]indenyl)₂zirconium dichloride;
dimethylsiladiyl(2-n-butyl, 4-[3,5'-di-iso-propylphenyl]indenyl)₂zirconium dichloride;
dimethylsiladiyl(2-iso-butyl, 4-[3',5'-di-iso-propylphenyl]indenyl)₂zirconium dichloride;
dimethylsiladiyl(2-sec-butyl, 4-[3',5'-di-iso-propylphenyl]indenyl)₂zirconium dichloride;
dimethylsiladiyl(2-tert-butyl, 4-[3',5'-di-iso-propylphenyl]indenyl)₂zirconium dichloride;
dimethylsiladiyl(2-ethyl, 4-[3',5'-di-iso-propylphenyl]indenyl)₂hafnium dichloride;
dimethylsiladiyl(2-n-propyl, 4-[3',5'-di-iso-propylphenyl]indenyl)₂hafnium dichloride;
dimethylsiladiyl(2-iso-propyl, 4-[3',5'-di-iso-propylphenyl]indenyl)₂hafnium dichloride;
dimethylsiladiyl(2-n-butyl, 4-[3',5'-di-iso-propylphenyl]indenyl)₂hafnium dichloride;
dimethylsiladiyl(2-iso-butyl, 4-[3',5'-di-iso-propylphenyl]indenyl)₂hafnium dichloride;
dimethylsiladiyl(2-sec-butyl, 4-[3',5'-di-iso-propylphenyl]indenyl)₂hafnium dichloride;
dimethylsiladiyl(2-tert-butyl, 4-[3',5'-di-iso-propylphenyl]indenyl)₂hafnium dichloride;
9-silafluorendiyl(2-ethyl, 4-[3',5'-di-iso-propylphenyl]indenyl)₂zirconium dichloride;
9-silafluorendiyl(2-n-propyl, 4-[3',5'-di-iso-propylphenyl]indenyl)₂zirconium dichloride;
9-silafluorendiyl(2-iso-propyl, 4-[3',5'-di-iso-propylphenyl]indenyl)₂zirconium dichloride;
9-silafluorendiyl(2-n-butyl, 4-[3',5'-di-iso-propylphenyl]indenyl)₂zirconium dichloride;
9-silafluorendiyl(2-iso-butyl, 4-[3',5'-di-iso-propylphenyl]indenyl)₂zirconium dichloride;
9-silafluorendiyl(2-sec-butyl, 4-[3',5'-di-iso-propylphenyl]indenyl)₂zirconium dichloride;
9-silafluorendiyl(2-tert-butyl, 4-[3',5'-di-iso-propylphenyl]indenyl)₂zirconium dichloride;
9-silafluorendiyl(2-ethyl, 4-[3',5'-di-iso-propylphenyl]indenyl)₂hafnium dichloride;
9-silafluorendiyl(2-n-propyl, 4-[3',5'-di-iso-propylphenyl]indenyl)₂hafnium dichloride;
9-silafluorendiyl(2-iso-propyl, 4-[3',5'-di-iso-propylphenyl]indenyl)₂hafnium dichloride;
9-silafluorendiyl(2-n-butyl, 4-[3',5'-di-iso-propylphenyl]indenyl)₂hafnium dichloride;
9-silafluorendiyl(2-iso-butyl, 4-[3',5'-di-iso-propylphenyl]indenyl)₂hafnium dichloride;
9-silafluorendiyl(2-sec-butyl, 4-[3',5'-di-iso-propylphenyl]indenyl)₂hafnium dichloride;
9-silafluorendiyl(2-tert-butyl, 4-[3',5'-di-iso-propylphenyl]indenyl)₂hafnium dichloride;
dimethylsiladiyl(2-ethyl, 4-[3',5'-di-iso-propylphenyl]indenyl)₂zirconium dimethyl;
dimethylsiladiyl(2-n-propyl, 4-[3',5'-di-iso-propylphenyl]indenyl)₂zirconium dimethyl;
dimethylsiladiyl(2-iso-propyl, 4-[3',5'-di-iso-propylphenyl]indenyl)₂zirconium dimethyl;
dimethylsiladiyl(2-n-butyl, 4-[3',5'-di-iso-propylphenyl]indenyl)₂zirconium dimethyl;
dimethylsiladiyl(2-isobutyl, 4-[3',5'-di-iso-propylphenyl]indenyl)₂zirconium dimethyl;
dimethylsiladiyl(2-sec-butyl, 4-[3',5'-di-iso-propylphenyl]indenyl)₂zirconium dimethyl;
dimethylsiladiyl(2-tert-butyl, 4-[3',5'-di-iso-propylphenyl]indenyl)₂zirconium dimethyl;
dimethylsiladiyl(2-ethyl, 4-[3',5'-di-iso-propylphenyl]indenyl)₂hafnium dimethyl;
dimethylsiladiyl(2-n-propyl, 4-[3',5'-di-iso-propylphenyl]indenyl)₂hafnium dimethyl;
dimethylsiladiyl(2-iso-propyl, 4-[3',5'-di-iso-propylphenyl]indenyl)₂hafnium dimethyl;
dimethylsiladiyl(2-n-butyl, 4-[3',5'-di-iso-propylphenyl]indenyl)₂hafnium dimethyl;
dimethylsiladiyl(2-iso-butyl, 4-[3',5'-di-iso-propylphenyl]indenyl)₂zirconium dimethyl;
dimethylsiladiyl(2-sec-butyl, 4-[3',5'-di-iso-propylphenyl]indenyl)₂zirconium dimethyl;
dimethylsiladiyl(2-tert-butyl, 4-[3',5'-di-iso-propylphenyl]indenyl)₂zirconium dimethyl;
9-silafluorendiyl(2-ethyl, 4-[3',5'-di-iso-propylphenyl]indenyl)₂zirconium dimethyl;
9-silafluorendiyl(2-n-propyl, 4-[3',5'-di-iso-propylphenyl]indenyl)₂zirconium dimethyl;
9-silafluorendiyl(2-iso-propyl, 4-[3',5'-di-iso-propylphenyl]indenyl)₂zirconium dimethyl;
9-silafluorendiyl(2-n-butyl, 4-[3',5'-di-iso-propylphenyl]indenyl)₂zirconium dimethyl;
9-silafluorendiyl(2-iso-butyl, 4-[3',5'-di-iso-propylphenyl]indenyl)₂zirconium dimethyl;
9-silafluorendiyl(2-sec-butyl, 4-[3',5'-di-iso-propylphenyl]indenyl)₂zirconium dimethyl;

9-silafluorendiyl(2-tert-butyl, 4-[3',5'-di-iso-propylphenyl]indenyl)$_2$zirconium dimethyl;
9-silafluorendiyl(2-ethyl, 4-[3',5'-di-iso-propylphenyl]indenyl)$_2$hafnium dimethyl;
9-silafluorendiyl(2-n-propyl, 4-[3',5'-di-iso-propylphenyl]indenyl)$_2$hafnium dimethyl;
9-silafluorendiyl(2-iso-propyl, 4-[3',5'-di-iso-propylphenyl]indenyl)$_2$hafnium dimethyl;
9-silafluorendiyl(2-n-butyl, 4-[3',5'-di-iso-propylphenyl]indenyl)$_2$hafnium dimethyl;
9-silafluorendiyl(2-iso-butyl, 4-[3',5'-di-iso-propylphenyl]indenyl)$_2$hafnium dimethyl;
9-silafluorendiyl(2-sec-butyl, 4-[3',5'-di-iso-propylphenyl]indenyl)$_2$hafnium dimethyl;
9-silafluorendiyl(2-tert-butyl, 4-[3',5'-di-iso-propylphenyl]indenyl)$_2$hafnium dimethyl;
dimethylsiladiyl(2-methyl, 4-[3',5'-di-phenylphenyl]indenyl)$_2$zirconium dichloride;
dimethylsiladiyl(2-ethyl, 4-[3',5'-di-phenylphenyl]indenyl)$_2$zirconium dichloride;
dimethylsiladiyl(2-n-propyl, 4-[3',5'-di-phenylphenyl]indenyl)$_2$zirconium dichloride;
dimethylsiladiyl(2-iso-propyl, 4-[3',5'-di-phenylphenyl]indenyl)$_2$zirconium dichloride;
dimethylsiladiyl(2-n-butyl, 4-[3',5'-di-phenylphenyl]indenyl)$_2$zirconium dichloride;
dimethylsiladiyl(2-iso-butyl, 4-[3',5'-di-phenylphenyl]indenyl)$_2$zirconium dichloride;
dimethylsiladiyl(2-sec-butyl, 4-[3',5'-di-phenylphenyl]indenyl)$_2$zirconium dichloride;
dimethylsiladiyl(2-tert-butyl, 4-[3',5'-di-phenylphenyl]indenyl)$_2$zirconium dichloride;
dimethylsiladiyl(2-methyl, 4-[3',5'-di-phenylphenyl]indenyl)$_2$hafnium dichloride;
dimethylsiladiyl(2-ethyl, 4-[3',5'-di-phenylphenyl]indenyl)$_2$hafnium dichloride;
dimethylsiladiyl(2-n-propyl, 4-[3',5'-di-phenylphenyl]indenyl)$_2$hafnium dichloride;
dimethylsiladiyl(2-iso-propyl, 4-[3',5'-di-phenylphenyl]indenyl)$_2$hafnium dichloride;
dimethylsiladiyl(2-n-butyl, 4-[3',5'-di-phenylphenyl]indenyl)$_2$hafnium dichloride;
dimethylsiladiyl(2-iso-butyl, 4-[3',5'-di-phenylphenyl]indenyl)$_2$hafnium dichloride;
dimethylsiladiyl(2-sec-butyl, 4-[3',5'-di-phenylphenyl]indenyl)$_2$hafnium dichloride;
dimethylsiladiyl(2-tert-butyl, 4-[3',5'-di-phenylphenyl]indenyl)$_2$hafnium dichloride;
9-silafluorendiyl(2-methyl, 4-[3',5'-di-phenylphenyl]indenyl)$_2$zirconium dichloride;
9-silafluorendiyl(2-ethyl, 4-[3',5'-di-phenylphenyl]indenyl)$_2$zirconium dichloride;
9-silafluorendiyl(2-n-propyl, 4-[3',5'-di-phenylphenyl]indenyl)$_2$zirconium dichloride;
9-silafluorendiyl(2-iso-propyl, 4-[3',5'-di-phenylphenyl]indenyl)$_2$zirconium dichloride;
9-silafluorendiyl(2-n-butyl, 4-[3',5'-di-phenylphenyl]indenyl)$_2$zirconium dichloride;
9-silafluorendiyl(2-iso-butyl, 4-[3',5'-di-phenylphenyl]indenyl)$_2$zirconium dichloride;
9-silafluorendiyl(2-sec-butyl, 4-[3',5'-di-phenylphenyl]indenyl)$_2$zirconium dichloride;
9-silafluorendiyl(2-tert-butyl, 4-[3',5'-di-phenylphenyl]indenyl)$_2$zirconium dichloride;
9-silafluorendiyl(2-methyl, 4-[3',5'-di-phenylphenyl]indenyl)$_2$hafnium dichloride;
9-silafluorendiyl(2-ethyl, 4-[3',5'-di-phenylphenyl]indenyl)$_2$hafnium dichloride;
9-silafluorendiyl(2-n-propyl, 4-[3',5'-di-phenylphenyl]indenyl)$_2$hafnium dichloride;
9-silafluorendiyl(2-iso-propyl, 4-[3',5'-di-phenylphenyl]indenyl)$_2$hafnium dichloride;
9-silafluorendiyl(2-n-butyl, 4-[3',5'-di-phenylphenyl]indenyl)$_2$hafnium dichloride;
9-silafluorendiyl(2-iso-butyl, 4-[3',5'-di-phenylphenyl]indenyl)$_2$hafnium dichloride;
9-silafluorendiyl(2-sec-butyl, 4-[3',5'-di-phenylphenyl]indenyl)$_2$hafnium dichloride;
9-silafluorendiyl(2-tert-butyl, 4-[3',5'-di-phenylphenyl]indenyl)$_2$hafnium dichloride;
dimethylsiladiyl(2-methyl, 4-[3',5'-di-phenylphenyl]indenyl)$_2$zirconium dimethyl;
dimethylsiladiyl(2-ethyl, 4-[3',5'-di-phenylphenyl]indenyl)$_2$zirconium dimethyl;
dimethylsiladiyl(2-n-propyl, 4-[3',5'-di-phenylphenyl]indenyl)$_2$zirconium dimethyl;
dimethylsiladiyl(2-iso-propyl, 4-[3',5'-di-phenylphenyl]indenyl)$_2$zirconium dimethyl;
dimethylsiladiyl(2-n-butyl, 4-[3',5'-di-phenylphenyl]indenyl)$_2$zirconium dimethyl;
dimethylsiladiyl(2-iso-butyl, 4-[3',5'-di-phenylphenyl]indenyl)$_2$zirconium dimethyl;
dimethylsiladiyl(2-sec-butyl, 4-[3',5'-di-phenylphenyl]indenyl)$_2$zirconium dimethyl;
dimethylsiladiyl(2-tert-butyl, 4-[3',5'-di-phenylphenyl]indenyl)$_2$zirconium dimethyl;
dimethylsiladiyl(2-methyl, 4-[3',5'-di-phenylphenyl]indenyl)$_2$hafnium dimethyl;
dimethylsiladiyl(2-ethyl, 4-[3',5'-di-phenylphenyl]indenyl)$_2$hafnium dimethyl;
dimethylsiladiyl(2-n-propyl, 4-[3',5'-di-phenylphenyl]indenyl)$_2$hafnium dimethyl;
dimethylsiladiyl(2-iso-propyl, 4-[3',5'-di-phenylphenyl]indenyl)$_2$hafnium dimethyl;
dimethylsiladiyl(2-n-butyl, 4-[3',5'-di-phenylphenyl]indenyl)$_2$hafnium dimethyl;
dimethylsiladiyl(2-iso-butyl, 4-[3',5'-di-phenylphenyl]indenyl)$_2$hafnium dimethyl;
dimethylsiladiyl(2-sec-butyl, 4-[3',5'-di-phenylphenyl]indenyl)$_2$hafnium dimethyl;
dimethylsiladiyl(2-tert-butyl, 4-[3',5'-di-phenylphenyl]indenyl)$_2$hafnium dimethyl;
9-silafluorendiyl(2-methyl, 4-[3',5'-di-phenylphenyl]indenyl)$_2$zirconium dimethyl;
9-silafluorendiyl(2-ethyl, 4-[3',5'-di-phenylphenyl]indenyl)$_2$zirconium dimethyl;
9-silafluorendiyl(2-n-propyl, 4-[3',5'-di-phenylphenyl]indenyl)$_2$zirconium dimethyl;
9-silafluorendiyl(2-iso-propyl, 4-[3',5'-di-phenylphenyl]indenyl)$_2$zirconium dimethyl;
9-silafluorendiyl(2-n-butyl, 4-[3',5'-di-phenylphenyl]indenyl)$_2$zirconium dimethyl;
9-silafluorendiyl(2-iso-butyl, 4-[3',5'-di-phenylphenyl]indenyl)$_2$zirconium dimethyl;
9-silafluorendiyl(2-sec-butyl, 4-[3',5'-di-phenylphenyl]indenyl)$_2$zirconium dimethyl;
9-silafluorendiyl(2-tert-butyl, 4-[3',5'-di-phenylphenyl]indenyl)$_2$zirconium dimethyl;
9-silafluorendiyl(2-methyl, 4-[3',5'-di-phenylphenyl]indenyl)$_2$hafnium dimethyl;
9-silafluorendiyl(2-ethyl, 4-[3',5'-di-phenylphenyl]indenyl)$_2$hafnium dichloride;

9-silafluorendiyl(2-n-propyl, 4-[3',5'-di-phenylphenyl]indenyl)$_2$hafnium dimethyl 9-silafluorendiyl(2-iso-propyl, 4-[3',5'-di-phenylphenyl]indenyl)$_2$hafnium dimethyl;

9-silafluorendiyl(2-n-butyl, 4-[3',5'-di-phenylphenyl]indenyl)$_2$hafnium dimethyl;

9-silafluorendiyl(2-iso-butyl, 4-[3',5'-di-phenylphenyl]indenyl)$_2$hafnium dimethyl;

9-silafluorendiyl(2-sec-butyl, 4-[3',5'-di-phenylphenyl]indenyl)$_2$hafnium dimethyl;

9-silafluorendiyl(2-tert-butyl, 4-[3',5'-di-phenylphenyl]indenyl)$_2$hafnium dimethyl;

dimethylamidoborane(2-methyl, 4-[3',5'-di-tbutylphenyl]indenyl)$_2$zirconium dichloride;

dimethylamidoborane(2-ethyl, 4-[3',5'-di-tbutylphenyl]indenyl)$_2$zirconium dichloride;

dimethylamidoborane(2-n-propyl, 4-[3',5'-di-tbutylphenyl]indenyl)$_2$zirconium dichloride;

dimethylamidoborane(2-iso-propyl, 4-[3',5'-di-tbutylphenyl]indenyl)$_2$zirconium dichloride;

dimethylamidoborane(2-n-butyl, 4-[3',5'-di-tbutylphenyl]indenyl)$_2$zirconium dichloride;

dimethylamidoborane(2-iso-butyl, 4-[3',5'-di-tbutylphenyl]indenyl)$_2$zirconium dichloride;

dimethylamidoborane(2-sec-butyl, 4-[3',5'-di-tbutylphenyl]indenyl)$_2$zirconium dichloride;

dimethylamidoborane(2-tert-butyl, 4-[3',5'-di-tbutylphenyl]indenyl)$_2$zirconium dichloride;

dimethylamidoborane(2-ethyl, 4-[3',5'-bis-trifluoromethylphenyl]indenyl)$_2$zirconium dichloride;

dimethylamidoborane(2-n-propyl, 4-[3',5'-bis-trifluoromethylphenyl]indenyl)$_2$zirconium dichloride;

dimethylamidoborane(2-iso-propyl, 4-[3',5'-bis-trifluoromethylphenyl]indenyl)$_2$zirconium dichloride;

dimethylamidoborane(2-n-butyl, 4-[3',5'-bis-trifluoromethylphenyl]indenyl)$_2$zirconium dichloride;

dimethylamidoborane(2-iso-butyl, 4-[3',5'-bis-trifluoromethylphenyl]indenyl)$_2$zirconium dichloride;

dimethylamidoborane(2-sec-butyl, 4-[3',5'-bis-trifluoromethylphenyl]indenyl)$_2$zirconium dichloride;

dimethylamidoborane(2-tert-butyl, 4-[3',5'-bis-trifluoromethylphenyl]indenyl)$_2$zirconium dichloride;

dimethylamidoborane(2-ethyl, 4-[3',5'-di-iso-propylphenyl]indenyl)$_2$zirconium dichloride;

dimethylamidoborane(2-n-propyl, 4-[3',5'-di-iso-propylphenyl]indenyl)$_2$zirconium dichloride;

dimethylamidoborane(2-iso-propyl, 4-[3',5'-di-iso-propylphenyl]indenyl)$_2$zirconium dichloride;

dimethylamidoborane(2-n-butyl, 4-[3',5'-di-iso-propylphenyl]indenyl)$_2$zirconium dichloride;

dimethylamidoborane(2-iso-butyl, 4-[3',5'-di-iso-propylphenyl]indenyl)$_2$zirconium dichloride;

dimethylamidoborane(2-sec-butyl, 4-[3',5'-di-iso-propylphenyl]indenyl)$_2$zirconium dichloride;

dimethylamidoborane(2-tert-butyl, 4-[3',5'-di-iso-propylphenyl]indenyl)$_2$zirconium dichloride;

dimethylamidoborane(2-methyl, 4-[3',5'-di-phenylphenyl]indenyl)$_2$zirconium dichloride;

dimethylamidoborane(2-ethyl, 4-[3',5'-di-phenylphenyl]indenyl)$_2$zirconium dichloride;

dimethylamidoborane(2-n-propyl, 4-[3',5'-di-phenylphenyl]indenyl)$_2$zirconium dichloride;

dimethylamidoborane(2-iso-propyl, 4-[3',5'-di-phenylphenyl]indenyl)$_2$zirconium dichloride;

dimethylamidoborane(2-n-butyl, 4-[3',5'-di-phenylphenyl]indenyl)$_2$zirconium dichloride;

dimethylamidoborane(2-iso-butyl, 4-[3',5'-di-phenylphenyl]indenyl)$_2$zirconium dichloride;

dimethylamidoborane(2-sec-butyl, 4-[3',5'-di-phenylphenyl]indenyl)$_2$zirconium dichloride;

dimethylamidoborane(2-tert-butyl, 4-[3',5'-di-phenylphenyl]indenyl)$_2$zirconium dichloride;

dimethylamidoborane(2-methyl, 4-[3',5'-di-tbutylphenyl]indenyl)$_2$zirconium dimethyl;

dimethylamidoborane(2-ethyl, 4-[3',5'-di-tbutylphenyl]indenyl)$_2$zirconium dimethyl;

dimethylamidoborane(2-n-propyl, 4-[3',5'-di-tbutylphenyl]indenyl)$_2$zirconium dimethyl;

dimethylamidoborane(2-iso-propyl, 4-[3',5'-di-tbutylphenyl]indenyl)$_2$zirconium dimethyl;

dimethylamidoborane(2-n-butyl, 4-[3',5'-di-tbutylphenyl]indenyl)$_2$zirconium dimethyl;

dimethylamidoborane(2-iso-butyl, 4-[3',5'-di-tbutylphenyl]indenyl)$_2$zirconium dimethyl;

dimethylamidoborane(2-sec-butyl, 4-[3',5'-di-tbutylphenyl]indenyl)$_2$zirconium dimethyl;

dimethylamidoborane(2-tert-butyl, 4-[31,5'-di-tbutylphenyl]indenyl)$_2$zirconium dimethyl;

dimethylamidoborane(2-ethyl, 4-[3',5'-bis-trifluoromethylphenyl]indenyl)$_2$zirconium dimethyl;

dimethylamidoborane(2-n-propyl, 4-[3',5'-bis-trifluoromethylphenyl]indenyl)$_2$zirconium dimethyl;

dimethylamidoborane(2-iso-propyl, 4-[3',5'-bis-trifluoromethylphenyl]indenyl)$_2$zirconium dimethyl;

dimethylamidoborane(2-n-butyl, 4-[3',5'-bis-trifluoromethylphenyl]indenyl)$_2$zirconium dimethyl;

dimethylamidoborane(2-iso-butyl, 4-[3',5'-bis-trifluoromethylphenyl]indenyl)$_2$zirconium dimethyl;

dimethylamidoborane(2-sec-butyl, 4-[3',5'-bis-trifluoromethylphenyl]indenyl)$_2$zirconium dimethyl;

dimethylamidoborane(2-tert-butyl, 4-[3',5'-bis-trifluoromethylphenyl]indenyl)$_2$zirconium dimethyl;

dimethylamidoborane(2-ethyl, 4-[3',5'-di-iso-propylphenyl]indenyl)$_2$zirconium dimethyl;

dimethylamidoborane(2-n-propyl, 4-[3',5'-di-iso-propylphenyl]indenyl)$_2$zirconium dimethyl;

dimethyl dimethylamidoborane(2-iso-propyl, 4-[3',5'-di-iso-propylphenyl]indenyl)$_2$zirconium dimethyl;

dimethylamidoborane(2-n-butyl, 4-[3',5'-di-iso-propylphenyl]indenyl)$_2$zirconium dimethyl;

dimethylamidoborane(2-iso-butyl, 4-[3',5'-di-iso-propylphenyl]indenyl)$_2$zirconium dimethyl;

dimethylamidoborane(2-sec-butyl, 4-[3',5'-di-iso-propylphenyl]indenyl)$_2$zirconium dimethyl;

dimethylamidoborane(2-tert-butyl, 4-[3',5'-di-iso-propylphenyl]indenyl)$_2$zirconium dimethyl;

dimethylamidoborane(2-methyl, 4-[3',5'-di-phenylphenyl]indenyl)$_2$zirconium dimethyl;

dimethylamidoborane(2-ethyl, 4-[3',5'-di-phenylphenyl]indenyl)$_2$zirconium dimethyl;

dimethylamidoborane(2-n-propyl, 4-[3',5'-di-phenylphenyl]indenyl)$_2$zirconium dimethyl;

dimethylamidoborane(2-iso-propyl, 4-[3',5'-di-phenylphenyl]indenyl)$_2$zirconium dimethyl;

dimethylamidoborane(2-n-butyl, 4-[3',5'-di-phenylphenyl]indenyl)$_2$zirconium dimethyl;

dimethylamidoborane(2-iso-butyl, 4-[3',5'-di-phenylphenyl]indenyl)$_2$zirconium dimethyl;

dimethylamidoborane(2-sec-butyl, 4-[3',5'-di-phenylphenyl]indenyl)$_2$zirconium dimethyl;

dimethylamidoborane(2-tert-butyl, 4-[3',5'-di-phenylphenyl]indenyl)$_2$zirconium dimethyl;

diisopropylamidoborane(2-methyl, 4-[3',5'-di-tbutylphenyl]indenyl)$_2$zirconium dichloride;
diisopropylamidoborane(2-ethyl, 4-[3',5'-di-tbutylphenyl]indenyl)$_2$zirconium dichloride;
diisopropylamidoborane(2-n-propyl, 4-[3',5'-di-tbutylphenyl]indenyl)$_2$zirconium dichloride;
diisopropylamidoborane(2-iso-propyl, 4-[3',5'-di-tbutylphenyl]indenyl)$_2$zirconium dichloride;
diisopropylamidoborane(2-n-butyl, 4-[3',5'-di-tbutylphenyl]indenyl)$_2$zirconium dichloride;
diisopropylamidoborane(2-iso-butyl, 4-[3',5'-di-tbutylphenyl]indenyl)$_2$zirconium dichloride;
diisopropylamidoborane(2-sec-butyl, 4-[3',5'-di-tbutylphenyl]indenyl)$_2$zirconium dichloride;
diisopropylamidoborane(2-tert-butyl, 4-[3',5'-di-tbutylphenyl]indenyl)$_2$zirconium dichloride;
diisopropylamidoborane(2-ethyl, 4-[3',5'-bis-trifluoromethylphenyl]indenyl)$_2$zirconium dichloride;
diisopropylamidoborane(2-n-propyl, 4-[3',5'-bis-trifluoromethylphenyl]indenyl)$_2$zirconium dichloride;
diisopropylamidoborane(2-iso-propyl, 4-[3',5'-bis-trifluoromethylphenyl]indenyl)$_2$zirconium dichloride;
diisopropylamidoborane(2-n-butyl, 4-[3',5'-bis-trifluoromethylphenyl]indenyl)$_2$zirconium dichloride;
diisopropylamidoborane(2-iso-butyl, 4-[3',5'-bis-trifluoromethylphenyl]indenyl)$_2$zirconium dichloride;
diisopropylamidoborane(2-sec-butyl, 4-[3',5'-bis-trifluoromethylphenyl]indenyl)$_2$zirconium dichloride;
diisopropylamidoborane(2-tert-butyl, 4-[3',5'-bis-trifluoromethylphenyl]indenyl)$_2$zirconium dichloride;
diisopropylamidoborane(2-ethyl, 4-[3',5'-di-iso-propylphenyl]indenyl)$_2$zirconium dichloride;
diisopropylamidoborane(2-n-propyl, 4-[3',5'-di-iso-propylphenyl]indenyl)$_2$zirconium dichloride;
diisopropylamidoborane(2-iso-propyl, 4-[3',5'-di-iso-propylphenyl]indenyl)$_2$zirconium dichloride;
diisopropylamidoborane(2-n-butyl, 4-[3',5'-di-iso-propylphenyl]indenyl)$_2$zirconium dichloride;
diisopropylamidoborane(2-iso-butyl, 4-[3',5'-di-iso-propylphenyl]indenyl)$_2$zirconium dichloride;
diisopropylamidoborane(2-sec-butyl, 4-[3',5'-di-iso-propylphenyl]indenyl)$_2$zirconium dichloride;
diisopropylamidoborane(2-tert-butyl, 4-[3',5'-di-iso-propylphenyl]indenyl)$_2$zirconium dichloride;
diisopropylamidoborane(2-methyl, 4-[3',5'-di-phenylphenyl]indenyl)$_2$zirconium dichloride;
diisopropylamidoborane(2-ethyl, 4-[3',5'-di-phenylphenyl]indenyl)$_2$zirconium dichloride;
diisopropylamidoborane(2-n-propyl, 4-[3',5'-di-phenylphenyl]indenyl)$_2$zirconium dichloride;
diisopropylamidoborane(2-iso-propyl, 4-[3',5'-di-phenylphenyl]indenyl)$_2$zirconium dichloride;
diisopropylamidoborane(2-n-butyl, 4-[3',5'-di-phenylphenyl]indenyl)$_2$zirconium dichloride;
diisopropylamidoborane(2-iso-butyl, 4-[3',5'-di-phenylphenyl]indenyl)$_2$zirconium dichloride;
diisopropylamidoborane(2-sec-butyl, 4-[3',5'-di-phenylphenyl]indenyl)$_2$zirconium dichloride;
diisopropylamidoborane(2-tert-butyl, 4-[3',5'-di-phenylphenyl]indenyl)$_2$zirconium dichloride;
diisopropylamidoborane(2-methyl, 4-[3',5'-di-tbutylphenyl]indenyl)$_2$zirconium dimethyl;
diisopropylamidoborane(2-ethyl, 4-[3',5'-di-tbutylphenyl]indenyl)$_2$zirconium dimethyl;
diisopropylamidoborane(2-n-propyl, 4-[3',5'-di-tbutylphenyl]indenyl)$_2$zirconium dimethyl;
diisopropylamidoborane(2-iso-propyl, 4-[3',5'-di-tbutylphenyl]indenyl)$_2$zirconium dimethyl;
diisopropylamidoborane(2-n-butyl, 4-[3',5'-di-tbutylphenyl]indenyl)$_2$zirconium dimethyl;
diisopropylamidoborane(2-iso-butyl, 4-[3',5'-di-tbutylphenyl]indenyl)$_2$zirconium dimethyl;
diisopropylamidoborane(2-sec-butyl, 4-[3',5'-di-tbutylphenyl]indenyl)$_2$zirconium dimethyl;
diisopropylamidoborane(2-tert-butyl, 4-[3',5'-di-tbutylphenyl]indenyl)$_2$zirconium dimethyl;
diisopropylamidoborane(2-ethyl, 4-[3',5'-bis-trifluoromethylphenyl]indenyl)$_2$zirconium dimethyl;
diisopropylamidoborane(2-n-propyl, 4-[3',5'-bis-trifluoromethylphenyl]indenyl)$_2$zirconium dimethyl;
diisopropylamidoborane(2-iso-propyl, 4-[3',5'-bis-trifluoromethylphenyl]indenyl)$_2$zirconium dimethyl;
diisopropylamidoborane(2-n-butyl, 4-[3',5'-bis-trifluoromethylphenyl]indenyl)$_2$zirconium dimethyl;
diisopropylamidoborane(2-iso-butyl, 4-[3',5'-bis-trifluoromethylphenyl]indenyl)$_2$zirconium dimethyl;
diisopropylamidoborane(2-sec-butyl, 4-[3',5'-bis-trifluoromethylphenyl]indenyl)$_2$zirconium dimethyl;
diisopropylamidoborane(2-tert-butyl, 4-[3',5'-bis-trifluoromethylphenyl]indenyl)$_2$zirconium dimethyl;
diisopropylamidoborane(2-ethyl, 4-[3',5'-di-iso-propylphenyl]indenyl)$_2$zirconium dimethyl;
diisopropylamidoborane(2-n-propyl, 4-[3',5'-di-iso-propylphenyl]indenyl)$_2$zirconium dimethyl
diisopropylamidoborane(2-iso-propyl, 4-[3',5'-di-iso-propylphenyl]indenyl)$_2$zirconium dimethyl;
diisopropylamidoborane(2-n-butyl, 4-[3',5'-di-iso-propylphenyl]indenyl)$_2$zirconium dimethyl;
diisopropylamidoborane(2-iso-butyl, 4-[3',5'-di-iso-propylphenyl]indenyl)$_2$zirconium dimethyl;
diisopropylamidoborane(2-sec-butyl, 4-[3',5'-di-iso-propylphenyl]indenyl)$_2$zirconium dimethyl;
diisopropylamidoborane(2-tert-butyl, 4-[3',5'-di-iso-propylphenyl]indenyl)$_2$zirconium dimethyl;
diisopropylamidoborane(2-methyl, 4-[3',5'-di-phenylphenyl]indenyl)$_2$zirconium dimethyl;
diisopropylamidoborane(2-ethyl, 4-[3',5'-di-phenylphenyl]indenyl)$_2$zirconium dimethyl;
diisopropylamidoborane(2-n-propyl, 4-[3',5'-di-phenylphenyl]indenyl)$_2$zirconium dimethyl;
diisopropylamidoborane(2-iso-propyl, 4-[3',5'-di-phenylphenyl]indenyl)$_2$zirconium dimethyl;
diisopropylamidoborane(2-n-butyl, 4-[3',5'-di-phenylphenyl]indenyl)$_2$zirconium dimethyl;
diisopropylamidoborane(2-iso-butyl, 4-[3',5'-di-phenylphenyl]indenyl)$_2$zirconium dimethyl;
diisopropylamidoborane(2-sec-butyl, 4-[3',5'-di-phenylphenyl]indenyl)$_2$zirconium dimethyl;
diisopropylamidoborane(2-tert-butyl, 4-[3',5'-di-phenylphenyl]indenyl)$_2$zirconium dimethyl;
bis(trimethylsilyl)amidoborane(2-methyl, 4-[3',5'-di-tbutylphenyl]indenyl)$_2$zirconium dichloride;
bis(trimethylsilyl)amidoborane(2-ethyl, 4-[3',5'-di-tbutylphenyl]indenyl)$_2$zirconium dichloride;
bis(trimethylsilyl)amidoborane(2-n-propyl, 4-[3',5'-di-tbutylphenyl]indenyl)$_2$zirconium dichloride;
bis(trimethylsilyl)amidoborane(2-iso-propyl, 4-[3',5'-di-tbutylphenyl]indenyl)$_2$zirconium dichloride;
bis(trimethylsilyl)amidoborane(2-n-butyl, 4-[3',5'-di-tbutylphenyl]indenyl)$_2$zirconium dichloride;
bis(trimethylsilyl)amidoborane(2-iso-butyl, 4-[3',5'-di-tbutylphenyl]indenyl)$_2$zirconium dichloride;

bis(trimethylsilyl)amidoborane(2-sec-butyl, 4-[3',5'-di-tbutylphenyl]indenyl)₂zirconium dichloride;
bis(trimethylsilyl)amidoborane(2-tert-butyl, 4-[3',5'-di-tbutylphenyl]indenyl)₂zirconium dichloride;
bis(trimethylsilyl)amidoborane(2-ethyl, 4-[3',5'-bis-trifluoromethylphenyl]indenyl)₂zirconium dichloride;
bis(trimethylsilyl)amidoborane(2-n-propyl, 4-[3',5'-bis-trifluoromethylphenyl]indenyl)₂zirconium dichloride;
bis(trimethylsilyl)amidoborane(2-iso-propyl, 4-[3',5'-bis-trifluoromethylphenyl]indenyl)₂zirconium dichloride;
bis(trimethylsilyl)amidoborane(2-n-butyl, 4-[3',5'-bis-trifluoromethylphenyl]indenyl)₂zirconium dichloride;
bis(trimethylsilyl)amidoborane(2-iso-butyl, 4-[3',5'-bis-trifluoromethylphenyl]indenyl)₂zirconium dichloride;
bis(trimethylsilyl)amidoborane(2-sec-butyl, 4-[3',5'-bis-trifluoromethylphenyl]indenyl)₂zirconium dichloride;
bis(trimethylsilyl)amidoborane(2-tert-butyl, 4-[3',5'-bis-trifluoromethylphenyl]indenyl)₂zirconium dichloride;
bis(trimethylsilyl)amidoborane(2-ethyl, 4-[3',5'-di-iso-propylphenyl]indenyl)₂zirconium dichloride;
bis(trimethylsilyl)amidoborane(2-n-propyl, 4-[3',5'-di-iso-propylphenyl]indenyl)₂zirconium dichloride;
bis(trimethylsilyl)amidoborane(2-iso-propyl, 4-[3',5'-di-iso-propylphenyl]indenyl)₂zirconium dichloride;
bis(trimethylsilyl)amidoborane(2-n-butyl, 4-[3',5'-di-iso-propylphenyl]indenyl)₂zirconium dichloride;
bis(trimethylsilyl)amidoborane(2-iso-butyl, 4-[3',5'-di-iso-propylphenyl]indenyl)₂zirconium dichloride;
bis(trimethylsilyl)amidoborane(2-sec-butyl, 4-[3',5'-di-iso-propylphenyl]indenyl)₂zirconium dichloride;
bis(trimethylsilyl)amidoborane(2-tert-butyl, 4-[3',5'-di-iso-propylphenyl]indenyl)₂zirconium dichloride;
bis(trimethylsilyl)amidoborane(2-methyl, 4-[3',5'-di-phenylphenyl]indenyl)₂zirconium dichloride;
bis(trimethylsilyl)amidoborane(2-ethyl, 4-[3',5'-di-phenylphenyl]indenyl)₂zirconium dichloride;
bis(trimethylsilyl)amidoborane(2-n-propyl, 4-[3',5'-di-phenylphenyl]indenyl)₂zirconium dichloride;
bis(trimethylsilyl)amidoborane(2-iso-propyl, 4-[3',5'-di-phenylphenyl]indenyl)₂zirconium dichloride;
bis(trimethylsilyl)amidoborane(2-n-butyl, 4-[3',5'-di-phenylphenyl]indenyl)₂zirconium dichloride;
bis(trimethylsilyl)amidoborane(2-iso-butyl, 4-[3',5'-di-phenylphenyl]indenyl)₂zirconium dichloride;
bis(trimethylsilyl)amidoborane(2-sec-butyl, 4-[3',5'-di-phenylphenyl]indenyl)₂zirconium dichloride;
bis(trimethylsilyl)amidoborane(2-tert-butyl, 4-[3',5'-di-phenylphenyl]indenyl)₂zirconium dichloride;
bis(trimethylsilyl)amidoborane(2-methyl, 4-[3',5'-di-tbutylphenyl]indenyl)₂zirconium dimethyl;
bis(trimethylsilyl)amidoborane(2-ethyl, 4-[3',5'-di-tbutylphenyl]indenyl)₂zirconium dimethyl;
bis(trimethylsilyl)amidoborane(2-n-propyl, 4-[3',5'-di-tbutylphenyl]indenyl)₂zirconium dimethyl;
bis(trimethylsilyl)amidoborane(2-iso-propyl, 4-[3',5'-di-tbutylphenyl]indenyl)₂zirconium dimethyl;
bis(trimethylsilyl)amidoborane(2-n-butyl, 4-[3',5'-di-tbutylphenyl]indenyl)₂zirconium dimethyl;
bis(trimethylsilyl)amidoborane(2-iso-butyl, 4-[3',5'-di-tbutylphenyl]indenyl)₂zirconium dimethyl;
bis(trimethylsilyl)amidoborane(2-sec-butyl, 4-[3',5'-di-tbutylphenyl]indenyl)₂zirconium dimethyl;
bis(trimethylsilyl)amidoborane(2-tert-butyl, 4-[3',5'-di-tbutylphenyl]indenyl)₂zirconium dimethyl;
bis(trimethylsilyl)amidoborane(2-ethyl, 4-[3',5'-bis-trifluoromethylphenyl]indenyl)₂zirconium dimethyl;
bis(trimethylsilyl)amidoborane(2-n-propyl, 4-[3',5'-bis-trifluoromethylphenyl]indenyl)₂zirconium dimethyl;
bis(trimethylsilyl)amidoborane(2-iso-propyl, 4-[3',5'-bis-trifluoromethylphenyl]indenyl)₂zirconium dimethyl;
bis(trimethylsilyl)amidoborane(2-n-butyl, 4-[3',5'-bis-trifluoromethylphenyl]indenyl)₂zirconium dimethyl;
bis(trimethylsilyl)amidoborane(2-iso-butyl, 4-[3',5'-bis-trifluoromethylphenyl]indenyl)₂zirconium dimethyl;
bis(trimethylsilyl)amidoborane(2-sec-butyl, 4-[3',5'-bis-trifluoromethylphenyl]indenyl)₂zirconium dimethyl;
bis(trimethylsilyl)amidoborane(2-tert-butyl, 4-[3',5'-bis-trifluoromethylphenyl]indenyl)₂zirconium dimethyl;
bis(trimethylsilyl)amidoborane(2-ethyl, 4-[3',5'-di-iso-propylphenyl]indenyl)₂zirconium dimethyl;
bis(trimethylsilyl)amidoborane(2-n-propyl, 4-[3',5'-di-iso-propylphenyl]indenyl)₂zirconium dimethyl bis(trimethylsilyl)amidoborane(2-iso-propyl, 4-[3',5'-di-iso-propylphenyl]indenyl)₂zirconium dimethyl;
bis(trimethylsilyl)amidoborane(2-n-butyl, 4-[3',5'-di-iso-propylphenyl]indenyl)₂zirconium dimethyl;
bis(trimethylsilyl)amidoborane(2-iso-butyl, 4-[3',5'-di-iso-propylphenyl]indenyl)₂zirconium dimethyl;
bis(trimethylsilyl)amidoborane(2-sec-butyl, 4-[3',5'-di-iso-propylphenyl]indenyl)₂zirconium dimethyl;
bis(trimethylsilyl)amidoborane(2-tert-butyl, 4-[3',5'-di-iso-propylphenyl]indenyl)₂zirconium dimethyl;
bis(trimethylsilyl)amidoborane(2-methyl, 4-[3',5'-di-phenylphenyl]indenyl)₂zirconium dimethyl;
bis(trimethylsilyl)amidoborane(2-ethyl, 4-[3',5'-di-phenylphenyl]indenyl)₂zirconium dimethyl;
bis(trimethylsilyl)amidoborane(2-n-propyl, 4-[3',5'-di-phenylphenyl]indenyl)₂zirconium dimethyl;
bis(trimethylsilyl)amidoborane(2-iso-propyl, 4-[3',5'-di-phenylphenyl]indenyl)₂zirconium dimethyl;
bis(trimethylsilyl)amidoborane(2-n-butyl, 4-[3',5'-di-phenylphenyl]indenyl)₂zirconium dimethyl;
bis(trimethylsilyl)amidoborane(2-iso-butyl, 4-[3',5'-di-phenylphenyl]indenyl)₂zirconium dimethyl;
bis(trimethylsilyl)amidoborane(2-sec-butyl, 4-[3',5'-di-phenylphenyl]indenyl)₂zirconium dimethyl;
and bis(trimethylsilyl)amidoborane(2-tert-butyl, 4-[3',5'-di-phenylphenyl]indenyl)₂zirconium dimethyl.

11. The process of claim 1 where the metallocene compound is represented by the formula:

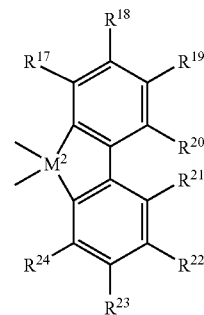

wherein: $M^1$ is selected from the group consisting of titanium, zirconium, hafnium, vanadium, niobium, tantalum, chromium, molybdenum and tungsten;

$R^1$ and $R^2$ are identical or different, and are one of a hydrogen atom, a $C_1$-$C_{10}$ alkyl group, a $C_1$-$C_{10}$ alkoxy group, a $C_6$-$C_{10}$ aryl group, a $C_6$-$C_{10}$ aryloxy group, a $C_2$-$C_{10}$ alkenyl group, a $C_2$-$C_{40}$ alkenyl group, a $C_7$-$C_{40}$ arylalkyl group, a $C_7$-$C_{40}$ alkylaryl group, a $C_9$-$C_{40}$ arylalkenyl group, an OH group or a halogen atom;

$R^1$ and $R^2$ may also be joined together to form an alkanediyl group or a conjugated $C_{4-40}$ diene ligand which is coordinated to $M^1$ in a metallocyclopentene fashion;

$R^1$ and $R^2$ may also be identical or different conjugated dienes, optionally substituted with one or more hydrocarbyl, tri(hydrocarbyl)silyl groups or hydrocarbyl, tri (hydrocarbyl)silylhydrocarbyl groups, said dienes having up to 30 atoms not counting hydrogen and forming a .pi. complex with M;

each $R^3$ is identical or different from the other $R^3$ and is each a halogen atom, a $C_1$-$C_{10}$ alkyl group which may be halogenated, a $C_6$-$C_{10}$ aryl group which may be halogenated, a $C_2$-$C_{10}$ alkenyl group, a $C_7$-$C_{40}$-arylalkyl group, a $C_7$-$C_{40}$ alkylaryl group, a $C_9$-$C_{40}$ arylalkenyl group, a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group;

$R^4$ to $R^{12}$ are identical or different and are hydrogen, or are as defined for $R^3$ or two or more adjacent radicals $R^5$ to $R^7$ together with the atoms connecting them form one or more rings;

$R^{13}$ is

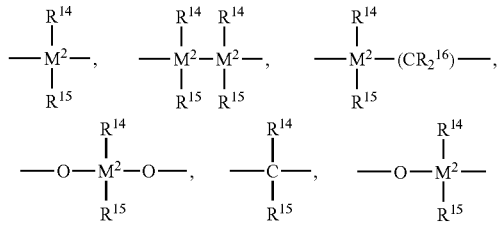

—B($R^{14}$)—, $^-$Al($R^{14}$)—, —Ge—, —Sn—, —O—, —S—, —SO—, —SO$_2$—, —N($R^{14}$)—, —CO—, —P($R^{14}$)—, or —P(O)($R^{14}$)—;

wherein: $R^{14}$, $R^{15}$ and $R^{16}$ are identical or different and are a hydrogen atom, a halogen atom, a $C_1$-$C_{20}$ branched or linear alkyl group, a $C_1$-$C_{20}$ fluoroalkyl or silaalkyl group, a $C_6$-$C_{30}$ aryl group, a $C_6$-$C_{30}$ fluoroaryl group, a $C_1$-$C_{20}$ alkoxy group, a $C_2$-$C_{20}$ alkenyl group, a $C_7$-$C_{40}$ arylalkyl group, a $C_8$-$C_{40}$ arylalkenyl group, a $C_7$-$C_{40}$ alkylaryl group, or $R^{14}$ and $R^{15}$, together with the atoms binding them, form a cyclic ring; or, $R^{13}$ is represented by the formula;

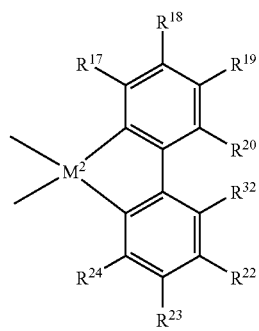

wherein: $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; and $M^2$ is one or more carbons, silicon, germanium or tin.

12. The process of claim 1 where the metallocene catalyst compound having at least two indenyl rings or derivative of indenyl rings, wherein each ring is substituted at the 2 and 4 positions and is a substituted or unsubstituted silyl bridged bis-indenyl metallocene.

13. The process of claim 1 where the metallocene catalyst compound is combined with propylene in an amount of up to 1.0 mole % hydrogen in the reactor.

14. The process of claim 1 wherein the activator comprises alumoxane.

15. The process of claim 1 wherein the activator is selected from the group consisting of:

trimethylammonium tetraphenylborate, triethylammonium tetraphenylborate, tripropylammonium tetraphenylborate, tri(n-butyl)ammonium tetraphenylborate, tri (tert-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, trimethylammonium tetrakis(pentafluorophenyl)borate, triethylammonium tetrakis(pentafluorophenyl)borate, tripropylammonium tetrakis(pentafluorophenyl) borate, tri(n-butyl)ammonium tetrakis (pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis (pentafluorophenyl)borate, trimethylammonium tetrakis-(2,3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl(tert-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluorophenyl)borate, N,N-dimethyl-(2,4,6-trimethylanilinium)tetrakis-(2,3,4,6-tetrafluorophenyl) borate, trimethylammonium tetrakis (perfluoronaphthyl)borate, triethylammonium tetrakis (perfluoronaphthyl)borate, tripropylammonium tetrakis (perfluoronaphthyl)borate, tri(n-butyl)ammonium tetrakis(perfluoronaphthyl)borate, tri(tert-butyl)ammonium tetrakis(perfluoronaphthyl)borate, N,N-dimethylanilinium tetrakis(perfluoronaphthyl)borate, N,N-diethylanilinium tetrakis(perfluoronaphthyl)borate, N,N-dimethyl-(2,4,6-trimethylanilinium)tetrakis (perfluoronaphthyl)borate, trimethylammonium tetrakis(perfluorobiphenyl)borate, triethylammonium tetrakis(perfluorobiphenyl)borate, tripropylammonium tetrakis(perfluorobiphenyl)borate, tri(n-butyl)ammonium tetrakis(perfluorobiphenyl)borate, tri(tert-butyl) ammonium tetrakis(perfluorobiphenyl)borate, N,N-dimethylanilinium tetrakis(perfluorobiphenyl)borate, N,N-diethylanilinium tetrakis(perfluorobiphenyl)borate, N,N-dimethyl-(2,4,6-trimethylanilinium)tetrakis (perfluorobiphenyl)borate, trimethylammonium tetrakis(3,5-bis(trifluoromethyl)phenyl)borate, triethylammonium tetrakis(3,5-bis(trifluoromethyl) phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(tert-butyl)ammonium tetrakis(3,5-bis(trifluoromethyl)phenyl)borate, N,N-dimethylanilinium tetrakis(3,5-bis(trifluoromethyl)phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, di-(iso-propyl)ammonium tetrakis(pentafluorophenyl)borate, dicyclohexylammonium tetrakis(pentafluorophenyl)borate; tri(o-tolyl)phosphonium tetrakis(pentafluorophenyl)borate, tri(2,6-dimethylphenyl)phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene(diazonium)tetraphenylborate, tropillium tetrakis(pentafluorophenyl)borate, triphenylcarbenium tetrakis(pentafluorophenyl)borate, triphenylphosphonium tetrakis(pentafluorophenyl)borate, triethylsilylium tetrakis(pentafluorophenyl)borate, benzene(diazonium) tetrakis(pentafluorophenyl)borate, tropillium tetrakis-(2,3,4,6-tetrafluorophenyl)borate, triphenylcarbenium tetrakis-(2,3,4,6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium)tetrakis-(2,3,4,6-tetrafluorophenyl)borate, tropillium tetrakis(perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium) tetrakis(perfluoronaphthyl)borate, tropillium tetrakis(perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium) tetrakis(perfluorobiphenyl)borate, tropillium tetrakis(3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl)borate, triethylsilylium tetrakis(3,5-bis(trifluoromethyl)phenyl)borate, and benzene(diazonium)tetrakis(3,5-bis(trifluoromethyl)phenyl)borate.

16. The process of claim 1 wherein the activator comprises one or more of:
dimethylanilinium tetrakis(perfluorophenyl)boron, tri(n-butyl)ammonium tetrakis(pentafluorophenyl)boron, N,N-dimethylanilinium tetra(perfluorophenyl)borate and/or triphenylcarbenium tetra(perfluorophenyl)borate.

17. The process of claim 1 where the catalyst compound, the activator or both are supported.

18. The process of claim 17 wherein the support comprises silica.

19. The process of claim 1 wherein the process occurs in an autoclave reactor.

20. The process of claim 1 wherein the process occurs in a tubular reactor.

21. The process of claim 1 wherein the process occurs in a loop reactor.

22. The process of claim 1 wherein the polymerization medium comprises at least two phases.

23. The process of claim 1 wherein the catalyst activity is at least 2597 grams of polymer per gram of catalyst per hour.

* * * * *